United States Patent Office 3,197,568
Patented July 27, 1965

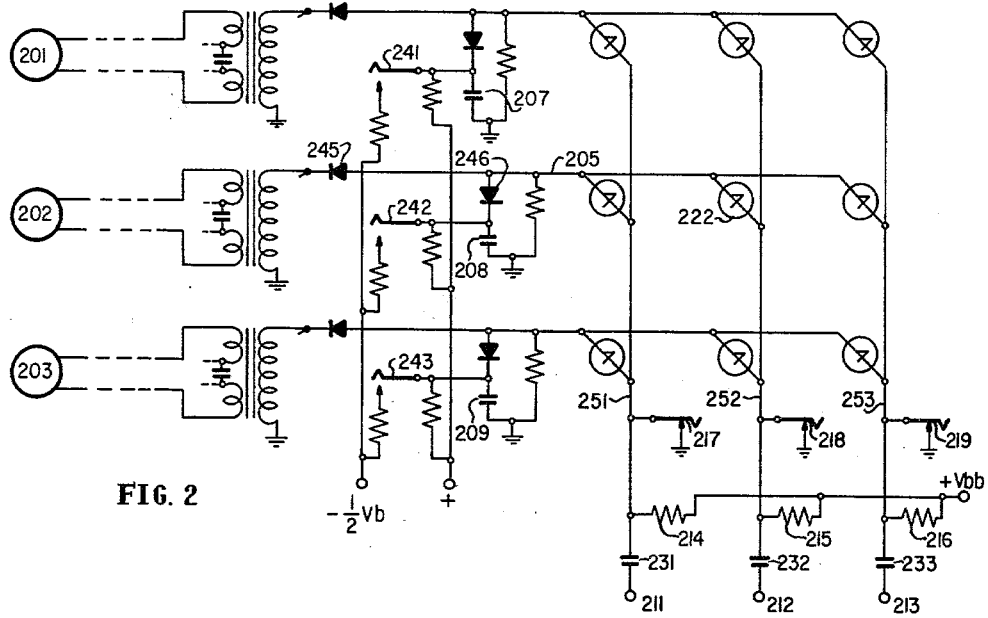
FIG. 2
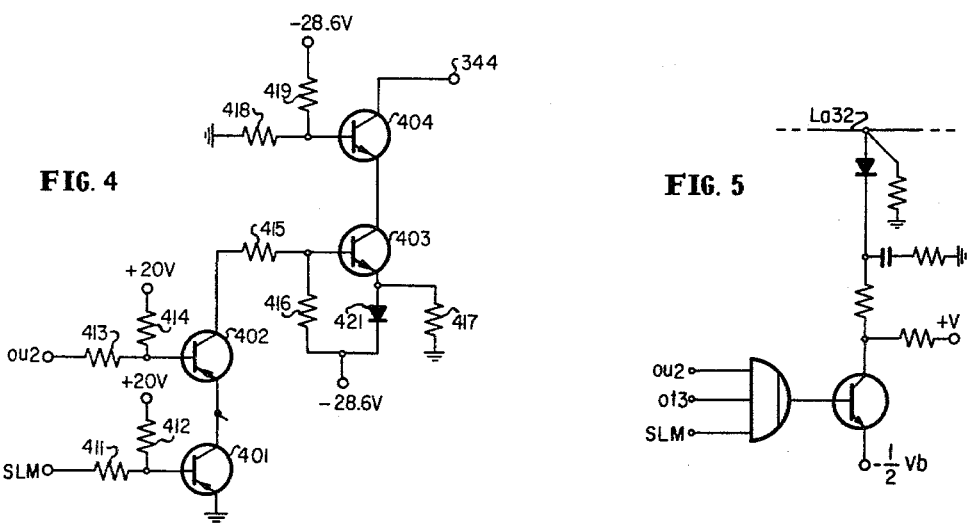
FIG. 4
FIG. 5

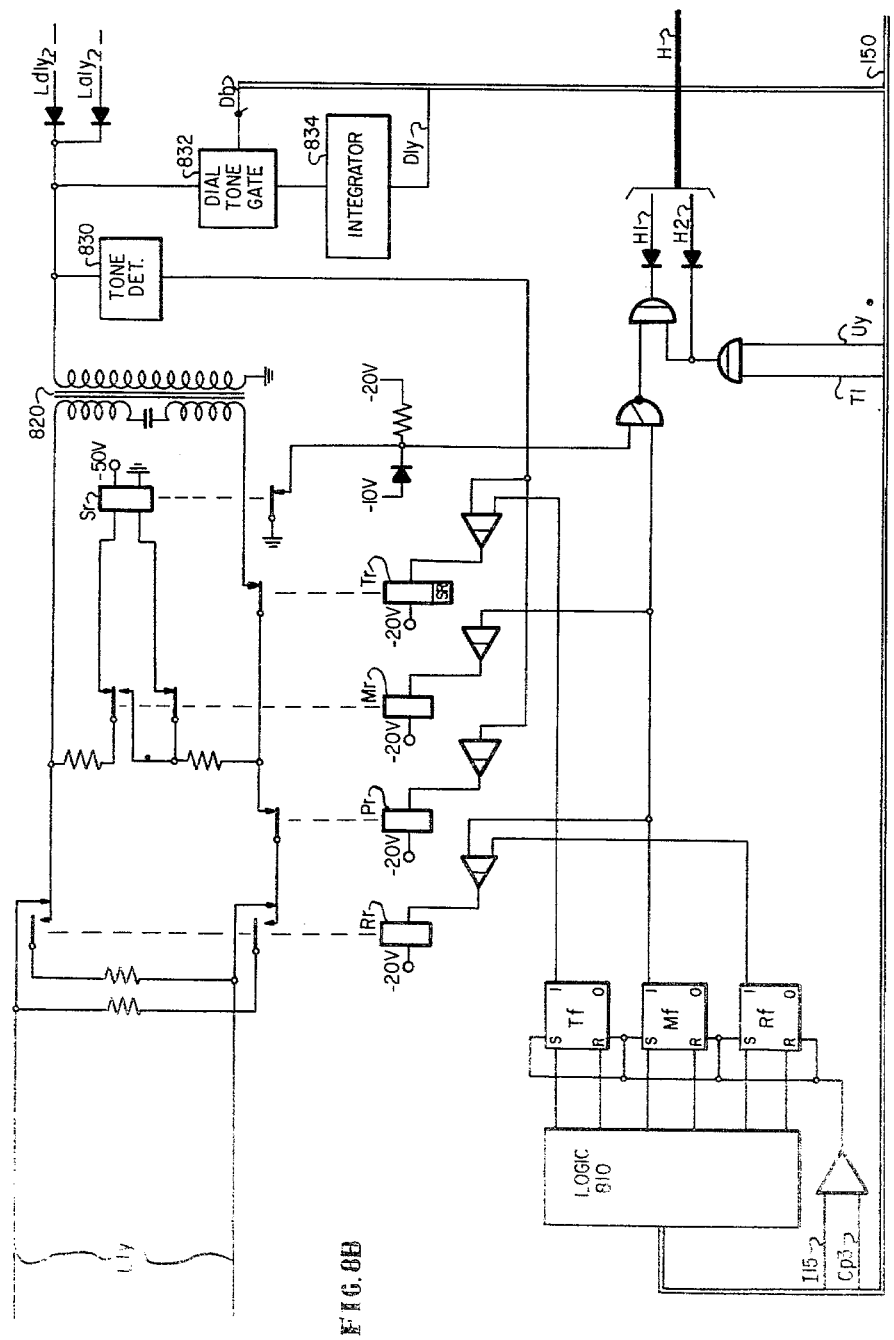

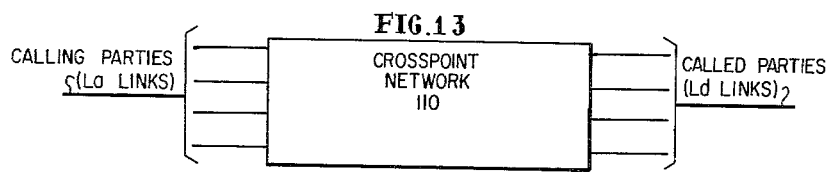
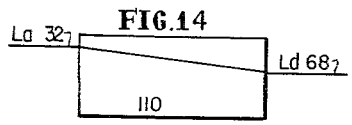
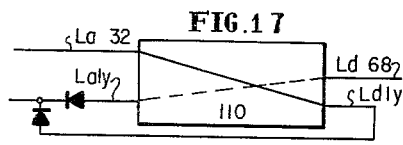
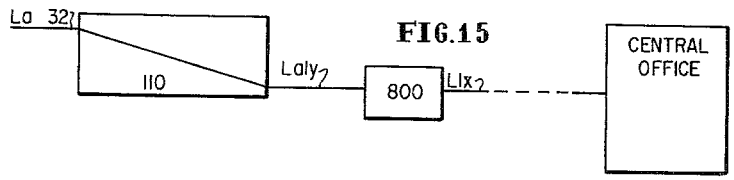
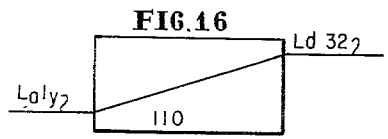
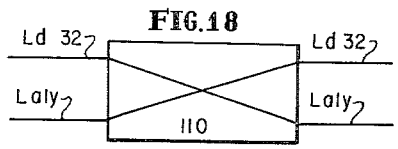
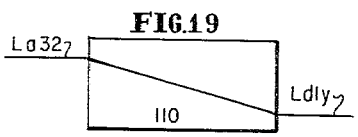
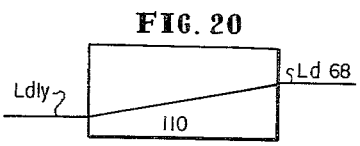
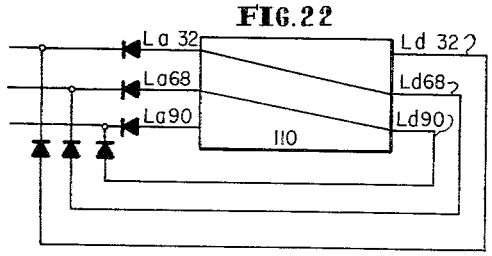
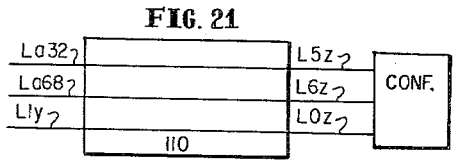

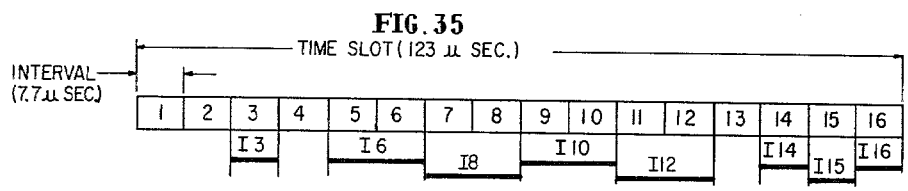
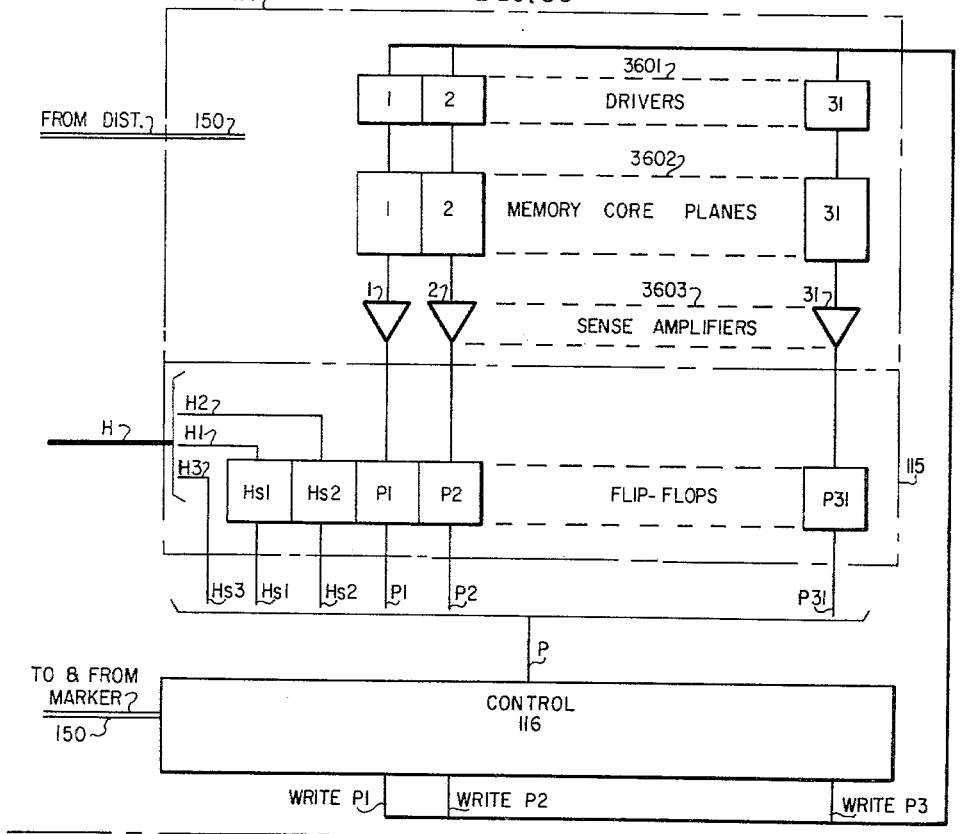

3,197,568
ELECTRONIC SWITCHING SYSTEM AND ATTENDANT'S ARRANGEMENT THEREFOR
William R. Wedmore, Lombard, and Richard P. Sanders, Lisle, Ill., assignors to Automatic Electric Laboratories, Inc., Northlake, Ill., a corporation of Delaware
Filed Nov. 1, 1961, Ser. No. 147,985
10 Claims. (Cl. 179—27)

This invention relates to an electronic switching system and an attendant's arrangement therefor, and more particularly to a private automatic branch exchange in which an attendant's cabinet is provided so that an operator may assist in the handling of connection involving a trunk line to the central office.

Private automatic branch exchanges are usually provided with an attendant's cabinet or board having an individual circuit for each of the trunk lines, with individual lamps and keys or cords associated with each such trunk circuit. Thus a relatively large cabinet is required, which is particularly objectionable if it is to be desk mounted.

It is also known in private automatic branch exchange systems to provide an arrangement in which an incoming trunk call is indicated by a loud ringing bell, and the call is answered by dialing a special number from a local subscriber station. A transfer operation is then performed to connect the incoming trunk to the desired station. It is apparent that such an arrangement is suitable only for a relatively small exchange, since a station can handle only one trunk call at a time. Also the loud ringing bell may be objectionable if calls are relatively frequent.

According to the invention a private automatic branch exchange is provided with an attendant's cabinet having a relatively small number of circuits compared to the number of trunk lines. The operator's lines, the trunk lines, and the local subscriber lines all connect to the switching network through generally similar line circuits, each line circuit having a connection to the calling side and a connection to the called side of the network. An incoming call on a trunk line causes the switching control equipment to hunt for an idle operator line and to cause a connection to be established thereto. The call is indicated on the attendant's cabinet by a flashing trunk lamp. The operator then operates an answer key and obtains the number of the desired party. She then dials this number and the switching control equipment responds to cause a connection to be established through the network between the trunk line circuit and the line circuit of the designated local subscriber. There are then two connections in the switching network involving the trunk line circuit, one to the operator line circuit, and one to the local subscriber line circuit. The operator may talk to the local subscriber over these two connections through the trunk line circuit. A feature of the invention relates to an arrangement which permits the operator at this point to restore the answer key, with the connection to the trunk line circuit remaining established and the supervisory lamps of that operator line burning steadily. The trunk line is then able to supervise the call itself. In response to answering of the call by the local subscriber, the common control equipment releases the switching network connection between the trunk line circuit and the operator line circuit and extinguishes the supervisory lamps associated with the operator line circuit. Thus the operator line circuit is returned to idle condition and is available for receiving another call.

According to another feature of the invention, any idle subscriber line, or any subscriber line engaged in a connection with a trunk line may simply dial the digit "0," in either case causing a connection to be established from his line circuit to an idle operator line circuit. Thus a local subscriber engaged in a connection with a trunk line may recall the operator by simply dialing the digit 0, which is the same action he would take to initiate a call to an operator otherwise.

The exchange is also provided with a meet-me conference circuit. There are several special conference line circuits having connections only to the called side of the switching network, and these line circuits are connected in common to the conference circuit. Local subscriber lines may establish a connection through the switching network through one of these conference line circuits by dialing a special digit. The attendant's cabinet is provided with a conference key for each of the operator lines to connect the corresponding line to the conference circuit. This provides an arrangement for connecting trunk lines to the conference circuit. A common conference lamp is provided which burns steadily as long as there is one or more connections by way of a conference line circuit to a local subscriber line. However if all of the local subscriber connections have been released, and a conference key on the attendant's cabinet remains operated for a trunk line connection the conference lamp flashes, indicating to the operator that action by her is required.

Another feature relates to a camp-on busy arrangement for incoming trunk calls if all of the operator lines are busy.

The exchange is also provided with a group of night service lines, to which incoming trunk calls are routed when a night service key on the attendant's cabinet is operated.

The above-mentioned and other objects and features of this invention and the manner of attaining them will become more apparent, and the invention itself will be best understood, by reference to the following description of embodiments of the invention taken in conjunction with the accompanying drawings comprising FIGS. 1 to 40 wherein;

FIG. 2 is a schematic diagram of a simplified crosspoint matrix;

FIG. 4 is a schematic diagram of a link marker;

FIG. 5 is a simplified diagram of the link marking arrangement;

Figure 12A:
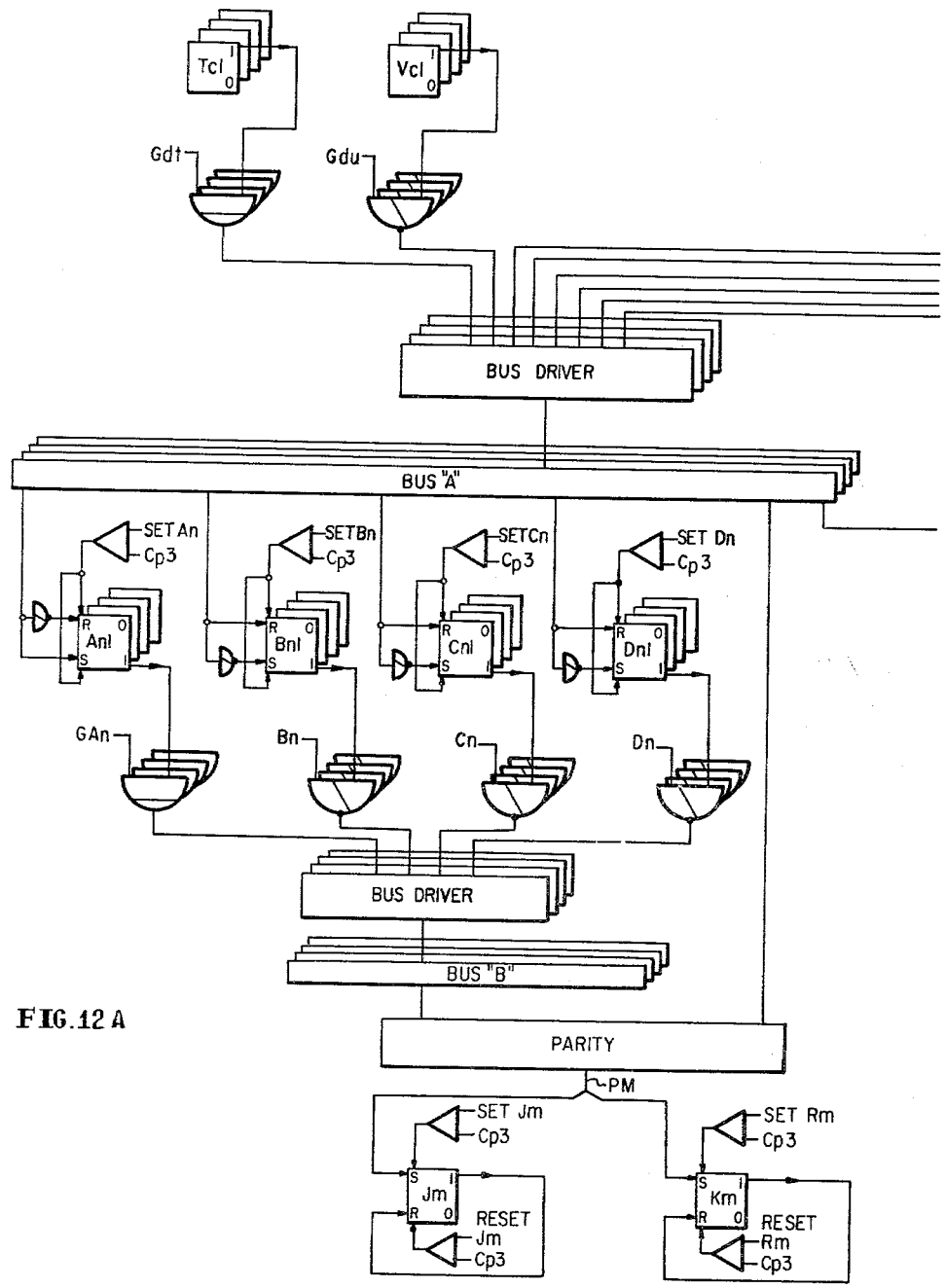
Figure 12B:
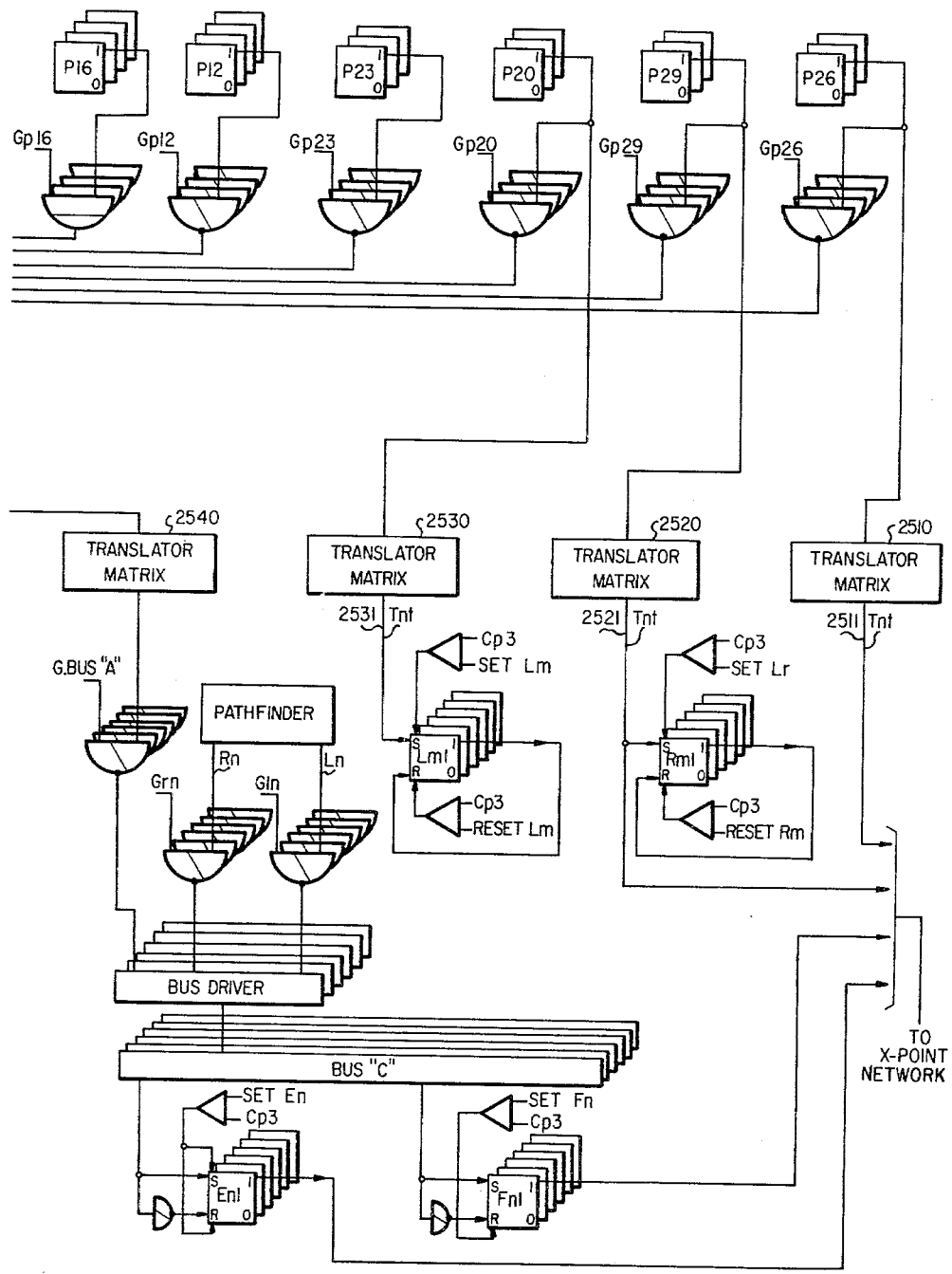
Figure 23:
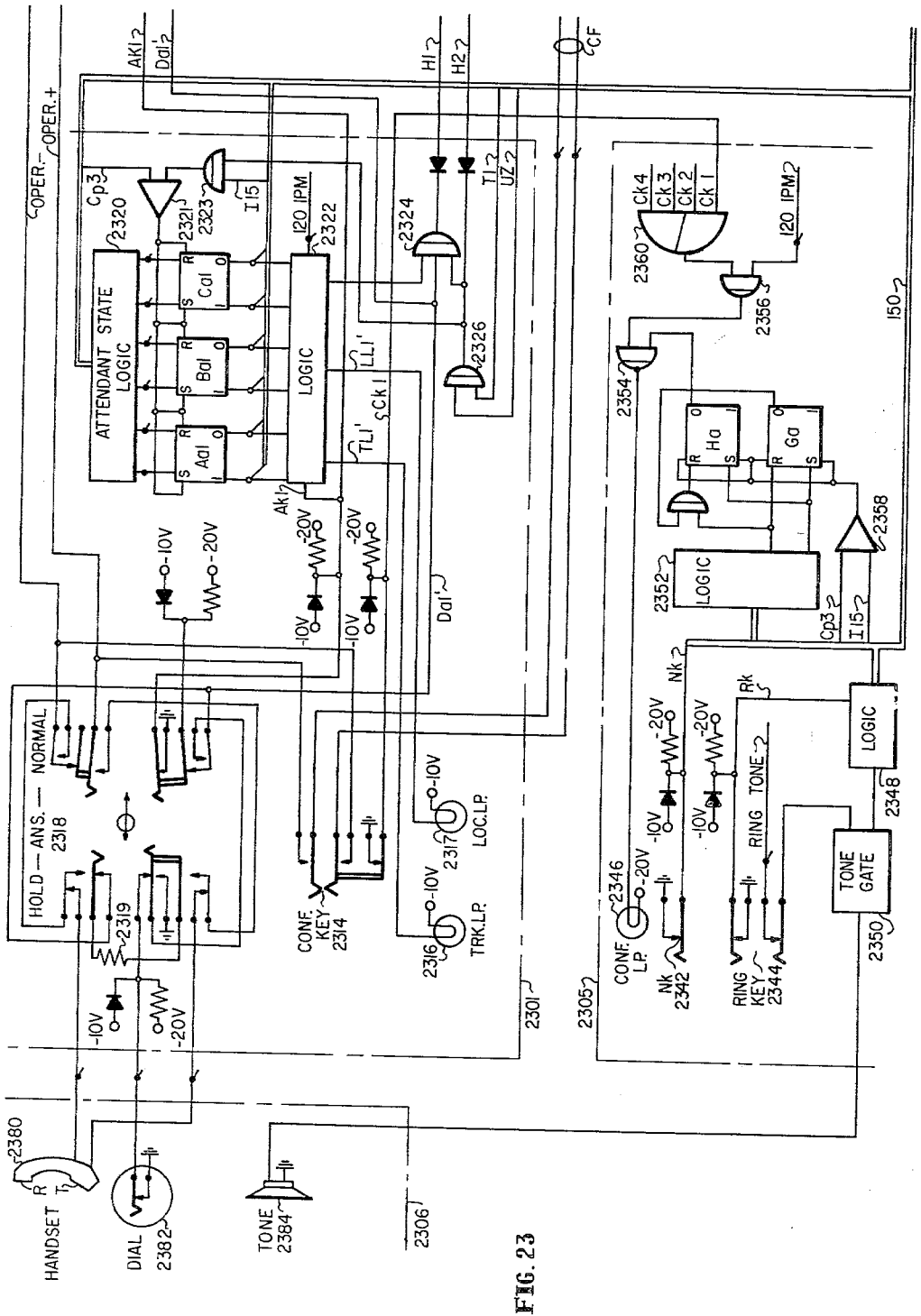
Figure 24:
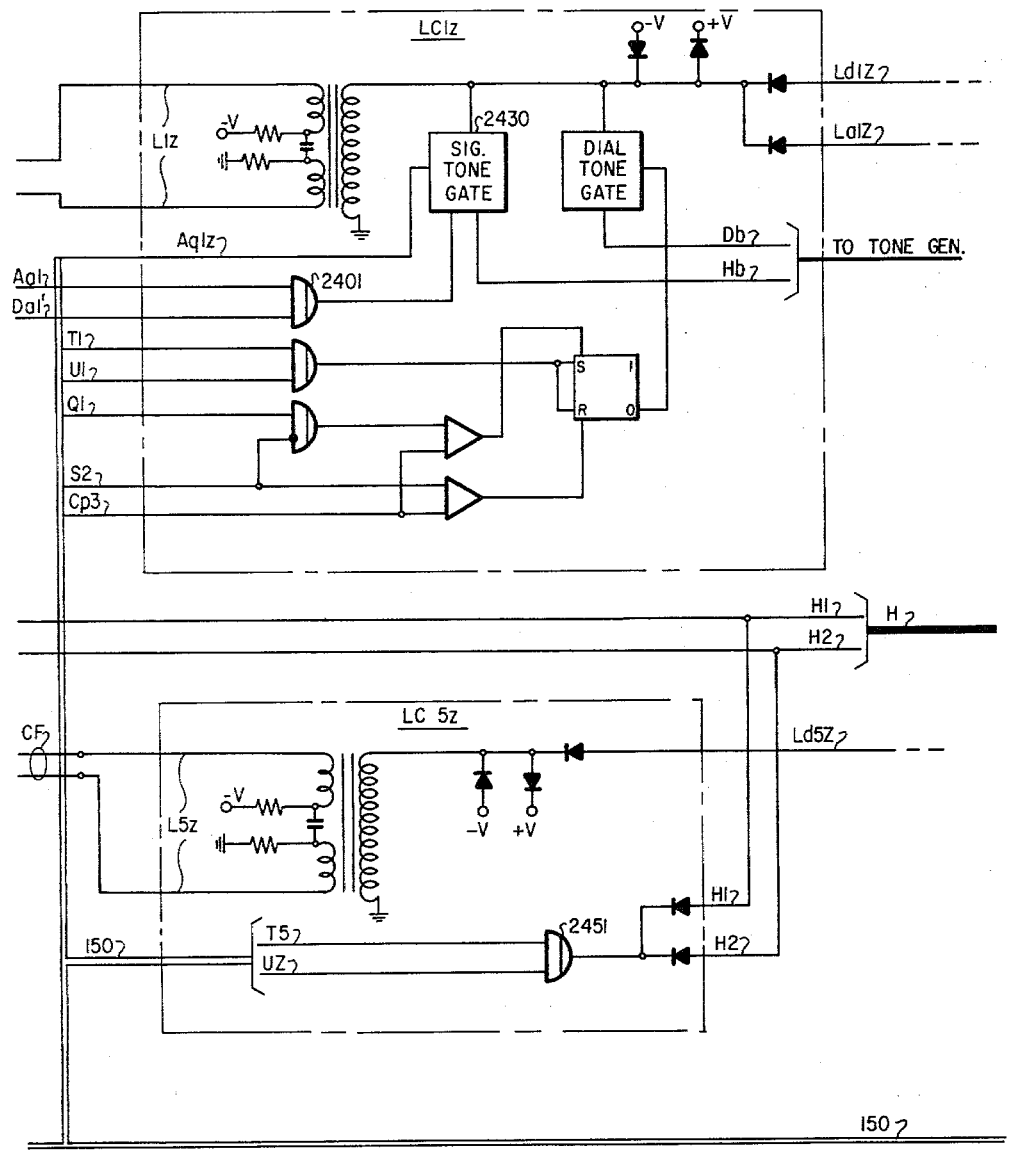
Figure 32:
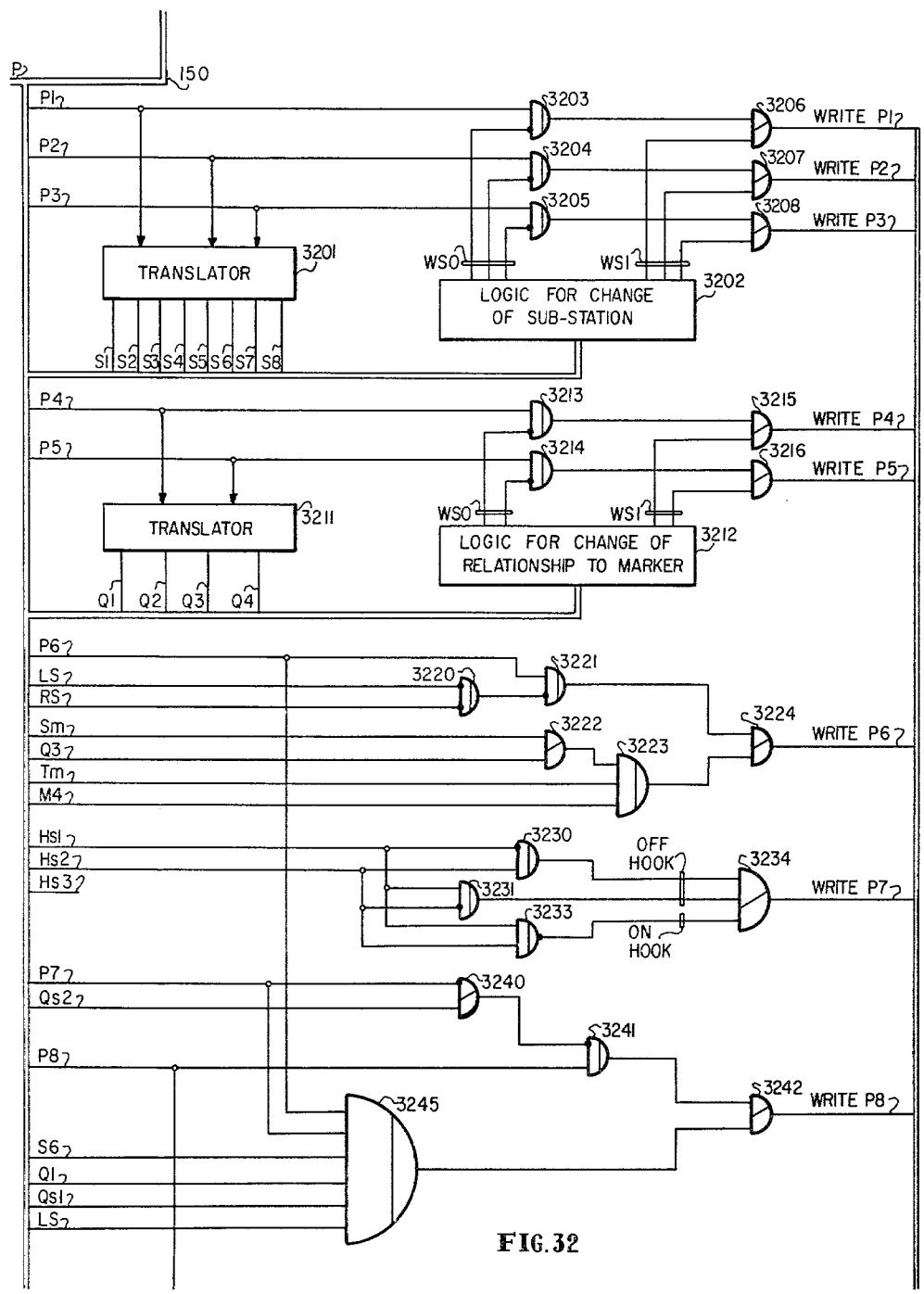
Figure 33:
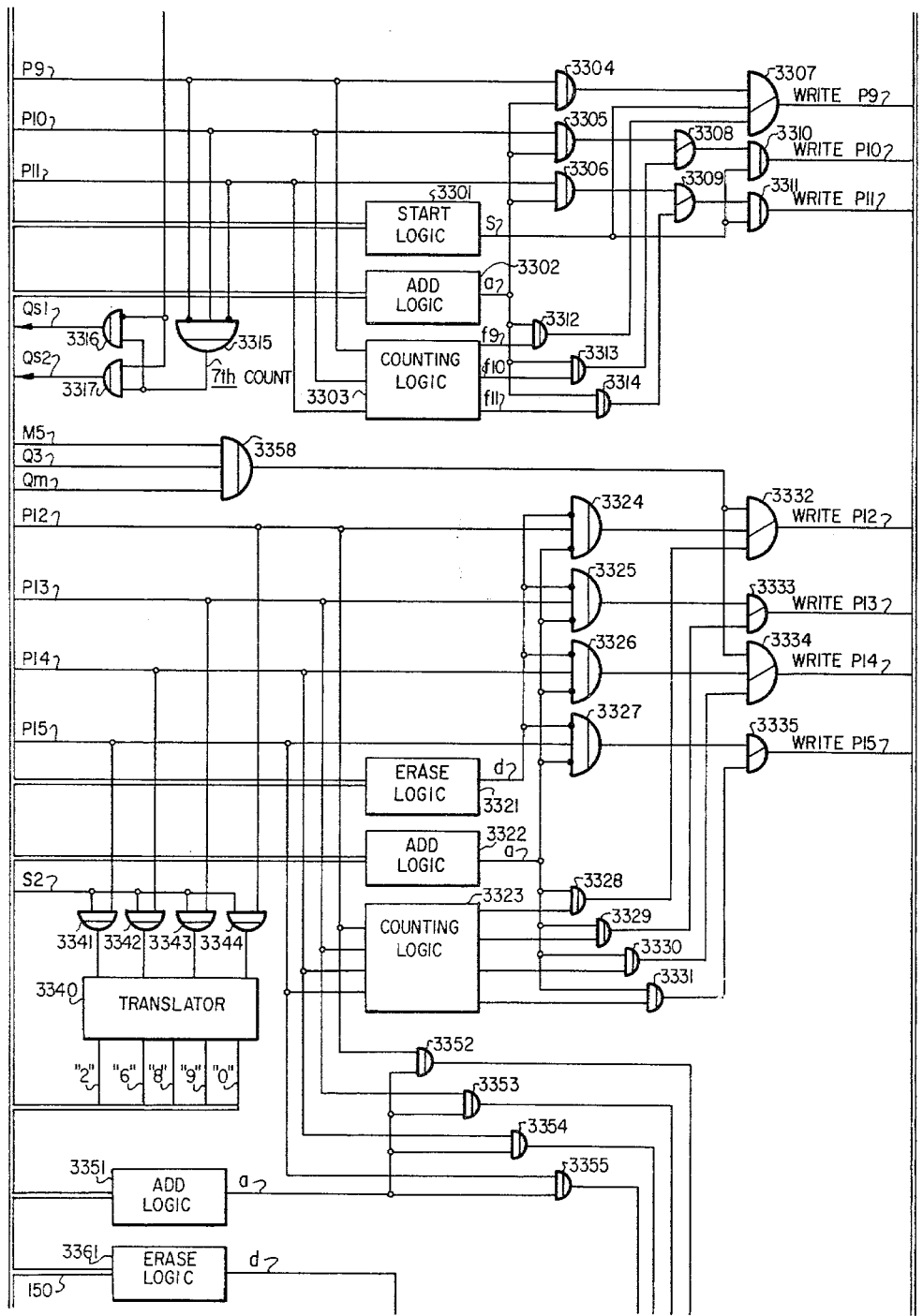
Figure 34:
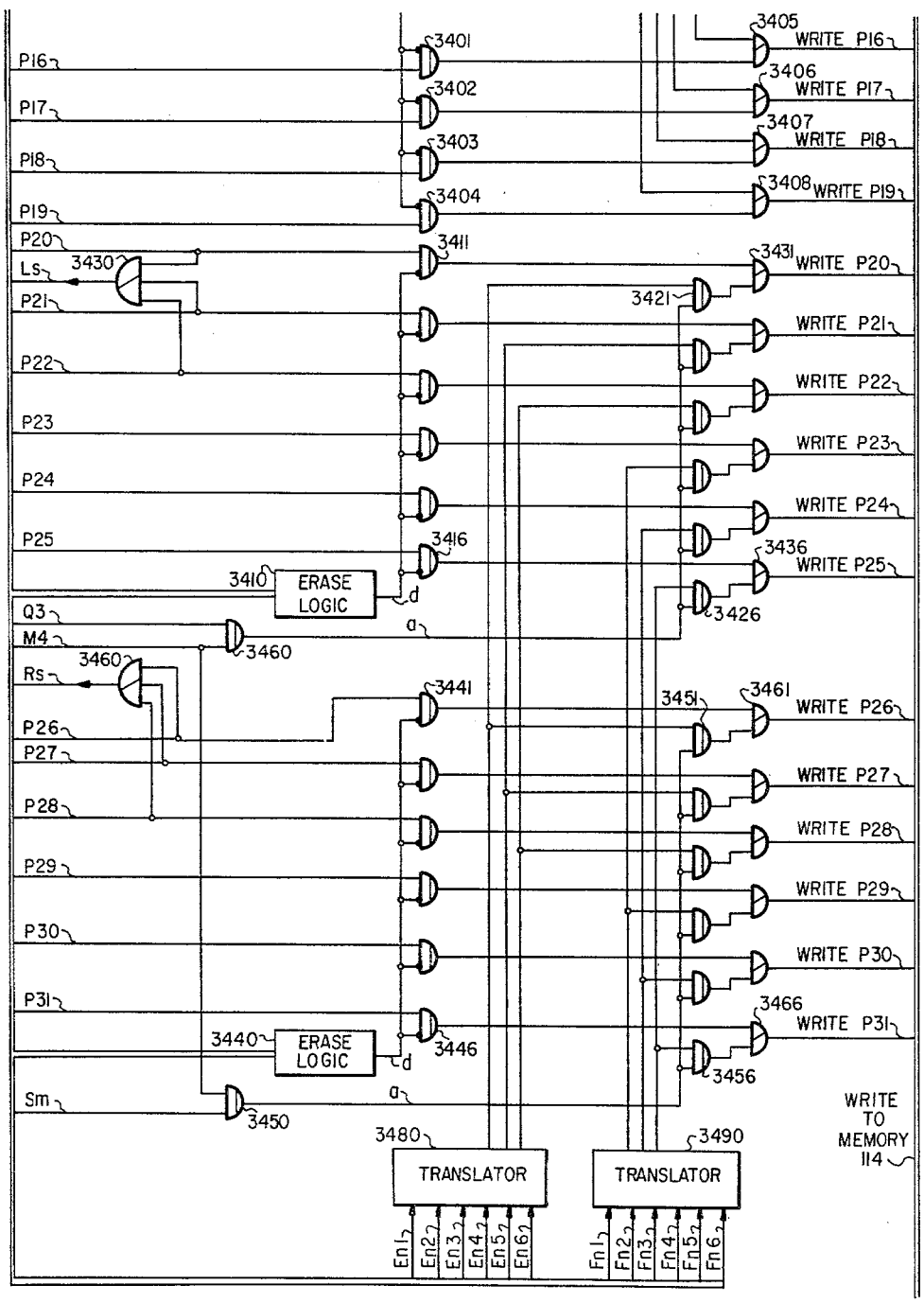

FIGS. 12A and 12B comprise a symbolic diagram showing the parity checking and pathfinding circuits and depicting the form of the principal storage areas within the marker;

FIGS. 13–22 are symbolic block diagrams showing typical connection arrangements through the switching network;

FIG. 23 is a functional block diagram of the attendant's cabinet;

FIG. 24 is a functional block and schematic diagram of an operator's line circuit and a conference line circuit;

FIGS. 25–31 when arranged as shown in FIG. 38 comprise a functional block diagram of the marker;

FIGS. 32–34 when arranged as shown in FIG. 39 comprise a functional block diagram of the subscriber logic control;

FIG. 35 is a diagram showing steps of the interval counter, and its output signals;

FIG. 36 is a symbolic diagram showing the recirculating memory, flip-flops and subscriber logic control;

FIGS. 37-40 show how FIGS. 12A, 12B and 23-34 are to be arranged in four groups.

The system is explained according to the following outline:

OUTLINE
A. GENERAL DESCRIPTION
   A1. The Distributor
   A2. The Memory
   A3. The Marker
   A4. Subscriber Logic
   A5. Switching Network
   A6. Line Equipment
   A7. Trunk Circuits
   A8. Attendant's Cabinet
B. CROSSPOINT NETWORK
   B1. Link Markers
   B2. Junctor
   B3. Operation of Network
C. LINE AND TRUNK CIRCUITS
D. DISTRIBUTOR AND MEMORY
E. LOGICAL CONTROL
   E1. Subscriber Logic
   E2. The Marker
      E2a. Marker States
      E2b. Parity Checker
      E2c. Path Finder
      E2d. Miscellaneous Flip-Flops
   E3. Connections
   E4. The Hunting Sequence
F. ATTENDANT AND CONFERENCE CIRCUITS
G. ESTABLISHING CONNECTIONS
   G1. General
   G2. Local Connection
   G3. Call to Operator
   G4. Outgoing Trunk Call
   G5. Inward Trunk Call
   G6. Transfers
   G7. Meet-me Conference call
   G8. Progressive Conference or Chain Call Connection
   G9. Night Service Connection
   G10. Disconnect
H. TESTING FACILITIES

A. GENERAL DESCRIPTION

Figure 1:
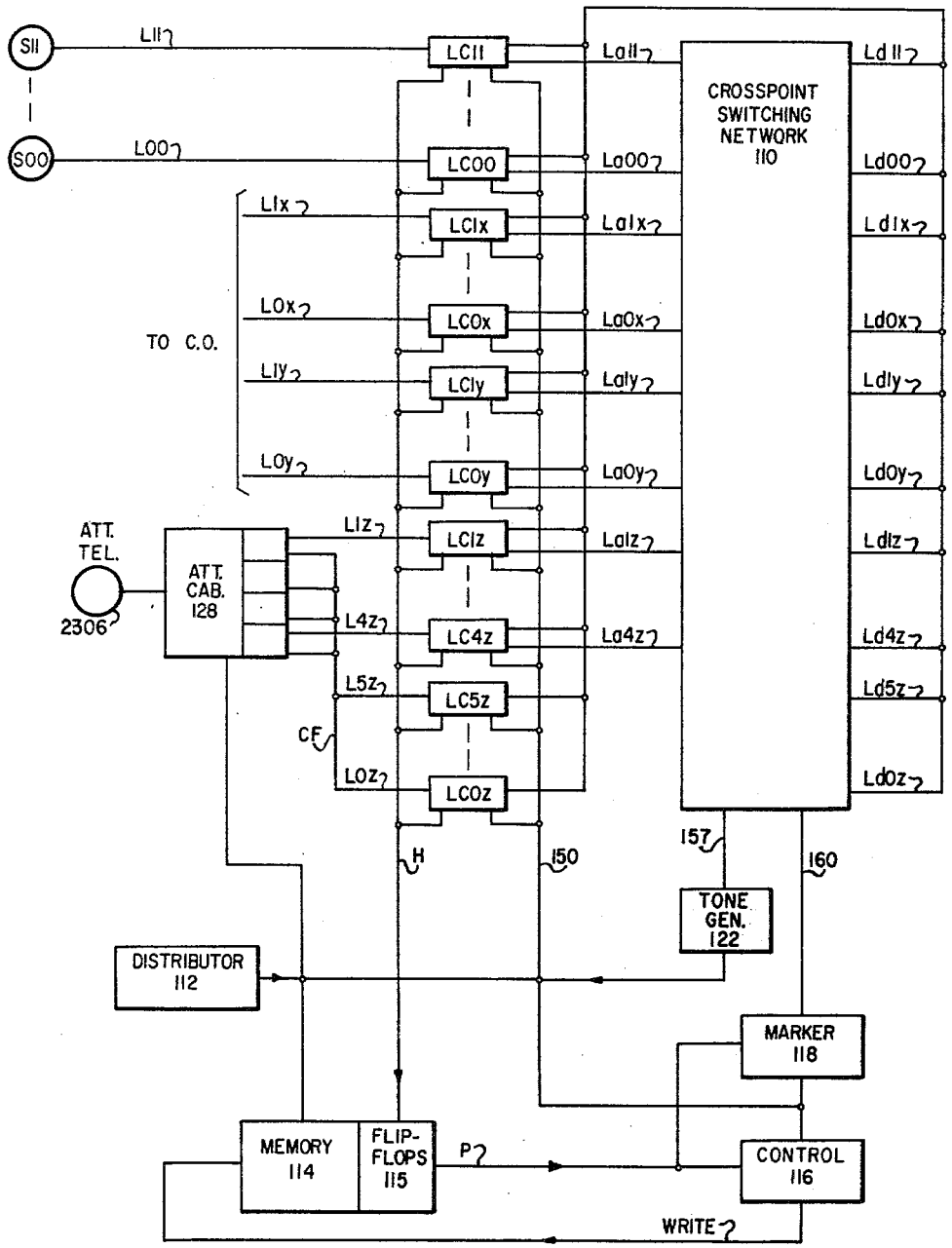
FIG. 1 is a block diagram of a private automatic branch exchange.

It has been chosen to describe the invention as embodied in a 100-line private automatic branch exchange, as shown in FIG. 1 by a block diagram. The system is generally similar to the isolated private automatic exchange (PAX) disclosed in a copending United States patent application by John G. Van Bosse for an Electronic Switching System, Serial No. 845,901, filed October 12, 1959 now U.S. Patent No. 3,133,154. To meet the requirements of a PABX, equipment has been added to provide supervisory signals, conference access, and trunk circuits. The United States patent applications of Donald K. Melvin for an Electronic Switching System and Line Circuits Therefor, Serial No. 85,741 now U.S. Patent No. 3,136,863; of Ronald F. Kowalik for a Communication Switching Network, Serial No. 85,875 now Patent No. 3,055,982, both filed January 30, 1961 and of R. P. Sanders, J. G. Van Bosse, and D. K. Melvin for an Electronic Switching System, Serial No. 145,680, filed October 17, 1961, relate to some of the PABX features.

As shown in FIG. 1, the PABX serves one hundred local lines L11–L00, ten PBX trunks L1x–L0x, ten two-way dial trunks L1y–L0y, six lines L5z–L0z for a meet-me conference circuit CF, and four operator circuits L1z–L4z to an attendant's cabinet 128. The transmission paths between these lines may be selectively established by way of the line and trunk circuits LC11–LC0z and a crosspoint network 110. The exchange provides trunk transfer facilities, trunk restriction for selected subscribers, and night service. There are direct trunk facilities which allow the operator to link her telephone directly to a trunk, thereby bypassing the electronic exchange in the event of malfunction. The telephones for the PABX subscribers are conventional telephone instruments modified for tone ringing. A three-digit number scheme is used in which the first digit is used to access the particular service desired. The digit 6 is for local calls, digit 8 for conference, digit 9 for trunks, and digit 0 for operator service. The exchange uses semiconductor components including diodes and transistors. The crosspoint elements of the network 110 are four-layer diodes.

A1. THE DISTRIBUTOR

The control actions in this system are on a time-division basis. The distributor 112 is a pulse train generator which supplies a series of pulses to synchronize the different parts of the system. Since it is an independent unit, receiving no input from other parts of the system, it is able to generate independent commands, assuring the execution of logical operations in the proper sequence.

A wide variety of pulse-trains are produced and fed as separate outputs to the rest of the system. Each pulse-train has a specific position in time with respect to each other pulse-train. In this manner, a certain period of time can be defined by the presence of one or more of the pulses.

This PABX has 130 time slots, each slot being 123 microseconds long. The time slots are divided between one hundred local subscribers, twenty trunks, four operator circuits, and six conference circuits. The system cycle is 16 milliseconds (130 time slots times 123 microseconds). The distributor generates the following pulses:

(1) Tens pulses, equal to 13 time slots (1.6 milliseconds).

(2) Units pulses, equal to 1 time slot (123 microseconds).

(3) Interval pulses, equal to 7.7 microseconds.

A2. THE MEMORY

This PABX employs a ferrite-core temporary memory 114 of 130 words that is, a word is assigned to each PABX subscriber, trunk, operator, and conference circuit. Each word has 31 bits which gives various information about the status of the subscriber (or trunk, operator, or conference circuit). The flip-flops of unit 115 provide buffer storage for supplying output signals from the memory 114 to the control 116 and marker 118.

A3. THE MARKER

The marker 118, a decision making intermediary between PABX subscribers and the switching network, is a logical network which may be considered to be stationary with respect to the periodic time reference established by the distributor 112. It is capable of reviewing the status of each subscriber in turn. Basically, the marker 118 is the means by which information is conveyed from one subscriber time slot to another, and is the logical network that supervises the establishment and termination of audio paths through the switching network.

The marker 118 consists of a number of bistable storage and coding devices (flip-flops), logic building blocks (NOR gates), a parity checker, and translation matrices. The parity checker is a comparison network that yields an output signal when the input from one source is found to be identical with the input from a second source. Information is supplied to the switching network in different codings. Consequently, a translation matrix is used to translate these different codes and subsequently transfer this translated information to the switching network.

A4. SUBSCRIBER LOGIC

The subscriber logic control unit 116 is a NOR-gate logical network, the function of which is to convert the information in the ferrite-core memory 114 in each subscriber's time slot into a form descriptive of the condition of the subscriber. It also acts on this information, and on the marker information, and multiplex highway information, in such a manner as to determine what information should be written into the memory at the end of each time slot. Subscriber logic is used by each subscriber during the time assigned him.

Subscriber logic is composed of bistable storage elements (flip-flops) and logic building-blocks (NOR gates).

A5. SWITCHING NETWORK

The purpose of the switching network 110 is to provide a means of establishing and maintaining an audio connection between selected lines and trunks. The network consists of a four-stage crosspoint array which uses PNPN diodes as crosspoint switches. Each stage consists of groups of matrices made up of vertical and horizontal rows of connections where a PNPN diode is connected at each crosspoint. Each subscriber's line equipment is connected to both ends of the network so that a subscriber may act as either a calling party or a called party, or both. A split junctor is used in the center of the network for applying part of the potentials to the crosspoints, gating the ringback and ringing signals, and supplying the necessary holding current to the PNPN diodes. In addition, the switching network provides the facilities for breaking down the audio connection, once the subscribers have concluded their conversation.

A6. LINE EQUIPMENT

Each PABX subscriber, PBX trunk, two-way dial trunk, operator circuit and conference circuit has an associated line circuit LC11–LC0z. Each line circuit terminates its line loop and also provides an audio connection to the crosspoint switching network. Each subscriber line circuit LC11–LC00 has sensing elements that reflect the conditions of its line loop; by opening and closing the line loop with either the hookswitch or dial springs, a subscriber may make his intentions known. The line circuit also determines when certain supervisory signals should be supplied to a subscriber.

A7. TRUNK CIRCUITS

There are facilities for ten two-way dial trunks (permitting in-and out-dialing) and ten PBX trunks (on which all incoming calls are directed to the attendant's cabinet). Associated with the trunks are a number of NOR gates, flip-flops, relay drivers, and relays. These components and circuits are arranged in such a way as to enable the electronic PABX to function with the electromechanical, step-by-step, central office.

Only unrestricted subscribers may dial directly over trunks to the central office. A restricted subscriber may obtain a trunk via the operator.

Incoming PBX trunks are always directed to the operator unless night service facilities are provided. Two-way dial trunks may dial directly into the PABX.

A8. ATTENDANT'S CABINET

In this system, the attendant's cabinet is a cordless, desk-mounted, turret-type cabinet. Besides providing regular attendant's service on incoming calls, it provides night service, conference, transfer, and intercept facilities.

There are four operator lines, each having an appearance on the cabinet of a conference key, a three-position answer key (normal, answer, and hold) and two lamps (local and trunk) which flash when the operator action is desired and burn steadily when attendant answers.

B. CROSSPOINT NETWORK

FIG. 2 is a symbolic showing of a typical 3 x 3 matrix of crosspoints. Each horizontal input lead terminates in a transformer winding, representing a subscriber's line transformer. The vertical output leads are connected via respective resistors 214, 215, 216 to a positive voltage source $V_{bb}$. The switches 217, 218, 219 on the crosspoint side of the resistors permit these points to be switched to ground. The capacitors 231, 232, 233 provide outputs to other circuits. The switches 241, 242, 243 appear on the respective subscribers' links and serve to supply a negative potential.

The circuit operates as follows: Assume subscriber 202 is to be connected to output 212. The first action is the marking of the subscriber link. Switch 242 is operated, causing line 205 to go negative. The slow rise time is due to the capacitor 208, and is provided to minimize false firing due to "rate effect."

Since the connection is to be to link 252, switch 218 is operated, permitting the potential on link 252 to rise toward $+V_{bb}$. As soon as PNPN diode 222 sees its full breakdown potential it turns on. The capacitor 208 charges towards the positive potential determined by the voltage-divider. As soon as the potential on link 205 rises above ground, diode 245 starts conducting and link 205 is held close to ground, as determined by the direct voltage drop of the transformer winding and diode 245. Switch 242 is then returned to its original position, causing the capacitor 208 to charge positively, reverse-biasing diode 246 and electrically removing the link marking circuit from the link. Assuming resistor 215 has been selected small enough to provide the holding current for the PNPN diode, it will remain in its "on" state and the connection is established.

At the termination of the call a crosspoint is returned to its "off" state by the operation of the switch 218 which supplied the positive firing potential. Returning this switch 218 to its ground signal diverts the holding current of the crosspoint to ground and it reverts to its "off state."

Figure 3:
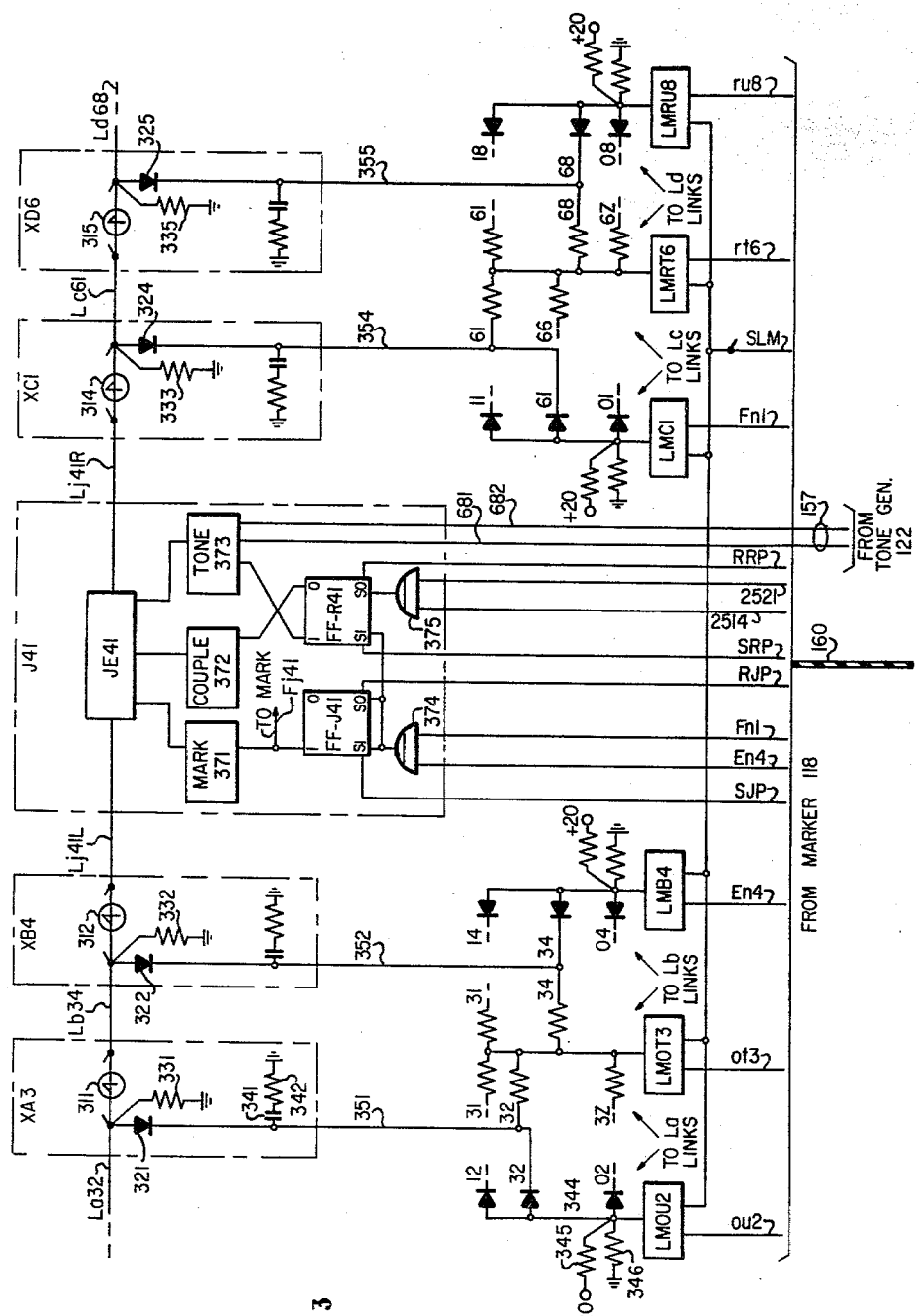
FIG. 3 is a symbolic and functional block diagram of a typical connection through the crosspoint switching network.

To form the network 110 several of these matrices are connected together. As in the original PAX, the network used here is a four-stage network, symmetrical about a center junctor. The junctor serves to join the two halves of the network, and supplies the positive half of the crosspoint breakdown voltage. FIG. 3 is a schematic and block diagram of the four-stage network 110. Only one of the matrices of each stage is shown, and in each matrix only one input link and one output link and the crosspoint diode between them is shown. It should be noted that each subscriber appears on both sides of the network. The system control requires that all calls originate on the left side of the network (XA matrix) and terminate on the right side (XD matrix). The two inner matrices are designated XB and XC (left and right of center, respectively). The fact that each subscriber's line equipment has two connections into the transmission network permits the subscriber to be connected as both a calling and a called party. This in turn has many benefits, for it permits such features as chain conference calls, trunk transfer, operator intercept, etc. The full network 110 has ten XA, six XB, six XC, and ten XD matrices; and thirty-six junctors. Each B matrix has a junctor common to each XC matrix. Each XA and XD matrix is a 13 x 10 coordinate crosspoint array; and each XB and XC matrix is a 10 x 6 array.

A subscriber address (number) is a two-digit number and is determined by which XA and XD matrix the subscriber is in, and his position in the matrix. Thus a subscriber located in XA matrix 2 in the third level, would have his address formed by tens digit 2 and units digit 3, which is simply 23. Similarly the junctor address is a two-digit number based on the number of the XB and XC matrices it connects; the first digit refers to the XB matrix, the second to the XC. Thus a junctor joining XB matrix 1 to XC matrix 2 would be addressed as 12. Any subscriber can be connected to any other subscriber, using any junctor.

As shown in FIG. 3, the switching network 110 includes a number of link markers for controlling the marking potential applied to the individual links to establish a connection. There are six sets of such link markers, one marker of each set being shown on the drawing. The selection of the calling line is controlled by originating units and tens markers such as LMOU2 and LMOT3. The selection of the called line is controlled by terminating tens and units markers such as LMRT6 and LMRU8. The selection of the junctor is controlled by markers such as LMB4 on the left side of the network, and markers such as LMC1 on the right side of the network. All of these link markers are identical, and one of them, LMOU2, is shown by a schematic diagram in FIG. 4. A simplified equivalent circuit of the equipment for marking one link, La32, is shown in FIG 5.

The network includes thirty-six junctors, one of which, J41, is shown in FIG 3. The junctor includes an equipment unit JE41, three transistor switch units 371, 372 and 373; two flip-flops FF-J41 and FF-R41; and two input AND gates 374 and 375. The junctor is shown in functional block and schematic diagram in FIG. 6. The mark switch 371, comprising transistor 671, is used to control the marking of the junctor link LJ41 to both sides of the network. The tone switch 373, comprising transistor 673, is used to control the connection of ringback and ringing tone to the network. The couple switch 372, comprising transistor 672, is used to control the decoupling of the two halves of the junctor link during ringing.

B1. LINK MARKERS

Each of the links is marked by way of a sub-link. For example link La32 has associated therewith a sub-link comprising conductor 351, diode 321, resistor 331, capacitor 341, resistor 342, a diode connection to marker LMOU2, and a resistance connection to marker LMOT3. Functionally, each link marker receives switching commands from the marker, and delivers a marking voltage to the sub-links. When both link markers common to a sub-link supply this voltage to the sub-link, conditions are correct for the sub-link to apply minus $Vb/2$ to its associated link. Each units link marker such as LMOU2, and each B link marker such as LMB4, is connected through respective diodes to a plurality of sub-links; and each tens link marker such as LMOT3 is connected through respective resistors to a plurality of sub-links. Also each units, B, and C link marker has its output terminal connected through a resistor such as 345 to +20 volts, and through a resistor such as 346 to ground. The tens link markers are also connected to this +20 volt source by way of the several diodes and resistors connecting the link markers to the sub-links.

Referring now to the schematic diagram in FIG. 4 of the link marker LMOU2, the input SLM is the A.C. command to the link marker. The A.C. command is the signal which conveys the information as to when the circuit is to operate. Input $ou2$ receives the addressing command; this command designates which circuit is to operate. The transistor 401 is common to a group of link markers. In the steady state condition, the two inputs are at ground potential, and thus transistors 401 and 402 are held in the OFF state. It should be noted that these transistors comprise a transistor AND gate. Resistor 417 and diode 421 form a self-bias network for transistor 403 causing its emitter to be more positive than its base. Thus, transistor 403 is held in the OFF state. The resistance divider 418, 419 keeps the base of transistor 404 negative with respect to the off voltage at the collector of transistor 403. Thus transistor 404 is held off and the final steady state voltage at the collector of transistor 404 is a positive potential.

When inputs $ou2$ and SLM are simultaneously at −10 volts potential, transistors 401 and 402 are turned on and the collector voltage of transistor 402 is close to ground. This forces the base potential of transistor 403 to go positive with respect to its emitter, and transistor 403 turns on. Transistor 404 follows suit and the negative marking potential appears at its collector. It is this negative voltage which is an input to the sub-link. The sub-link circuit takes the inputs from the link markers and applies the negative marking potential to the link.

Referring to the sub-link for link La32 in FIG. 3, it may be seen that each of the link markers LMOU2 and LMOT3 may have either a positive or a negative output signal, making four possible combinations. One of the functions of the sub-link is to act as an AND gate to mark its associated link only when the signals from both associated link markers are negative.

The sub-link must be electrically isolated from the link except when the link is actually being marked. To accomplish this, during the time the link is not being marked, the cathode of diode 321 is always kept at a potential more positive than the maximum positive potential experienced by the link. Another requirement on the sub-link is that the marking potential be applied to the link rather slowly. This is to avoid firing crosspoints which are particularly rate sensitive. These various requirements are met as follows: For the unmarked case neither of the link marker inputs are negative, and the resistive voltage divider comprising resistor 345 and 346 is providing a positive potential sufficient to maintain diode 321 reverse biased. For the case where only the tens input is negative, the potential at the cathode of diode 321 will drop as current flows from the divider 345, 346 via a diode and resistor to the tens link marker; however, the circuit has been designed so that the potential will remain sufficiently positive to keep diode 321 reverse biased. For the case when only the link marker LMOU2 is negative the diode connecting it to conductor 351 becomes reverse biased and the potential at diode 321 remains positive via other sub-link circuits having a common tens input with this circuit. When both inputs to the sub-link are negative the potential at the cathode of diode 321 will go slowly negative as capacitor 341 begins to charge via resistor 342 and the resistor connecting conductor 351 to the link marker LMOT3. The potential on conductor 351 is sufficient to maintain the diode connecting it to the link marker LMOU2 reverse biased. As capacitor 341 charges negatively diode 321 will be forward biased and the negative marking potential will be applied to the link. Resistor 331 serves to provide a leakage current path for the crosspoint and aids in reducing crosstalk.

B2. JUNCTOR

Functionally the junctor (a) supplies the positive half-breakdown voltage to the selected crosspoints, (b) clamps the positive voltage to insure that it never exceeds a value sufficiently positive to fire crosspoints which are not marked with a negative potential, (c) gates ringing and ringback tones on the transmission path, (d) opens the audio connection across the junctor during ringing, and (e) provides the necessary holding current to the four-layer diodes.

Figure 6:
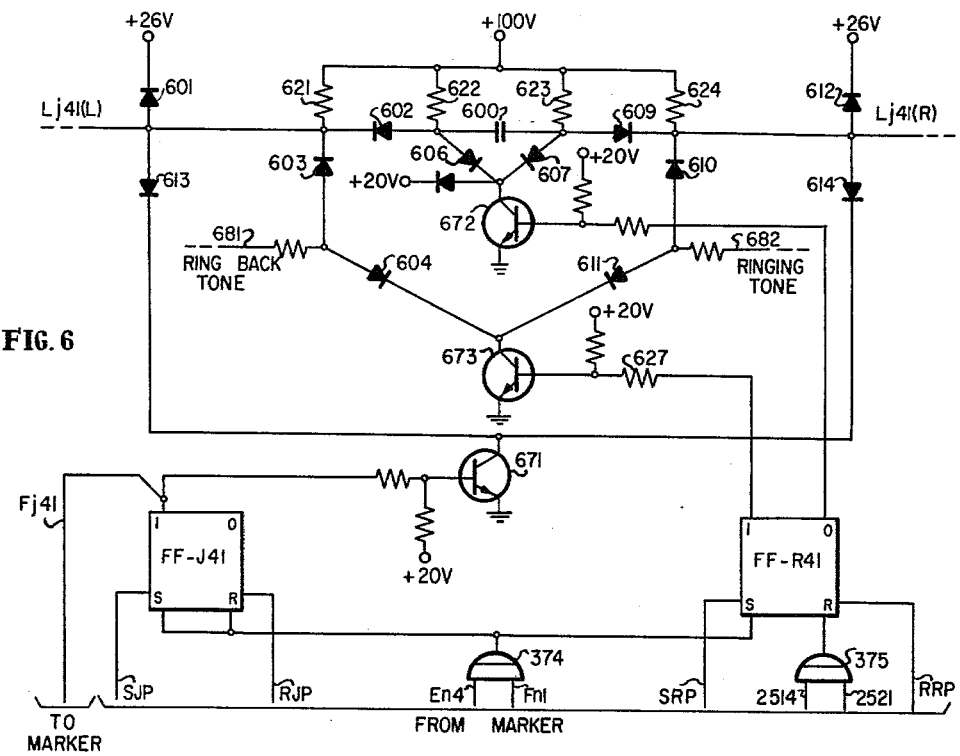
FIG. 6 is a schematic diagram of a junctor circuit.

Referring to FIG. 6, the junctor contains one junctor flip-flop FF–J41 and one ringing flip-flop FF–R41. The junctor flip-flop controls transistor switch 671 which permits the application of marking voltage. The ringing flip-flop controls the tone gate transistor 672 and the transistor switch 673 which opens the audio path during ringing. The flip-flop D.C. commands (address) are supplied from AND gates 374 and 375. These gates are controlled by marker information and provide a means for selecting junctors. The trigger pulses to inputs SJP, RJP, SRP and RRP are furnished by marker-controlled gated pulse amplifiers. The coincidence of both trigger and D.C. commands is required to change the flip-flop state.

The junctor is symmetrical about capacitor 600 and therefore the detailed description of one side will apply to the other side. Assume that initially the junctor is not being used in a connection. Both flip-flops are in the reset state. The output from the junctor flip-flop is near ground potential which biases transistor 671 into saturation. Transistor 671 provides a ground path for the +100 volts through resistors 621 and 622. The potential at the left end of the junctor link Lj41 is determined by the voltage drops across diode 613 and transistor 671. This side of the link is connected to a XB crosspoint matrix, but the potential is too low to break down the four-layer diode even with negative half voltage on the opposite side. The ringing flip-flop FF–R41 has its "1" output near ground potential and biases transistor 673 into saturation. The tone generator supplies an A.C. signal superimposed on a positive D.C. level to the anode of diode 604 and transistor 673 places a ground potential on its cathode. The cathode of diode 603 is at the small positive potential established across diode 613 and transistor 671, and thus the tone finds a ground path through diode 604. The "0" output of the ringing flip-flop FF–R41 is −10 volts which biases transistor 672 into cutoff.

At some subsequent time, the D.C. signals En4, Fn1, 2514, and 2521 are true (−10 v.) and the A.C. command SJP sets the junctor flip-flop FF–J41. The output of this flip-flop is now −10 volts which biases transistor 671 into cutoff. The ground path from the +100 volt source no longer exists and the potential at the left end of the junctor link Lj41 rises toward the clamping voltage +26 volts through diode 601. Assuming that the link markers have applied negative potential, the crosspoints conduct. The holding current is supplied from the +100 volt source through resistor 621. When the A.C. trigger pulse on lead SRP sets the ringing flip-flop FF–R41, transistor 672 is biased into saturation. This permits current to flow from the +100 volt source via resistor 622, diode 605 and transistor 672 to ground. Voltage drops across diode 605 and transistor 672 produce a potential at the anode of diode 606 which reverse biases diode 602 and opens the audio path across capacitor 600. Transistor 673 is biased off and the signal from the tone generator proceeds via diode 603 to the crosspoint network. When the called party answers, the marker applies a signal to reset the ringing flip-flop FF–R41. Transistor 672 becomes cut off and completes the audio path across the junctor. At the same time, transistor 673 is returned to saturaton and removes the tone from the line by reverse biasing diode 603. Talking is now permitted through the junctor.

When the calling party hangs up the junctor flip-flop FF–J41 is reset and the junctor reverts to its idle state.

B3. OPERATION OF NETWORK

The task of selecting which junctor is to be used for a particular call is performed by the marker 118 in an operation called "route selection." Assume the marker receives a request to connect subscriber 32 to subscriber 68, and the route search has found that the call may use junctor J41.

Initially, the junctor J41 is idle, flip-flop FF–J41 is in state "0" and supplies base current to transistor 671 which is in saturation. Transistor 671 carries currents from +100 v. through resistors 621 and 624 and diodes 613 and 614, so the potential at link Lj41 is close to ground. The link markers are "off" and the idle links are also close to ground.

The first step in initiating a connection involves marking the selected links of the route. Since subscriber 32 is to be connected to the left-hand side of the network, marker outputs ou2 and ot3 are energized. Since the connection is to be routed over XB-4, the marker output En4 is energized. During the marking time, the marker-output SLM is also energized. This activates the link markers LMOU2, LMOT3, and LMB4, thereby marking the sub-links 351 and 352 and causing the voltage at links La32 and Lb34 to drop to −½Vb.

A little later the set input of flip-flop FF–J41 is energized by the addressing signals En4 and Fn1 and the connect command SJP from the marker. The flip-flop moves to state "1," cutting off transistor 671, and the voltage at link Lj41 starts rising toward +100 v. When the voltage reaches +½Vb the PNPN diode 312 breaks down, and the voltage at link Lb34 rises. When this voltage reaches the value +½Vb, the PNPN diode 311 breaks down and the voltage at link La32 rises. When this voltage reaches ground, the diode in the line circuit starts conducting. The marker next suppresses the marking command SLM, turning off the link markers and reverse-biasing diodes 321 and 322. A connection is now established from junctor J41 to the line transformer of subscriber 32 through the PNPN diodes 312 and 311, and the link markers have been electrically removed from the links. At the same time a similar process initiates the connection in the right-hand half of the network between junctor J41 and the called subscriber. The four-layer diodes in both branches receive sustaining current through resistors 621 and 624. Voice-frequency currents are carried from one side of the network to the other through capacitor 600 in the junctor circuit.

This situation continues until the marker receives a "disconnect" order, which is accomplished by the address of the junctor that held the connection. In this case, marker outputs En4 and Fn1, addresses junctor J41 are energized. When the disconnect signal RJP appears, the reset input of FF–J41 is energized, and the flip-flop reverts to state "0." In this state, transistor 671 is turned on and saturates. The sustaining current through resistors 621 and 624 is diverted from the PNPN diodes to diodes 613 and 614 and transistor 671. Consequently, the PNPN diodes return to the "off" condition, terminating the connection.

In addition to supplying the positive cross-point firing potential and holding current, the junctor has the task of supplying ringing and ringback tone to the called and calling subscribers, respectively. The junctor must supply standard ringback tone for any trunk subscriber (Central Office). To insure the purity of this tone the audio connection across the junctor is disabled. If a central office subscriber were to hear the system ringing signal superimposed on ringback tone he could easily misunderstand it to be some sort of a wrong number tone signal.

Ringing tone is applied at conductor 682 on the side of the junctor connected to the called side of the network. Ringback tone is applied to conductor 681 on the other side of the junctor. Ringing tone has a peak-to-peak maximum amplitude which is less than two volts, while ringback tone is considerably smaller. The tones have in common the fact that they are superimposed on a +10 direct voltage level. Placing the tones on the line is accomplished by diverting the tones from ground to the junctor output. With transistor 673 saturated, diodes 604 and 611 are forward-biased and the tones are clamped close to ground. To make the tones available at the link, transistor 673 is cut off, removing the ground from diodes 604 and 611. The +10 volts forward biases diodes 603 and 610 and the tones are available to the crosspoint network.

Preventing the tones from being transferred across the junctor is accomplished by reverse-biasing diodes 602 and 609. Normally when it is desired to disable the audio connection across the junctor, the points Lj41L and Lj41R will have a positive potential in excess of +2.5 volts. By saturating transistor 672, the potential at both sides of capacitor 600 is clamped close to ground, and diodes 602 and 609 are reverse-biased. A requirement here is that the value of resistors 622 and 623 be sufficiently small that the diodes 602 and 609 will operate in a linear portion of their characteristics when they are required to carry the audio signals.

The overall operation of the tone gates is as follows. Initially, in the idle state, transistor 673 is saturated and transistor 672 is cut off. Flip-flop FF–R41 is in its reset state.

The command SRP from the marker sets flip-flop FF–R41. As the connection is being established transistor 672 and 673 have changed states as controlled by FF–R41, permitting the tones to propagate to the connected line circuits, and suppressing all transmission across the junctor. The junctor is now in its ringing state. After some time, either the called party has answered the call or the calling party has abandoned it. In either case the marker generates a signal RRP which requires the ringing flip-flop FF–R41 to be reset. The signal RRP is combined with the address of the junctor through AND gate 375 output to reset flip-flop FF–R41. The flip-flop changes state, returning transistors 672 and 673 to their original states. The tones are now not coupled to the talking path, and the subscribers are free to speak.

C. LINE AND TRUNK CIRCUITS

Figure 7:
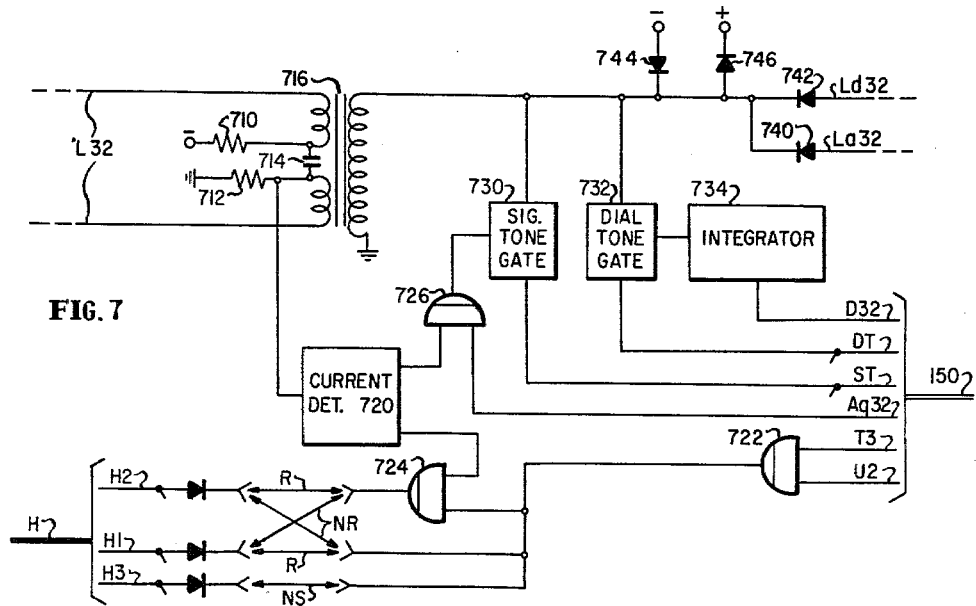
FIGS. 7–11 are functional block and schematic diagrams of line and trunk circuits.

FIG. 7 illustrates a typical subscriber line circuit. The line circuit in this system has several functions in addition to the normal one of providing the termination for the subscriber's line loop. The circuit gives loop supervisory information to the subscriber logic, furnishes dial and busy tone as required, and provides strapping options required to place designated subscribers in special categories.

The resistors 710 and 712, capacitor 714, and transformer 716 form a standard battery feed system for the subscriber's telephone. The two diodes 740 and 742, provide the output connections to the two links L$a$32 and L$d$32 to the two sides of the transmission network. For simplicity the remainder of the circuit is shown in block diagram form.

The system control is concerned with the condition of the subscriber's line loop during the time slot assigned to the subscriber. Therefore, the key circuit of the line circuits is AND gate 722, which forms the subscriber's address. Its inputs are the address of the subscriber from the distributor 112.

One of the main uses of this output is in the multiplex highway conductors designated H1, H2, and H3. Highway conductors H1 and H2 are used to inform the common control of the condition of the line loop. To this end, a current-detector 720 is used to sense the flow of current to the telephone. The output of this detector is combined with the address in AND gate 724. Its output can be strapped to either of the two highway conductors. The highway conductor not receiving this output is fed the output of AND gate 722. This strapping option is used as follows. If a subscriber is permitted to dial a trunk call he is connected by strapping NR to modulate his highway conductor H1, and if he is restricted from this feature he is connected by strapping R to the highway conductor H2. The common control can thus detect the fact that a subscriber is dialing, whether or not he is restricted, and by appropriate timing logic, the digit dialed. Furthermore, if no output appears on either highway conductor, the common control can conclude that no line equipment occurs at this time slot. This permits the number of subscriber lines in use to be changed simply by adding or removing subscribers' line circuits from the system. The common control automatically senses if a particular address is equipped with a line circuit.

Highway conductor H3 is used to designate a party who is to receive calls during the absence of the operator. This could be a night watchman, night foreman, etc. For this feature, the output of AND gate 722 is connected by strapping NS to the highway conductor H3.

Dail tone is applied to the line by means of a tone gate 732 in the line circuit. The common control, during the time slot of a subscriber, generates the signal D32, which actuates an integrating circuit connected as the input to the subscriber's tone gate. The integrator 734 sustains the gate in the "on" condition until the next time this subscriber's time slot appears; the signal is then either repeated or absent. The repeated signal keeps the tone gate on maintaining the tone on the line until such time as the common control fails to supply signal D32. When busy tone is required, the signal D32, is interrupted at the proper rate, and the subscriber accepts the interrupted dial tone as busy tone.

To dial out over a trunk, the system requires that the dial pulses of the telephone be converted to bursts of a tone signal and transmitted to the line circuit of the trunk, where they are reconverted to direct-current loop pulses. When a non-restricted subscriber dials the code number assigned to signify that a trunk is desired, the control network provides the calling line circuit with signal A$q$32. This signal is gated with the output of the current-detector in AND gate 726. The succeeding dial pulses become actuating signals for the tone-signaling gate, and tone bursts are sent out as required.

Figure 9:
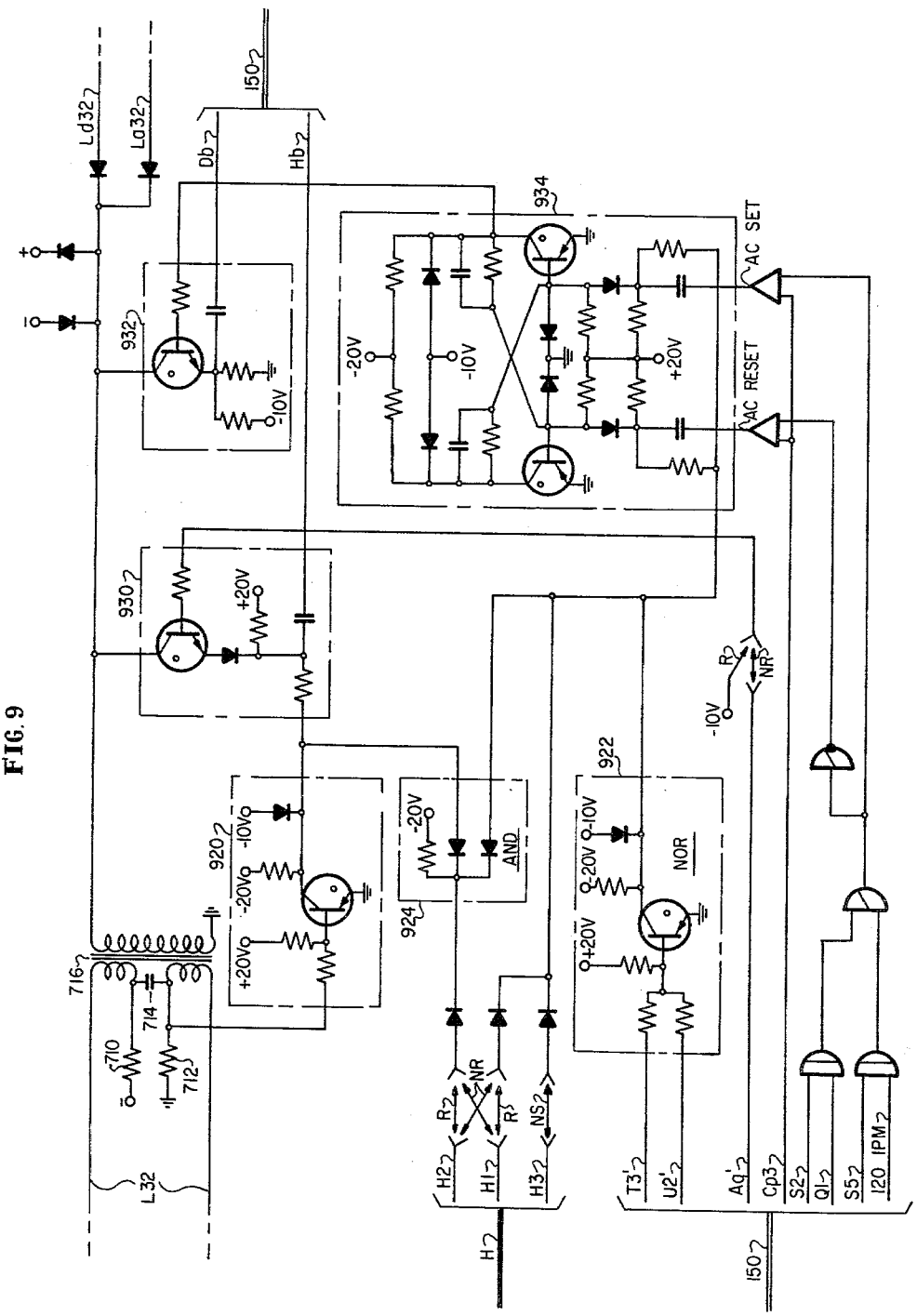

A detailed schematic diagram of a second embodiment of a PABX subscriber line circuit is shown in FIG. 9. Functionally this embodiment produces substantially the same overall result as the line circuit shown in FIG. 7, but there are some differences in detail in the individual circuits. The gate for receiving the signals from the distributor to identify the line's time slot is a NOR gate 922, and the inputs from the distributor are in inverted form. The current detector 920 is an inverter amplifier which is normally in the unsaturated condition so that with the subscriber on hook the output from detector 920 is at —10 volts, which is a "1" condition. The transistor in NOR gate 922 is normally saturated so that its output is at ground. During the time slot of the line circuit this signal goes to —10 volts. When the subscriber's telephone is on hook, during the subscriber's time slot the signal from gate 922 is coupled directly to highway conductor H1 if it is a restricted line and to highway conductor H2 if it is nonrestricted; and the gate 924 is enabled to supply the output signal through highway conductor H2 if it is a restricted line and to highway conductor H1 if it is a nonrestricted line. Thus a line on hook supplies a true signal to both highway conductors H1 and H2 during its time slot. If it is wired for night service the signal is also supplied to highway conductor H3. During the off hook condition, the output signal from 924 does not appear because of the "0" input signal from detector 920. Thus for a nonrestricted line off hook the signal during its time slot on highway conductor H1 is "0" and on highway conductor H2 "1"; and vice versa for a restricted line.

The dial tone gate 932 is a simple transistor amplifier with the control signal applied to its base electrode. Instead of the integrator circuit 734, a flip-flop 934 controlled by signals from the control unit is used. In response to the signal on the highway H, a signal is returned from the control unit, which in conjunction with the D.C. signal from gate 922 sets the flip-flop 934. The output from this flip-flop then actuates tone gate 932 so that dial tone D$b$ is coupled onto the line and transmitted over the subscriber line L32. The subscriber then proceeds to dial, and if it is a local call to another PABX subscriber, the dialing is repeated as time division multiplex signals over the highway H. If the subscriber is nonrestricted and is making an outgoing call over a dialing trunk, the control unit, in response to the initial digit, sets a flip-flop (not shown) in the control unit, the output of which is returned as a signal over conductor A$q'$ to the signal tone gate 930. During the dialing break intervals, corresponding to an on-hook condition, the output from detector 920 is —10 volts which in coincidence with the signal on lead A$q'$ actuates the tone gate 930 to place a spurt of the tone from lead H$b$ on the line for transmission through the crosspoint network. If the called line is busy on either the local or trunk call, the control unit causes the flip-flop 934 to be turned on and off so that interrupted dial tone is coupled through gate 932 onto the line, which is interpreted as busy tone.

Figure 10:
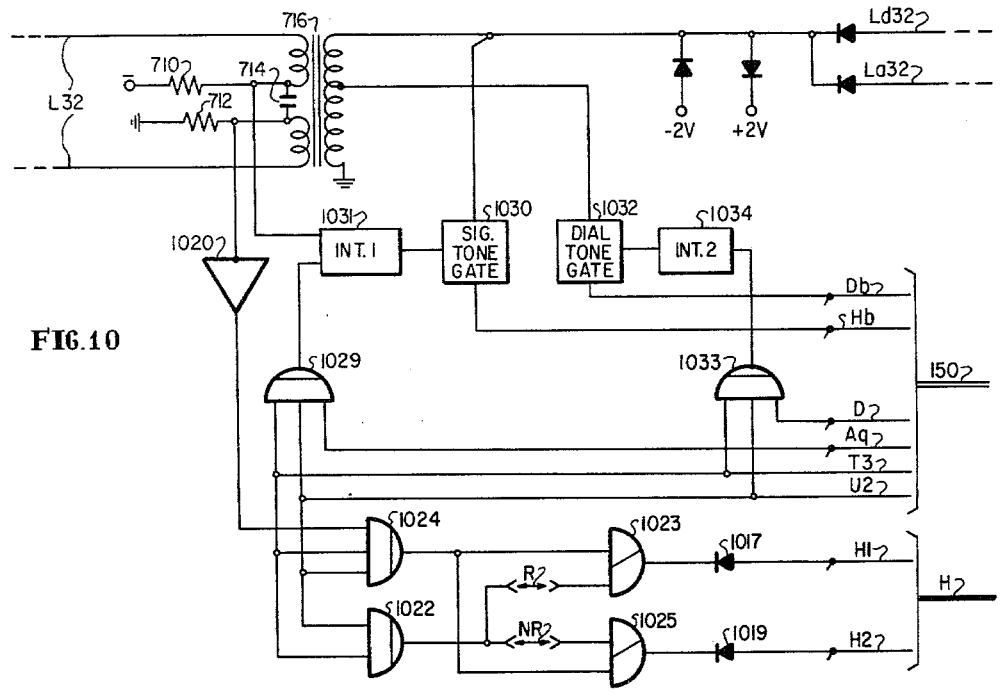

A functional block diagram of a third embodiment of a PABX subscriber line circuit functionally similar to those in FIGS. 7 and 9 is shown in FIG. 10. The current detector 1020 is an inverter amplifier similar to the detector 920 in FIG. 9. The distributor inputs are supplied to AND gates 1022, 1024, 1029 and 1033, to enable each of them during the time slot of the line. When the subscriber is on hook, the output from the current detector 1020 is a "1" and enables gate 1024, so that during the time slot of the line a signal is applied through both OR gates 1023 and 1025 to the two highway conductors H1 and H2. When the subscriber is off hook, the output from detector 1020 is "0" and therefore blocks gate 1024; however, an output signal appears from gate 1022 which is supplied through gate 1023 to highway conductor H1 if the line is restricted, and alternatively for a nonrestricted line through gate 1025 to highway conductor H2. In any of the embodiments of the line circuits, the input to each of the highways must be supplied through an OR gate having one input per line. As shown in FIG. 10, this may comprise one diode per highway conductor in each line circuit, namely, diode 1017 to highway conductor H1 and diode 1019 to highway conductor H2.

The control unit upon detecting a service request, applies the signal on conductor D in the time slot of that line. Gate 1033 is enabled during the time slot and therefore gates the signal from conductor D to the integrating circuit 1034. This supplies a signal to enable the dial tone gate 1032 and couple the dial tone signal Db through transformer 716 to the subscriber line L32. For busy tone signal the TDM pulse signals on conductor D are interrupted so that interrupted dial tone is supplied to the subscriber. If a nonrestricted subscriber is making a trunk call, the control unit supplies a signal on lead Aq in the line's time slot which is gated through gate 1029 to the integrating circuit 1031. There is another input from resistor 710 to the integrator circuit 1031 to repeat the direct current dial signals and enable the signal tone gate 1030 to supply the high frequency tone from lead Hb onto the line and through the crosspoint network to the trunk.

Figure 11:
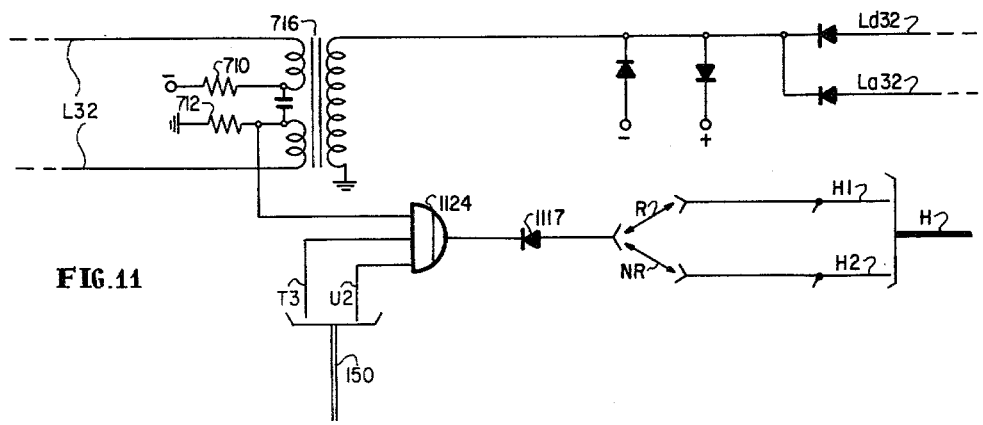

If the code for identifying an unequipped line is not required, the hookswitch supervision arrangement of the line circuit may be simplified, as shown in FIG. 11. An AND gate 1124 has two inputs from the distributor and one input from the resistor 712 of the battery feed circuit. Therefore the output of this gate is "0" when the subscriber is on hook, and during his time slot it is "1" for the off hook condition. For a restricted line this output is coupled through diode 1117 to the highway conductor H1 and for a nonrestricted line to highway conductor H2. Thus for the on-hook condition neither highway conductor will receive a pulse signal, and for the off-hook condition one or the other highway receives a pulse during the subscriber's time slot accordingly as he is restricted or nonrestricted. The diode 1117 is the input of this line circuit of the OR gate to the highway. With the arrangement shown in this figure only one such diode is required per line circuit. The dial tone and signal tone equipment may be as shown in FIG. 10.

Figure 8A:
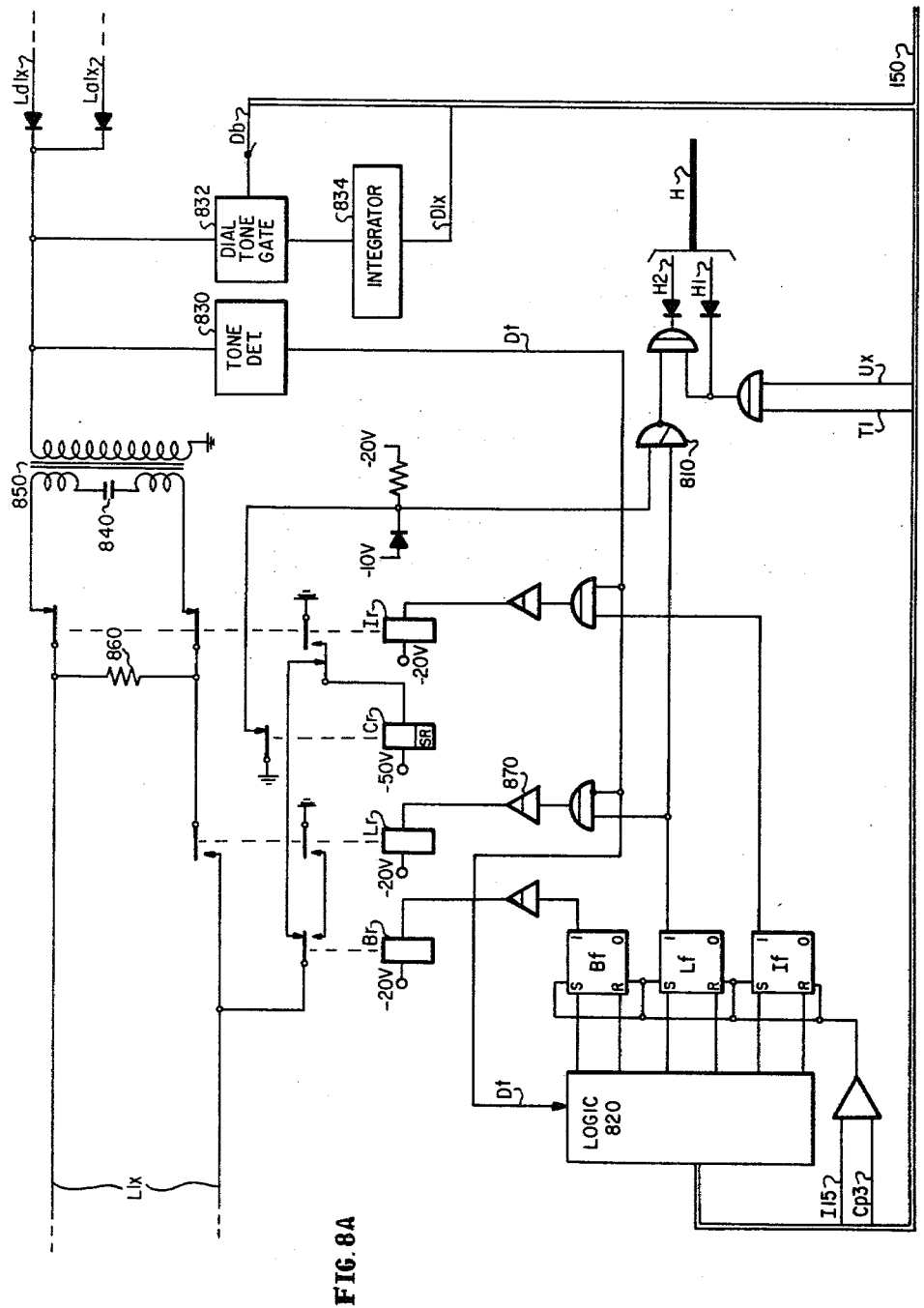

The trunk line circuits shown in FIG. 8A and 8B are quite similar to a subscriber line circuit, for as far as the transmission network is concerned trunks are just other subscribers. As in the standard line circuit, the two diode outputs Ld and La to the transmission network are present. The line transformer is present, and the battery feed is now supplied by relay Sr in the two-way dial trunk. The PBX trunk circuit has the battery feed removed. The trunk line circuits contain relays controlled by electronic components to connect the electronic system to the outside trunk lines. The dial- and busy-tone signaling control is the same as the standard circuit. Busy tone is required for an incoming trunk call. That portion of the highway information necessary for the trunks is developed by the relays.

The unique circuit on the trunk line equipment is the tone detector 830. The tone detector consists of an amplifier (not shown) feeding a tuned tank circuit (not shown). The output of the tuned circuit is rectified and used to trigger a Schmitt trigger circuit (not shown), whose output is coupled into a relay driver circuit.

PBX trunks are accessible by central office subscribers via levels of a trunk hunting connector. Normally all incoming calls over PBX trunks are acted upon by the system logic in such a way as to direct them to the attendant through the crosspoint network. When night service facilities are activated, however, the incoming trunk is routed to preselected PABX subscribers.

When a PBX trunk is seized by the electronic exchange to enable a PABX subscriber to terminate a call into the central office, the trunk circuitry activates conventional line equipment in the central office and creates line loop interruptions in response to the PABX subscriber's dial.

Trunk transfer facilities are existent within the PABX. The PBX trunk circuitry provides means for blocking the audio path to the PABX; thereby allowing the two PABX subscribers involved in a transfer to converse privately.

One of the PBX trunk line circuits is shown in FIG. 8A. Relay Cr has its winding connected to one of the line conductors through contacts of the other relays. Relays Br, Lr, and Ir are controlled by flip-flops Bf, Lf, and If through relay driver amplifiers. Various control signals are supplied via cable 150 to the trunk circuits including inputs to logic units 820 in FIG. 8A and 810 in FIG. 8B. These signals are represented by logical terms, and logical symbolism and equations are used to describe the conditions in the system, including the conditions for producing outputs from these logic units. The logical control is fully explained in a subsequent section E of this description. The D.C. inputs of the flip-flops are supplied from Logic unit 820 in accordance with the following equations.

*Logic 820*

D.C. Set $Bf = M4\ Sm\ Ls'\ Rs'$
D.C. Reset $Bf = (M4\ Sm)'\ Ls'\ Rs' + Dt$
D.C. Set $Lf = M4\ Sm + M17\ Sm$
D.C. Reset $Lf = (M4\ Sm)'\ Ls'\ Rs'$
D.C. Set $If = M4\ Q3\ Rs + S7\ Ls'\ Rs'\ Qs1'$
D.C. Reset $If = (M15 + M16)\ Sm + S7\ Ls'\ Rs'\ Qs1$ An incoming call on trunk line Lix causes relay Cr to operate. Relay Cr allows the true condition to be placed on one of the inputs of NOR gate 810, thereby gating a false condition onto conductor H2 of the H highway during coincidence of T1 and Ux. Since highway conductor H2 is now false and highway conductor H1 is always true, the highway presents a seizure signal to the system logic to process the incoming call. The calling party receives ringback-tone from the trunk hunting connector. Flip-flop Lf is set when the called party (the operator) answers. Relay Lr operates in response to the setting of flip-flop Lf, preparing an audio path for the ensuing conversation and causing the switch-through relay in the trunk hunting connector to operate. If, during the call, the trunk is transferred, the trunk's audio path is interrupted by relay Ir, which operates in response to the setting of flip-flop If.

Capacitor 840 prevents a D.C. path through the line transformer 850, allowing an alternate path through resistor 860. This arrangement eliminates transients during the trunk silencing as described later. Flip-flop If is reset and relay Ir restores, providing the talking path when one of the PABX subscribers involved in the transfer disconnects. When all PABX subscribers have disconnected, flip-flop Lf is reset allowing relay Lr to release and interrupt the audio path. Flip-flop If is set and remains set for approximately 112 milliseconds. Relay Ir is operated for that length of time which in turn keeps the highway marked. Marking a highway for a short period of time insures that the trunk will appear to be busy until the relays in the central office have sufficient time to release.

When an idle PBX trunk becomes connected to a PABX subscriber desiring to make a call through the central office, flip-flops Lf and Bf are set operating relays Lr and Br respectively. Setting flip-flop Lf places a signal on the highway H in the time slot of the trunk, causing the ringing flip-flop in the junctor to be reset. Applying ground to the positive side of the line via the springs of relay Br serves to seize central office equipment. Dial tone is received from the central office. Ground is then removed with the occurrence of the first dial pulse. Relay Lr closes the line loop to the central office and prepares a pulsing path. As the PABX subscriber dials, an 8 kc. tone is gated onto the crosspoint path joining the subscriber and the trunk. The tone is detected by detector 830 in the line circuit of the trunk and transformed into true and false signals gated to relay driver 870. Relay Lr pulses the line to the central office in response to the detected 8 kc. tone gated by the PABX subscriber's dial. Relay Ir operates during out-dialing to prevent injury to the trunk's line transformer. Trunk silencing and disconnecting operations are performed in precisely the same manner as an incoming call.

Referring now to FIG. 8B, the two-way dial trunks are those trunks between a central office and PABX that allow central office subscribers to dial PABX subscribers directly. The D.C. inputs to the flip-flops are supplied by Logic unit 810 as follows:

*Logic 810*

D.C. Set $Rf = M17\ Sm$
D.C. Reset $Rf = Ls'\ Rs'$
D.C. Set $Mf = M4\ Sm$
D.C. Reset $Mf = (M4\ Sm)'\ Ls'\ Rs'$
D.C. Set $Tf = S2 + S3 + S4 + M5\ Q3\ Ls\ Rs$
D.C. Reset $Tf = (M15 + M16)\ Sm$
$\quad\quad\quad\quad + (S2 + S3 + S4)'\ (Ls\ Rs)'$ The central office seizes a two-way dial trunk by closing the line loop, causing relay Sr to operate. Relay Sr follows the line loop interruptions effected by the central office. Flip-flop Tf operates relay Tr to prevent damage by line transients during in-pulsing. The PABX system logic records the dialed information and establishes a connection to the called PABX party.

Supervisory signals are generated within the PABX. Flip-flop Rf is set and relay Rr operates to give answer supervision when the called party answers. Should a transfer take place during the conversation, flip-flop Tf is set and relay Tr is operated to block the audio path to the PABX until one of the PABX subscribers involved in the transfer disconnects. When all PABX subscribers have disconnected from the trunk, all flip-flops are reset releasing all relays and restoring the idle condition.

When the trunk is seized by a PABX subscriber, relays Mr and Rr are operated by the setting of flip-flop Mf. Relay Mr seizes the central office equipment. Dial tone is supplied to the PABX from the central office. Tone detector 830 transforms the 8kc tone from the line into true and false logical quantities which are gated through relays Pr and Tr, outpulsing to the central office. Relay Tr is operated to prevent damage to the line transformer 820 inflicted by transients during dialing. With the completion of each dial pulse train relay Tr is released, preparing the audio transmission path. Silencing and disconnecting procedures are the same as described for an incoming call.

D. DISTRIBUTOR AND MEMORY

The basic distributor cycle has a duration of 16 milliseconds divided into 130 time slots of 123 microseconds each.

An interval counter (not shown) makes one step each 7.7 microseconds, and has a cycle of 16 steps. Thus each cyce is equal in duration to one time slot. The 16 steps are shown in the diagram of FIG. 35. The output signals I3, I14, I15, and I16 each have a duration of one interval step and occur during the corresponding step as indicated in FIG. 35. The output signals I6, I8, I10, and I12 each have a duration of two steps and occur during the intervals as shown in FIG. 35. During the signal I3 the memory information is read into the flip-flops P1–P31 and the signals from the highway H are read into the flip-flops HS1 and HS2. The signals I6, I8, I10, and I12 are used to trigger the exchange of information between the control unit 116 and the marker 118. The signal I14 is used to trigger the writing of information into the memory from the control unit 116. The signal I15 is used to cause the marker to change state when necessary. The signal I16 is used to reset the flip-flops P1 to P31 and HS1 and HS2.

The units counter (not shown) makes 13 steps each equal in duration to one time slot (123 microseconds). The output signals U1 to U9, U0, Ux, Uy, and Uz, occur respectively during these 13 steps. There are also four output signals Uc1, Uc2, Uc3, and Uc4 which represent the units digit in binary code.

The tens counter (not shown) makes one step every 13 time slots (1.6 milliseconds) and produces as outputs the tens signals T1 to T9 and T0. There are also four output leads TC1, TC2, TC3, and TC4 which represent the tens digit in binary code.

A clock pulse Cp3 of 1.9 microseconds duration occurs at the end of every 7.7-microsecond interval. A clock pulse Cp4 occurs at the end of every even step of the interval counter. Thus during the double intervals I6, I8, I10 and I12 the signal Cp4 will occur at the end of each.

The distributor also supplies a long count signal Lc which has a duration of one cycle (16 milliseconds) and occurs approximately once every two seconds.

The memory is shown symbolically in FIG. 36. The principal portion of the memory comprises 31 memory core planes 3602. Each of these planes contains 130 cores. Therefore the memory accommodates 130 words of 31 bits each. Circuitry is connected between the leads from the distributor and the memory core planes, so that during each time slot one core per plane is controlled. The input is selectively controlled by the 31 drivers 3601, and the output is taken through 31 amplifiers 3603 to the flip-flops P1 to P31. Thus during the interval I3 of each time slot the memory core planes are supplied with read current to the corresponding core of each plane, and the output is detected by the sense amplifiers to selectively set the flip-flops P1 to P31 in accordance with the output signals. The flip-flops HS1 and HS2 are also selectively set at this time in accordance with the signal conditions on the highway conductors H1 and H2. This information is then available to the subscriber logic control unit 116 and may be selectively modified during the time slot. At the end of the time slot the new signal conditions appear on the output leads write P1 to write P31. These signals are supplied to the inputs of the respective drivers 3601, and during interval I14 the information is selectively written into the corresponding core of each of the planes 3602. A discussion of the memory is found in conference paper CP61–478 published by the American Institute of Electrical Engineers, entitled, "Philosophy of Design of the Ferrite-Core Memory for A 100-Line Crosspoint P–A–B–X," by J. P. Shuba.

E. LOGICAL CONTROL

The system (FIG. 1) uses a space-division transmission concept in which a PNPN silicon diode is employed as the crosspoint element within a four-stage switching network 110. Control logic or subscriber logic 116 is shared by subscribers through time-division techniques. A system clock and a logic-distribution network (distributor 112) establish a 16-millisecond machine cycle and subdivisions thereof that regulate the multiplexing operation. Pertinent information concerning each subscriber is retained within a ferrite-core memory 114 during the period subscriber logic is not at the subscriber's disposal. The marker 113 is a logic network that is stationary with respect to the time reference established by the distributor, and therefore capable of reviewing the status of each subscriber on a one-at-a-time basis. The marker is used to convey information from one subscriber to another and to perform the function from which it derives its name: that of marking the path through the crosspoint switching network that is to be used for a pending connection.

Boolean algebra is used to express the logic conditions of the system. In the equations the addition symbol (+) is used for the OR function, the multiplication symbol (express or implied) is used for the AND function, and the prime symbol (') for inversion. In actual construction, NOR logic is used. However for convenience in the drawing, some logic conditions are shown by AND, OR, or NOR gates. A small circle at an input or output of a gate indicates inversion. The flip-flops require coincidence of a D.C. and an A.C. input to set or reset them. The D.C. inputs are shown opposite the outputs, and the A.C. inputs are shown at the sides.

E1. SUBSCRIBER LOGIC

Because there are, in all, 130 lines, or subscribers, within the system, the distributor divides the 16-millisecond machine cycle into one hundred and thirty 123-microsecond divisions called time slots. The time slot is further sub-divided into 16 equal intervals of 7.7 microseconds duration each.

In forming time slots, the distributor generates 13 units pulses (denoted U1, U2, U3, . . . U9, U0, Ux, Uy, Uz) of 123 microsecond length and recurring sequentially every 1600 microseconds, and 10 tens pulses (designated T1, T2, . . . T0) of 1600 microseconds' duration which recur every 16 milliseconds or, in other words, every machine cycle. A complete units pulse train is contained within each tens pulse. The coincidence of a units pulse and a tens pulse designates a time slot. Time slot 68, for instance, would be generated by the simultaneous occurrence of T6 and U8.

Each subscriber is permanently assigned a time slot during which his status is analyzed by the subscriber logic and reviewed by the marker. The one hundred time slots having units pulses U1–U0 are assigned to local PABX subscribers, the ten time slots having units pulse Ux are assigned to PBX trunks, and the ten time slots having units pulse Uy are assigned to the two-way dial trunks. The four operator lines use the time slots having tens pulses T1–T4 respectively and units pulse Uz, and the six meet-me conference lines use the time slots having tens pulses T5–T0 respectively and units pulse Uz. By interrogating the distributor, the marker may readily discern the identity of the subscriber.

Three separate multiplex highway conductors (H1, H2, and H3) inform the subscriber logic of conditions existing within the subscriber's line circuit. H1 and H2 are generated in such a way as to reflect the condition of the line-loop (open or closed) and, as well, the status of a subscriber with regard to trunk restriction. The resulting code appears below.

H1 H2—Idle Line
H1' H2—Unrestricted Subscriber Off Hook
H1 H2'—Restricted Subscriber Off Hook
H1' H2'—Unequipped Line A subscriber's line-loop condition, as seen by the subscriber logic, must remain constant for the duration of the time slot in order that all activities occurring within the time slot will be based on the same information. H1 and H2 are therefore sampled early in the time slot of the subscriber, and their sense retained within bi-stable multivibrators (flip-flops) Hs1 and Hs2 for the duration of the reviewing period.

A third multiplex highway, H3, will exhibit a binary "1" within the time slot of a subscriber designated to be the recipient of incoming PBX trunk calls during night service operation. The signal emanates from the subscriber's line circuit, and its binary value is determined by a strapping option.

As has been noted, H1, H2, and H3 are multiplex quantities. Each of the signals is generated within the line equipment of each subscriber, is associated with the distributor address of the subscriber, and is funnelled into the subscriber logic via a logical network which is, in effect, a 130-input OR gate.

Permanently associated with each time slot, and therefore with each subscriber, is a 31-bit memory-word that retains, between reviewing periods, pertinent information concerning the subscriber's activities as follows:

| Bits | Information |
| --- | --- |
| 1–3 | Subscriber action. |
| 4–5 | Relationship to marker. |
| 6 | Connected to a trunk. |
| 7 | Last cycle line loop condition. |
| 8 | Long count timer control. |
| 9–11 | Timer. |
| 12–15 | Digit counter and storage. |
| 16–19 | Digit storage. |
| 20–22 | Calling Party's routing register: "B" switch number. |
| 23–25 | "C" switch number. |
| 26–28 | Called party's routing register: "B" switch number. |
| 29–31 | "C" switch number. |

The money-word is read into 31 buffer flip-flops early in the subscriber's time slot; near the end of the time slot the information, as revised by subscriber logic, is written into the memory.

The first three bits of the memory-word form a code as shown in Table I, which is descriptive of the activity in which the subscriber is engaged. The eight resulting states are designated S1, S2, . . . S8.

TABLE I

| State | Description | P1 | P2 | P3 |
| --- | --- | --- | --- | --- |
| S1 | Idle | 0 | 0 | 0 |
| S2 | Dialing First Digit | 1 | 0 | 0 |
| S3 | Dialing Second Digit | 0 | 1 | 0 |
| S4 | Dialing Third Digit | 1 | 1 | 0 |
| S5 | Receiving Busy Tone | 0 | 0 | 1 |
| S6 | Connected—Not Talking | 1 | 0 | 1 |
| S7 | Connected and Talking | 0 | 1 | 1 |
| S8 | Disconnecting | 1 | 1 | 1 |

The next two bits form a second code (Q1, Q2, . . . Q4) as shown in Table II, that indicates the relationship between the subscriber and the marker.

TABLE II

| State | Description | P4 | P5 |
| --- | --- | --- | --- |
| Q1 | Idle | 0 | 0 |
| Q2 | Demanding The Marker | 1 | 0 |
| Q3 | Being Serviced by the Marker As A Calling Party | 1 | 1 |
| Q4 | Selected by the Marker as a Called Party | 0 | 1 |

A subscriber who is a called party and has dialed the number of a second subscriber is, if he is not connected to a trunk, attempting to establish a chain call. If however, the subscriber is presently engaged in conversation over a trunk, the system must react by performing the operations necessary to affect a trunk transfer. It is apparent, then, that the system must be able to discern which subscribers are connected to trunks. Bit 6 of the memory word serves this end; a binary "1" is stored in bit six whenever a subscriber is involved with a trunk.

Memory bit seven will contain a binary "1" if, during the previous reviewing period, information on the multiplex highways indicated that the subscriber's line-loop was closed. By comparing bit seven to the current status of the line-loop, the transition from open loop to closed loop or from closed to open may be detected.

Bits 9, 10, and 11 form a counter capable of counting from zero to seven. Although the counter has been adapted to other uses, its primary function is to determine the length of time between changes in line-loop condition during states S2, S3, and S4 in which dialing activity occurs. The counter begins to count when the first change in the loop condition is detected and advances one count every machine cycle that the line-loop status remains unaltered. When the line-loop condition changes before the counter reaches a count of seven, the counter reverts to a count of one and begins to count again. When counting in this mode, the realization of a count of seven generates the intermediate quantity $Qs1$. This signal is interpreted as meaning that the line-loop condition has remained unchanged for a period of 16 milliseconds times seven, or 112 milliseconds. The maximum make or break period occurring during a dial pulse train is approximately 60 milliseconds. Therefore, $Qs1$ can never become true (be generated) until the pulse train is completed. When $Qs1$ is generated, assumptions may be made regarding the subscriber's action, based on the binary value of bit seven at the time.

P7 $Qs1$—A dial-pulse train has been completed and the subscribed is pursuing the call.

P7' $Qs1$—The subscriber has hung up.

A mark is placed in bit 8 whenever it becomes desirable to cause the counter of bits 9–11 to perform a special counting operation. It is necessary, for instance, to cause the system to disregard the dialing activity of a subscriber who has obtained a trunk and is outpulsing. The subscriber is allowed a given period of time to accomplish this activity. This relatively long counting operation is regulated by bit 8.

Memory bits 12, 13, 14, and 15 are grouped to form a counter capable of counting line-loop interruptions generated by the subscriber's dial. The counter adds one each time a transition from open loop to closed loop occurs. The count continues until $Qs1$ becomes true, denoting the end of a dial-pulse train. The counter is coded in binary form with 8–4–2–1 weighting. The dialed hundreds digit, since it is an access digit, is discarded when its value has been determined. At the completion of the tens pulse train, the digit is transferred from the counter to bits 16, 17, 18, and 19 for storage. The pulses which comprise the dialed-units digit are then counted, as were dialed hundreds and tens. The units digit is stored within the counter. Dialed digits are retained in their storage areas for only the duration of their usefulness.

The crosspoint address of a connection in which a subscriber is engaged is stored in bits 20–31. The address may be defined as the number of the XB switch and the number of the XC switch used to connect the two subscribers (FIG. 3). This is identical to the number of the junctor used to establish the connection. The crosspoint address of a connection is stored within the calling party's register in bits 20–25. The first three bits 20–22 (PLB store) of this group record the number of the B switch; the last three bits 23–25 (PLC store) identify the C switch. A called party must refer to bits 26–28 (PRB store) and bits 29–31 (PRC store) to obtain the numbers of the XB and XC switches, respectively, through which his audio path is established.

Information within routing storage areas is written and erased under the influence of the marker during connection and disconnection cycles respectively.

Two important intermediate quantities are used extensively to describe a subscriber's status. $Ls$, which denotes a calling party, is generated when information is found to be stored in bits 20–25. $Rs$ is true if a subscriber is a called party (if he has information within bits 26–31 of his memory word).

The common control logic, or subscriber logic, is a logical network that converts the memory word of each subscriber into a form indicative of the condition of the subscriber. It acts upon this information, multiplex highway information, and marker information, in such a way as to determine what information should be written into the memory at the end of each time slot. Subscriber logic acts upon the memory word of each subscriber in turn during his assigned time slot.

The subscriber logic also exchanges information with the marker. To insure that the marker is not called upon to perform impossible or disallowed actions, the subscriber logic discerns which subscriber demands are to be acted upon.

Certain supervisory signals (busy tone and dial tone) are supplied to subscribers via their line equipment. Subscriber logic regulates the application of these signals.

Special "subscribers"—such as trunk and attendant lines—require special control and supervisory features not provided normal PABX subscribers. The inclusion of these features necessitates an expansion of the memory words of these lines, as well as the development of additional logic networks.

The subscriber logic control unit 116 is shown in the functional block diagram of FIG. 32, FIG. 33, and FIG. 34. Referring to FIG. 32, the translator 3201 translates the signals P1, P2 and P3 into the eight subscriber state signals S1 and S8. The logic for changing the subscriber states is shown as block 3202. The signal outputs for writing a "1" are designated $Ws1$, and the signals for writing a "0" are designated $Ws0$. If there is to be no change during a particular cycle the outputs $Ws1$ and $Ws0$ are all "0" so that the gates 3203, 3204 and 3205 are enabled by the "0" signals to the inhibit inputs of these gates, and the signals P1, P2 and P3 are recirculated by passing first through the AND gates 3203, 3204 and 3205 respectively and thence through the OR gates 3206, 3207 and 3208 respectively to the write control input to the memory, thereby recirculating the information. The logic for change of subscriber state is as follows:

*Logic 3202*

$P1-Ws1 = S1[Q1 \ (Hs1'+Hs2')+Q4 \ M5$
$\qquad +S3 \ Qs1+S5 \ (Ux+Uy) \ Sm+P7']$
$\qquad +S7(Ls+Rs)Hs1 \ Hs2+S7 \ Sm(M7$
$\qquad +M13) \ (Ls \ Rs)'$ $P1-Ws0 = S2 \ Q1 \ P7[Uy+Q1 \ "6" \ (Ls'+P6)]$
$\qquad +Q3 \ M5 \ S5 \ Im \ Qm+Q1 \ Ls' \ Rs' \ (S6$
$\qquad +S8 \ P7')$
$\qquad +S6 \ \{Q1 \ [Rs \ U13 \ (T5+T6+T7+T8+T9$
$\qquad +T0)+Ls \ Q2+Ls \ P6'+Rs \ P6' \ P7]$
$\qquad +Q2 \ M1\}$ $P2-Ws1 = S2 \ Q2 \ P7 \ [Uy+Qs1 \ "6" \ (Ls'+P6)]$
$\qquad +(S2+S6 \ Ls)Q1 \ P7' \ Qs1$
$\qquad +S6 \ \{Q1 \ [Rs \ Uz(T5+T6+T7+T8+T9$
$\qquad +T0)+Ls \ Q2+Ls \ P6'+Rs \ P6' \ P7]$
$\qquad +Q2 \ M1\}$ $P2-Ws0 = Q2 \ M1 \ Ls+Q3 \ M5(Ls \ Rs \ P6)'$
$\qquad +S7(Ls+Rs)Hs1 \ Hs2$
$\qquad +Q1 \ Ls' \ Rs' \ [S6+S8+S7(Ux'+Qs1)]$
$\qquad +S7 \ M13 \ Sm(Ls \ Rs)'+S8(Q1 \ P7+Q2 \ M1)$ $P3-Ws1 = S2 \ Q1 \ P7 \ Qs1\{[Ls' \ Rs' \ ("9"$
$\qquad +"8")+Rs' \ P6 \ "2"+"0"+"6"] \ Ls'$
$\qquad +P6)\}'+M5 \ Q4+(S2+S3$
$\qquad +S4) \ (Q2 \ M1 \ Ls+Q1 \ P7' \ Qs1)$
$\qquad +Q3 \ M5(Ls \ Rs \ P6+Qm)'$ $P3-Ws0 = S7 \ Sm(Ls \ Rs)' \ (M7+M13)+S8 \ Q1 \ P7$
$\qquad +[S6+S8+S7(Ux'+Qs1)] \ Ls' \ Rs' \ Q1$
$\qquad +S7(Ls+Rs)Hs1 \ Hs2$ The signals P4 and P5 are translated by unit 3211 to supply the four signals Q1 to Q4. The logic for changing the state of these four signals is shown in block 3212. If all of the outputs from this unit are "0," the AND gates 3213 and 3214 are enabled by the "0" signals at their inhibit inputs, so that the signals P4 and P5 are recirculated by passing through the AND gates 3213 and 3214 respectively and thence through the OR gates 3215 and 3216 respectively to the write control signals to the memory. The logic for changing the relationship to the marker is given by the following equations:

*Logic 3212*

$P4-Ws1 = S4 \ Q1 \ P7 \ Qs1+S2 \ Q1\{Uy'$
$\qquad +P7 \ Qs1 \ [Ls' \ Rs'("9"+"8")$
$\qquad +Rs' \ P6 \ "2"+"0"] \ (Ls'+P6)+Ux \ P7\}$
$\qquad +S7(M7+M13)Sm(Ls \ Rs)'$
$\qquad +S6 \ Q1 \ P7 \ Ls' \ P6+S8 \ Q1 \ P7'(Ls+P6)$ P4—Ws0=Q3 M5(Ls Rs P6+Qm)'
  +(Q2 M1(Ls+P3)
P5—Ws1=S1 Q1 Hs1 Hs2 Sm(M2+M6+M8+M9
  +M10+M11)P3' Q2 M1 Ls'+S7(M7
  +M13)Sm(Ls Rs)'
P5—Ws0=M5 P5

The bit 6 is used to indicate the connection to a trunk. The write "1" logic (Ws1) is shown by gates 3222 and 3223, and the write "0" (Ws0) is shown by gate 3220. If the outputs of both of these gates is "0" the signal P6 is recirculated by passing through gates 3221 and 3224 to the write control input to the memory. The equations are as follows:

P6—Ws1=Tm M4(Sm+Q3)
P6—Ws0=Ls' Rs'

The bit 7 is used to indicate the last cycle loop condition. The logic for writing a "1" (Ws1) in response to an off-hook signal is given by gates 3230 and 3231, and the logic for writing a "0" (Ws0) in response to an on-hook signal is given by gate 3233. The outputs of these gates are passed through OR gate 3234 to supply the write control signals to the memory. The equations are as follows:

P7—Ws1=Hs1' Hs2'+Hs1 Hs2'
P7—Ws0=Hs1 Hs2

The bit 8 is set whenever it is desirable to cause the timer to perform a timing operation under the influence of the long count signal Lc. The intermediate signal Qs2 becomes true when the counter counts to seven (coded as P9' P10 P11') and P8 is true. The logic for writing a "1" (Ws1) is given by gate 3245, and the logic for writing a "0" (Ws0) is given by gate 3240. If the outputs of both of these gates are "0" the signal P8 is recirculated by passing through gates 3241 and 3242 to supply the write control signal to the memory. The equations are as follows:

P8—Ws1=S6 Q1 Qs1 P6 Ls P7
P8—Ws0=Qs2+P7'

Bits 9, 10 and 11 form a counter capable of counting from zero to seven, in accordance with a gray code. The counter is used at different times for different purposes.

During the subscriber states S2, S3, and S4, in which dialing occurs, the counter is used to determine the length of time between changes in line loop condition. The counter begins to count when the first change of line loop condition is noticed and advances one count every distributor cycle that the line loop remains unchanged. When the line loop condition changes before the counter reaches a count of seven, the counter reverts to a count of one and begins to count again. When counting in this manner, that is advancing the count once each cycle, a count of seven generates the intermediate signal Qs1, which indicates that the line loop condition has remained unchanged for a period of 16 milliseconds times 7 or 112 milliseconds. The maximum make or break period occurring during a dial pulse train is approximately 60 milliseconds. Therefore, the signal Qs1 can never become true until the pulse train is terminated. The bit 7 indicates the condition of the line loop in the last cycle. With the signals Qs1 and P7 both true, it is indicated that a dial pulse train has been completed and that the subscriber is preparing to dial another digit or has completed dialing. If the signal Qs1 is true and the signal P7 is false, this indicates that the subscriber has hung up.

When a subscriber calls a trunk, the subscriber is held in state S6 until approximately 15 seconds have elapsed since his last change of line loop condition in order to insure that the PABX will be unaffected by the dial pulse trains directed to the central office. The counter of bits 9 through 11 performs the counting action. Instead of adding one to the count each cycle, the counter advances whenever the signal Lc occurs. The counter conforms to this new counting mode whenever signal P8 is true.

The counter is also used to provide a time delay in the resetting of flip-flops associated with PBX trunks when they become disconnected (S7 Ls' Rs'). The delay allows sufficient time for electromechanical devices in the central office to release before the trunk again appears idle to the electronic exchange.

Referring now to FIG. 33, a start logic unit 3301 produces a signal s to start the counter and write the code 1-0-0 in the bits 9, 10, and 11 of the memory. The equation is as follows:

Logic 3301 s=(S2+S3+S4+S6+S7+S8)Q1[P7(Hs1'+Hs2')
  +P7' Hs1 Hs2]'+S6 Q1 Qs1 P7 P6 Ls
  +S7 Ls' Rs' Ux P9' P10' P11'+S6 Q1 P9' P10' P11'

Whenever the counter is to be advanced one step, the add logic unit 3302 produces the signal a. The equation is as follows:

Logic 3302 a=[P7(Hs1'+Hs2')+P7' Hs1 Hs2] (Lc+P8')

The counting logic unit 3303 produces the signals f9, f10, and f11 in accordance with the following equations:

Logic 3303 f9 =P9(P10+P11')
f10=P9 P11'+P9' P11
f11=P9 P10+P10' P11

Whenever the signal s from unit 3301 is true, a "1" is supplied through gate 3307 to write P9, and the gates 3310 and 3311 are inhibited to write zeros in P10 and P11. Whenever the signal "a" is true the gates 3304, 3305 and 3306 are inhibited, and the gates 3312, 3313 and 3314 are enabled so that the signals f9, f10 and f11 control the output through gates 3307, 3308, 3309, 3310, and 3311. When the signals s and a are both false the three bits are recirculated through the gates 3304–3311.

The gate 3315 translates the three bits 9, 10 and 11 in accordance with the code 0–1–0 for the seventh count. If the bit P8 is false gate 3316 is enabled to supply the output signal Qs1. If bit 8 is true, gate 3316 is inhibited and gate 3317 is enabled to supply the output signal Qs2.

The memory bits 12, 13, 14, and 15 are grouped to form a counter capable of counting line loop interruptions generated by the subscriber's dial. The counter adds one each time a transition from open loop to closed loop occurs. The count continues until Qs1 becomes true denoting the completion of a dial pulse train. The counter is coded in binary form (8–4–2–1). A reduction in the amount of equipment is achieved by having only one counter to count any of the three digits, rather than having separate counters for each digit. The dialed hundreds digit is discarded after the appropriate functions have been performed by the subscriber logic control and by the marker. During changeover between the dialing of the tens digit and the dialing of the units digit, the tens digit is transferred to the storage unit of the memory comprising bits 16, 17, 18, and 19. Then the units digit is counted by the bits 12 to 15. The dialed tens and dialed units digits are then stored as long as they are needed, with the units digit in bits 12 to 15, and the tens digit in bits 16 to 19.

The bits 12 to 15 may be cleared by the erase logic unit 3321 supplying signal d to inhibit the gates 3324, 3325, 3326, and 3327, the equation is as follows:

Logic 3321 d=S3 Qs1+S2 Q1 Qs1("2"+"8"+"9"+"0")'+S5+S6
  +S7+S8+M5 Q3 Qm

Dial pulses are counted whenever the add logic unit 3322 supplies the signal $a$ in accordance with the following equation:

Logic 3322

$a = (S2+S3+S4)Q1\ P7'(Hs1'+Hs2')$

This signal $a$ occurs in response to a transition from open loop to closed loop to inhibit the gates 3324 to 3327, and to enable the gates 3328, 3329, 3330, and 3331. This causes the count to be advanced one in accordance with the logic unit 3323. The output is supplied through gates 3332 to 3335 to cause the code to be written into the memory.

During subscriber state S2, the bits 12 to 15 are passed through gates 3341 to 3344 respectively to a translator 3340 to supply the hundreds digit signals "2," "6," "8," "9," and "0."

As a special case the gate 3358, in response to the condition (M5 Q3 Q$m$), writes the code 1–0–1–0 for "0" into the bits 12 to 15. This condition occurs if a called line is unequipped.

Referring to FIG. 34, the bits 16 to 19 are normally recirculated through gates 3401 to 3404 and 3405 to 3408.

In response to erase logic unit 3361 supplying signal $d$ the gates 3401 to 3404 are inhibited to clear these four bits of the memory. The equation is as follows:

Logic 3361

$d = S5+S6+S7+S8$

In response to the signal $a$ from the add logic unit 3351, the signals P12 to P15 are transferred through gate 3352 to 3355 respectively and through gates 3405 to 3408 respectively to write in the bits 16 to 19 of the memory. The equation is as follows:

Logic 3351

$a = S3\ Q1$

The crosspoint address of a connection in which a subscriber is engaged is stored in bits 20 to 31. The crosspoint address of a connection may be defined as the number of the XB switch and the number of the XC switch used to connect two subscribers. This is identical to the number of the junctor used to establish the connection. The crosspoint address of a connection is stored within the calling party's register in bits 20 to 25. The first three bits of this group identify the number of the XB switch, and the last three bits identify the XC switch.

In the memory word corresponding to the called party time slot, the crosspoint address of the connection is stored in bits 26 to 28, and bits 29 to 31 to store respectively the numbers of the XB and the XC switches.

Information is written and erased under the influence of the marker in its connection or disconnection cycles.

Two important signals are used to describe a subscriber's status. The signal L$s$ is supplied when information is stored within the bits 20 to 22, indicating that the line is connected as a calling (left side) party. The signal R$s$ is supplied whenever information is stored in the bits 26 to 28, indicating that the line is connected as a called party (right side).

The bits 16 to 31 are normally recirculated. They may be cleared by signals from erase logic units, or new information may be supplied in response to enabling signals from add logic units.

The signals to be added are supplied from translators 3480 and 3490. The translator 3480 receives as input the signals E$n$1 to E$n$6 and translates the one-out-of-six information received into a code of three bits. The translator 3490 receives as inputs the signals F$n$1 to F$n$6, and translates the one-out-of-six signals to a three bit code.

The erase logic unit 3410 supplies the signal $d$ to inhibit the gates 3411 to 3416 to clear the bits P20 to P25. The equation is as follows:

Logic 3410

$d = S8\ Q2\ Ls\ M1\ Xm' + (M16+M12)Sm$

In response to an add signal from gate 3420 the information from translator 3480 is written into bits 20 to 22, and the information from translator 3490 is written into bits 23 to 25. The equation is as follows:

Logic 3420

$a = Q3\ M4$

The signal L$s$ is supplied by gate 3430 whenever there is any information in bits 20 to 22.

The erase logic unit 3440 supplies the signal $d$ to inhibit the gates 3441 to 3446 to clear the bits 26 to 31. The equation is as follows:

Logic 3440

$d = S8\ Q2\ Ls'\ M1 + M15\ Sm\ Xm'$
$+ M5\ Q3\ Ls\ Rs\ P6 + M14\ Sm\ S6\ Q1$

In response to the signal $a$ from gate 3450, information from translator 3480 is written into bits 26 to 28, and information from translator 3490 is written into bits 29 to 31. The equation is as follows:

Logic 3450

$a = M4\ Sm$

The signal R$s$ is supplied through gate 3460 whenever there is any information stored in bits 26 to 28.

*Subscriber logic flow chart.*—The flow chart below describes the various courses of action a subscriber may follow.

SUBSCRIBER FLOW CHART

| From— | To— | Command |
|---|---|---|
| S1 Q1 | S1 Q4 | Hs1 Hs2 Sm(M2 + M8 + M9 + M10 + M11) |
|  | S2 Q1 | Hs1' Hs2 + Hs1 Hs2' |
| S1 Q4 | S6 Q1 | M5 |
| S2 Q1 | S2 Q2 | P7 Qs1 [Ls' Rs' ("9" + "8") + Rs' P6 "2" + "0"] (Ls' + P6) + P7 Ux |
|  | S3 Q1 | P7 Uy + P7 Qs1 "6" (Ls' + P6) |
|  | S6 Q1 | P7 Qs1{[Ls' Rs' ("9" + "8") + Rs' P6 "2" + "6" + "0"] [Ls' + P6]}' |
|  | S8 Q1 | P7' Qs1 |
| S2 Q2 | S2 Q3 | M1 Ls' |
|  | S6 Q1 | M1 Ls |
| S2 Q3 | S2 Q2 | M5 (Ls Rs P6 + Qm) |
|  | S5 Q1 | M5 Qm' Im |
|  | S6 Q1 | M5 Im' (Ls Rs P6 + Qm)' |
| S3 Q1 | S4 Q1 | P7 Qs1 |
|  | S8 Q1 | P7' Qs1 |
| S4 Q1 | S4 Q2 | P7 Qs1 |
|  | S8 Q1 | P7' Qs1 |
| S4 Q2 | S4 Q3 | M1 Ls' |
|  | S6 Q1 | M1 Ls |
| S4 Q3 | S4 Q2 | M5 Qm |
|  | S4 Q2 | M5 Ls Rs P6 |
|  | S5 Q1 | M5 Qm' Im |
|  | S6 Q1 | M5 Im' (Ls Rs P6 + Qm)' |
| S5 Q1 | S6 Q1 | P7'+(Ux+Uy)Sm |
| S6 Q1 | S1 Q1 | Ls' Rs' |
|  | S6 Q2 | P7 Rs P6 |
|  | S7 Q1 | Rs Uz(T5 + T6 + T7 + T8 + T9 + T0) + Ls P6 Qs2 + Ls P6' + Rs P6' P7 |
|  | S8 Q1 | Ls P7' Qs1 |
| S6 Q2 | S7 Q1 | M1 |
| S7 Q1 | S1 Q1 | Ls' Rs' (Ux' + Qs1) |
|  | S2 Q1 | Hs1 Hs2 (Ls + Rs) |
|  | S2 Q3 | M13 (Ls Rs)' Sm |
|  | S4 Q3 | M7 (Ls Rs)' Sm |
| S8 Q1 | S1 Q1 | P7' Ls' Rs' |
|  | S2 Q1 | P7 |
|  | S8 Q2 | P7' (Ls + P6) |
| S8 Q2 | S6 Q1 | M1 |

*S1 Q1*

The subscriber who is idle remains in that status until either the marker choses him as a called party, or he removes his handset from the hook switch.

*S1 Q4*

When a subscriber is selected to be a called party, he remains in S1 Q4 until near the end of the connection cycle. No action he might perfom can change this. The marker causes the crosspoint address of the connection to be written into the bits 26 to 31 register of the subscriber before the subscriber leaves S1 Q4. During this state, a mark is placed in bit 6 if the party is being connected to a trunk.

S2 Q1

During state S2 Q1, the subscriber dials his first digit. Subscriber logic decides, at the end of the dial pulse train, whether or not the action being requested by the subscriber is to be allowed. For instance, a party who is connected as a calling party (Ls) to a PABX subscriber (P6') is not permitted to place another call. Consequently, this subscriber must be prevented from obtaining the services of the marker for the purpose of making another call.

All PABX subscribers must dial a digit before leaving S2 Q1. If, at the end of the digit (Qs1), P7' is true, the subscriber is assumed to have hung up and is sent to the disconnect state to insure that any connections are removed. If P7 is true, the subscriber may be sent to either S3 Q1, S2 Q2, or S6 Q1. The only way in which a subscriber may enter S3 Q1 is by dialing the digit 6. In addition, the subscriber must be either Ls' (he is making a normal call or is extending a chain call) or P6 (he is endeavoring to transfer a trunk).

A subscriber who is Ls' Rs' and who has dialed "8" or "9" is allowed to display S2 Q2 and direct the marker to connect him to a meet-me-conference line or a trunk respectively.

A subscriber must have called a trunk previously if he is to be allowed to access the marker by dialing "2" since this special digit is only used in connection with unsuccessful transfer operations.

A subscriber may either call directly to the operator or transfer a trunk to the operator. Consequently, the only requirement a subscriber must meet in order to enter S2 Q2 after dialing "0" is being either connected to a trunk (P6) or not connected on the left (Ls').

Trunks receive preferential treatment while in S2 Q1. No dialing action is necessary for them in this state. Two way dial trunks (Uy) pass directly to S3 Q1. They need not dial an access digit because two way dial trunks are only allowed to call PABX subscribers. PBX trunks do not dial into the exchange in any case. Upon being seized by the central office, the PBX trunk is directed to the attendant via the crosspoint network. PBX trunks, therefore, pass into S2 Q2 immediately upon arriving in S2 Q1.

Any subscriber who enters S2 Q1 and who, at the end of the first dialed digit, fails to fulfill criteria allowing an exit to S3 Q1 or S2 Q2, passes into S6 Q1.

S2 Q2

As is true of any Q2 state, the subscriber who exhibits S2 Q2 is expressing the need for marker action. The subscriber remains in S2 Q2 until the marker is found to be idle during the review of his time slot. If the subscriber is not connected as a calling party (Ls'), the subscriber enters S2 Q3 at M1. If the subscriber already supports a left hand connection (Ls), it may be assumed that he is connected to a trunk (because of the criteria allowing a subscriber to enter S2 Q2) and that his dialing action was done in an effort to perform a transfer. If this is the case, the subscriber, because he will not be directly involved in the ensuing connection cycles, is sent to S6 Q1.

S2 Q3

Q3 is true of only one subscriber at a time and designates the subscriber for whom the marker is establishing a connection. The Q3 condition serves as a guide post for the marker enabling it to locate the calling party without performing a parity check. It is while the subscriber is in Q3 that routing is placed in bits 20 to 25 and that a mark is placed in bit 6 when necessary. The subscriber remains in Q3 until the end of the clearing cycle (M5). The conditions that exist at this time determines which flow chart path the subscriber will follow.

If, when M5 occurs, Im is set and Qm has not been set, it is apparent that the called party was either busy or no crosspoint path was available to support the connection. In this case, the calling subscriber is directed to S5 Q1 to receive busy tone.

When the marker, in M5, reviews the calling party (Q3) with Qm true, it is apparent that the called party was not equipped with line equipment. It is desirable to act upon the calling party in such a way as to direct him to the operator. The subscriber's status is changed to S2 Q2 and information is placed in the dial pulse train counter (bits P12 to P15) to make it appear that the calling subscriber has dialed the digit "0." When the idle marker next reviews this time slot it will connect the subscriber to the operator. Signal Qm is also set when all operator lines are busy to insure that a person desiring the operator is not refused her services.

One other case requires special action. That case occurs at the end of the pre-transfer operation. The subscriber must redemand the marker in order that a normal transfer might take place. This condition is denoted by M5 Ls Rs P6.

If, at M5 Q3, none of the above conditions prevail, the subscribers are directed to S6 Q1.

S3 Q1

A subscriber remains in S3 Q1 until the completion of the dial pulse train (Qs1) that represents the tens of a called party's distributor address, unless, of course the subscriber hangs up (P7' Qs1). The dial pulses are counted in the counter of P12 to P15 and, at the end of S3 Q1 (Qs1) the digit is transferred to the tens storage area (P16 to P19).

S4 Q1

Unless he hangs up (P7' Qs1), the subscriber with his dial, generates a dial pulse train corresponding to the distributor units of the called party during his stay in S4 Q1. These pulses are counted and then stored in P12 to P15. At the completion of the pulse train (Qs1) the subscriber enters S4 Q2 and demands the marker.

S4 Q2

Here, as in S2 Q2, the subscriber must wait for the marker to be free to service him. Subscribers establishing connections for themselves (Ls') go to S4 Q3 at M1. Transferring subscribers (Ls) are directed to S6 Q1 when the marker is idle (M1).

S4 Q3

S4 Q3 describes subscribers who are waiting for the marker to serve them after having dialed a PABX subscriber's number. Exits are the same as for S2 Q3.

S5 Q1

The subscriber in S5 Q1 receives busy tone. The most common exit from S5 Q1 occurs when the subscriber hangs up (P7'). During transfer operations, however, trunks are silenced and, although they are in S5 Q1, do not hear the busy signal. The PABX subscriber who originated the transfer hears the busy tone via the crosspoint connection linking him to the trunk. By dialing a "2," this subscriber may call in the marker to remove the trunk from S5 Q1. When the marker locates the time slot of the trunk, signal Sm is generated and the trunk exits, as do all subscribers leaving S5 Q1, to S6 Q1.

S6 Q1

The only subscribers who remain in S6 Q1 for more than one cycle are called parties who display open line loops and subscribers who have called trunks and have not timed out using the long count (Qs2).

Called conference lines are automatically passed through S6 Q1 (Rs Uz) (T5 . . . 0) as are calling parties not connected to trunks (Ls P6'). Called parties must close their line loops before they may leave S6 Q1. (S6 Q1 controls the ringing flip-flops within the crosspoint network.) Those called parties who were called by trunks ($Rs$ P6) must call in the marker to provide answer supervision for the trunk and therefore must go to S6 Q2 when they answer (P7). Other called parties ($Rs$ P6') exit to S7 Q1 when they answer (P7) along with called conference lines, calling parties of PABX calls, and calling parties of trunks when through dialing digits into the central office.

Subscribers having no connections who find themselves in S6 Q1 are directed to S1 Q1.

Subscribers who call trunks and hang up before they time out with $Qs1$ are sent to S8 Q1 in order that a disconnection might be effected.

*S6 Q2*

As soon as a subscriber in S6 Q2 is confronted with the marker in the idle state (M1), the subscriber enters S7 Q1.

*S7 Q1*

S7 Q1 may be considered the steady state condition of subscribers actively engaged in a conversation.

When a party is disconnected by the marker and finds himself $Ls'$ $Rs'$, he reverts to state S1 Q1. The only restriction is that PBX trunks must wait 112 ms. to allow sufficient time for the relays in the central office to release.

A subscriber in S7 Q1, who has a connection ($Ls+Rs$) and who interrupts his line loop ($Hs1$ $Hs2$) is directed to S2 Q1 in order that dialed digits might be recorded.

In transfer operations it is necessary for the marker to act upon a trunk in such a way as to transform the trunk into a calling party. Consequently, the command M7 ($Ls$ $Rs$ $Sm$)' places the trunk into S4 Q3 and M13($Ls$ $Rs$ $Sm$)' moves the trunk into S2 Q3.

*S8 Q1*

A subscriber in S8 Q1 is one who has expressed a desire to become disconnected from the connection in which he is participating. Subscriber logic screens the subscriber to determine if the subscriber is to be allowed to call for the marker.

Only calling parties ($Ls$) or parties connected to trunks (P6) may initiate disconnection action. These subscribers enter S8 Q2 immediately. All other subscribers must remain in S8 Q1 until either they pick up their hand set to re-enter the conversation (P7) or they become disconnected ($Ls'$ $Rs'$) by the marker at the request of the party that had called them.

*S8 Q1*

A subscriber remains in S8 Q1 until the marker is free to perform the required action. At M1, the subscriber goes to S6 Q1.

E2. THE MARKER

Figure 25:
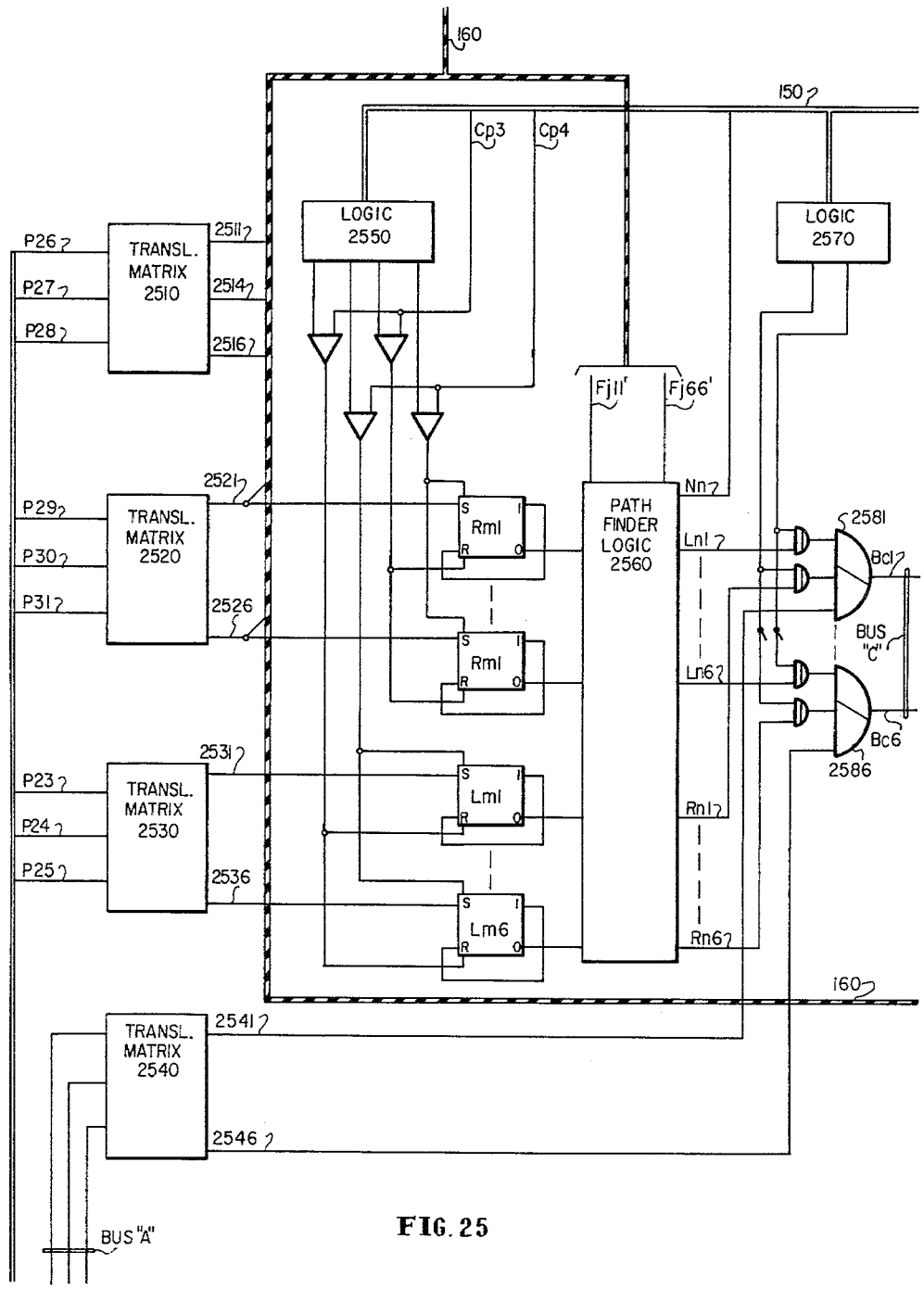

FIGURES 25–31 when arranged as shown in FIG. 38 comprise a diagram of the marker. FIGS. 12A and 12B show part of the marker symbolically. The marker state equipment appears in FIG. 27. The parity checker is shown in FIGS. 28–31, and also symbolically in FIG. 12A. The pathfinder is shown in FIG. 25 and the left side of FIG. 26, and is also shown symbolically in FIG. 12B. Miscellaneous flip-flops and their input logic 2620 are shown on the right side of FIG. 26.

E2a. Marker States

The marker, in satisfying the demands of subscribers, may assume any one of 18 states, see Table III. These states are determined by the equipment shown in FIG. 27. Eight flip-flops $Am$–$Hm$ are used to record the state under whose influence the marker is acting.

TABLE III

| State | Description | $Am$ | $Bm$ | $Cm$ | $Dm$ | $Em$ | $Fm$ | $Gm$ | $Hm$ |
|---|---|---|---|---|---|---|---|---|---|
| M1 | Idle | 0 | 0 | 0 | 0 | 0 | 0 | 0 | 0 |
| M2 | Busy Test | 1 | 0 | 0 | 0 | 0 | 0 | 0 | 0 |
| M3 | Route Search | | | | | | | 1 | 0 |
| M4 | Connection | | | | | | | 0 | 1 |
| M5 | Clear | | | | | | | 1 | 1 |
| M6 | Pre-Transfer | 1 | 1 | 0 | 1 | 0 | 0 | 0 | 0 |
| M7 | Transfer to Subscriber | 1 | 1 | 1 | 0 | 0 | 0 | 0 | 0 |
| M8 | Conference Hunt | 0 | 1 | 0 | 0 | 1 | 0 | 0 | 0 |
| M9 | Trunk Hunt | 1 | 1 | 0 | 0 | 1 | 0 | 0 | 0 |
| M10 | Operator Hunt | 1 | 1 | 0 | 0 | 0 | 0 | 0 | 0 |
| M11 | Night Hunt | 0 | 1 | 0 | 0 | 0 | 0 | 0 | 0 |
| M12 | Un-Silence | 1 | 0 | 1 | 0 | 1 | 0 | 0 | 0 |
| M13 | Transfer to Operator | 1 | 1 | 1 | 0 | 1 | 0 | 0 | 0 |
| M14 | Disconnect Check | 0 | 0 | 1 | 0 | 0 | 0 | 0 | 0 |
| M15 | Disconnect for Caller | 1 | 0 | 1 | 0 | 0 | 0 | 0 | 0 |
| M16 | Disconnect for Called | 1 | 0 | 0 | 1 | 0 | 0 | 0 | 0 |
| M17 | Answer Supervision (Central Office) | 0 | 0 | 0 | 1 | 0 | 0 | 0 | 0 |
| M18 | Answer Supervision (Operator) | 0 | 0 | 0 | 0 | 0 | 1 | 0 | 0 |

The state of the marker at a particular time determines its reaction to input signals. The following is a chart which describes the transitions from one marker state to another and the necessary input commands.

MARKER FLOW CHART

| From— | To— | Command |
|---|---|---|
| M1 | M2 | S4 Q2 P6' $Ls'$ |
| | M6 | (S2+S4)Q2 P6 $Ls'$ $Rs$ |
| | M7 | S4 Q2 P6 $Ls$ $Rs'$ |
| | M8 | S2 Q2 P6' $Ls'$ $Rs'$ "8" |
| | M9 | S2 Q2 P6'$Ls'$ $Rs'$ "9" $Rs2$ |
| | M10 | S2 Q2 P6' $Ls'$ ("0"+"9" $Hs2$+$Nk'$ $Ux$) |
| | M11 | S2 Q2 P6' $Ls'$ $Rs'$ $Nk$ $Ux$ |
| | M12 | S2 Q2 P6 $Ls$ $Rs'$ "2" |
| | M13 | S2 Q2 P6 $Ls$ $Rs'$ "0" |
| | M15 | S8 Q2 $Ls$ |
| | M17 | S6 Q2 P6 $Ls'$ $Rs$ |
| M2, M6, M8, M9, M10, M11 | M3 | $Im'$ Q3 |
| M2, M6, M8, M9, M10, M11 | M5 | $Im$ Q3 |
| M3 | M2, M6, M8, M9, M10, M11 | $Im$ Q3 |
| M3 | M4 | $Im'$ Q3 |
| M4 | M5 | Q3 |
| M12 | M15 | $Sm$ $Ls$ |
| M15 | M14 | $Sm$ $Ls(Ux+Uy)Xm'$ |
| M14 | M16 | $Sm$ S6 Q1 |
| M7 | M2 | $Sm(Ls$ $Rs)'$ |
| M13 | M10 | $Sm(Ls$ $Rs)'$ |
| M17 | M18 | $Sm$ $Rs$ |
| M7 | M1 | $Sm$ $Ls$ $Rs$ |
| M12 | M1 | $Sm$ $Ls'$ |
| M13 | M1 | $Sm$ $Ls$ $Rs$ |
| M14 | M1 | $Sm$(S6 Q1)' |
| M15 | M1 | $Sm[Ls(Ux+Uy)Xm']$ |
| M16 | M1 | $Sm$ |
| M17 | M1 | $Sm$ $Rs'$ |
| M18 | M1 | $Sm$ |

The flip-flops $Am$–$Hm$ constitute the storage areas which receive information from cable 150 via marker state logic 2710, during Cp3 and I15. Marker state logic 2710 provides the D.C. SET and the D.C. RESET signals to flip-flops Am-Hm as follows:

*Marker State Logic 2710*

Set Am=M1 Q2 [S2 (P6+"9"+"0"+Ux Nk')+S4+S8]
   +Am' Cm Sm S6 Q1
Reset Am=M5 Q3 (Ls Rs P6)'+Am Bm' Sm (Cm Ls'
   +Cm Em'+Dm)+Bm Cm Sm Ls Rs
Set Bm=M1 Q2 "2"'+S4 P6)
Reset Bm=Cm Em' Sm+M5 Q3+Bm Cm Sm Ls Rs
Set Cm=M1 Q2 Ls (S2+S4+S8)
Reset Cm=Sm [Bm+Ls'+Am'+Em' (Ux+Uy)'
   Am Bm' Cm Em' Xm]
Set Dm=M1 Q2 Ls' P6+Am' Cm Sm S6 Q1
Reset Dm=Bm' Dm Sm+M5 Q3 (Ls Rs P6)'
Set Em=M1 Q2 S2 ("8"+"9" Hs2+P6 Ls)
Reset Em=Sm Cm+M5 Q3
Set Fm=M17 Sm Rs
Reset Fm=M18 Sm
Set Gm=Gm' Q3
Reset Gm=Gm Q3
Set Hm=Q3 (M3 Im'+Gm' Im)
Reset Hm=M5 Q3

The output of flip-flops Am-Hm are then translated to generate the signals M1-M18, which are supplied to cable 150. The signals from flip-flops Am-Hm are also introduced to cable 150 for use elsewhere in the system.

Flip-flops Am-Fm remain set during M3, permitting the marker to return to a previous state. Marker M3, M4, and M5 exist independently from the other marker states, because flip-flops Gm and Hm generate M3, M4, and M5 without regard to the conditions of flip-flops Am-Fm. This type of coding enables the marker to perform the various trunk-hunting operations.

The following discussion explains the operations that take place during the various marker states.

*Marker State 1—Idle*: Whenever, during the constant review of time slots, a subscriber is found to exhibit state Q2, marker action is required. Because subscriber logic prohibits unqualified subscribers from exhibiting Q2, the marker need not discern which requests for action are valid. It must, however, decide which course of action is proper. This decision is based on information available during the review of the time slot displaying Q2.

*Exit to M2.*—Subscribers who are not connected to trunks and who have not originated a call since their last disconnect are allowed to call other PABX subscribers. They may or may not be "called" parties. Hence, S4 Q2 P6' Ls' dictates an exit from M1 to M2.

*Exit to M8 and M9.*—In order to make use of the "meet-me-conference" facilities or to obtain a trunk line into the Central Office, a subscriber must not be engaged in a call of any kind. Furthermore, a subscriber must be assigned to an "unrestricted" status in order to demand trunking facilities. A subscriber dials the digit "8" to enter the conference circuit and the digit "9" to obtain a trunk. Signal condition (S2 Q2 P6' Ls' Rs' "9" Hs2) demands connection to a trunk.

*Exit to M11.*—When a PBX trunk seizes the exchange while night service facilities are activated (S2 Q2 P6' Ls' Rs' Nk Ux), marker state 1 yields to marker state 11.

*Exit to M6, M7, and M13.*—States M6, M7 and M13 occur during transfer.

*Exit to M10.*—Subscribers who possess no left hand connections and who are not connected to a trunk may influence the marker to assume state M10 in a number of ways. The most common entrance to M10 is precipitated by a subscriber dialing the digit "0"; thereby explicitly requesting the operator. This condition is expressed as (S2 Q2 Ls' "0").

Restricted subscribers who dial the digit "9" are directed to the operator (S2 Q2 "9" Hs2'). The operator can then, if she desires, obtain a trunk for the restricted party.

PBX trunks, upon seizure of the PABX are directed immediately to the operator unless night service procedures are in effect (S2 Q2 Nk' Ux).

*Exit to M17.*—All subscribers who become called parties of trunks are required to render answer supervision to the trunk when they answer their calls. This involves the transferring of information from one time slot (that of the local subscriber) to another time slot (the trunk's). Marker action is required. The action is undertaken when the idle marker discovers a time slot displaying (S6 Q2 P6 Ls' Rs).

*Exit to M12.*—Transfer of information from time slot to time slot is again necessary when, during a transfer, the local subscriber who is transferring the trunk wishes to stop busy tone or ringing tone encountered during the transfer. The local subscriber requests this type of action by dialing the digit "2." The subscriber's time slot then displays S2 Q2 P6 Ls Rs' "2."

*Exit to M15 and M16.*—Basically, this exchange utilizes the principles of calling party release. That is, only those parties establishing a connection may destroy that connection. However, when a central office trunk is involved in a connection, the local party, whether called or calling, holds the key to disconnection. Deviation from calling party release procedure is necessary because trunks lose control of their line loop highways once they become connected to a PABX party. Therefore, all parties displaying S8 Q2 Ls are provided the action inherent in marker state M15. S8 Q2 Ls' P6 dictates that the marker assume state M16.

*M2*

The purpose of marker state 2 is to determine whether or not the called party of a proposed connection is idle. The marker changes its state to M2 at the end of the time slot of the calling party although it anticipates the change of state early in the time slot and stores within its storage areas pertinent information concerning the calling subscriber. The calling party's address is stored in An1–An4 and Bn1–Bn4. The called party's address (as dialed by the calling subscriber and stored within his register P12–P19) is store within Cn1–Cn4 and Dn1–Dn4. As successive time slots are reviewed by the marker, parity checks are made to discern when the time slot of the called party is under inspection. The presence of this time slot will be apparent when the tens output (in binary form) of the distributor is found to be identical to the information stored in Cn1–Cn4 and when the units output of the distributor coincides with Dn1–Dn4. When this dual parity is discovered, the intermediate quantity, Sm, becomes true. If the called party is not idle (S1 Q1 Hs1 Hs2)' a flip-flop Im within the marker will be set in order to convey this information to the calling subscriber. Should the called party be a nonexistent number, i.e., are not provided with line equipment (Hs1' Hs2'), marker flip-flop Qm is set. The marker continues to review time slots until Q3 (the calling party) is discovered. Near the end of the calling party's time slot, the marker state will change to M3 if flip-flop Im has not been set during M2 or to M5 if flip-flop Im has been set.

*M3*

During the marker state three, the marker reviews all time slots and determines if a route through the crosspoint matrix is available for a proposed connection, and, if more than one route may be taken, which route shall be used. The marker state begins at the end of the time slot of the calling party and persists for one complete cycle (16 ms.). During the review of time slots, information is assembled and delivered to the pathfinder, a logical network which, during the last few intervals before the end of marker state 3, makes the routing decision. In order to make a valid decision, the pathfinder must be made aware of: (a) which XB switches are in use by subscribers served by the same A switch as the calling party; (b) which XC switches are in use by subscribers served by the same XD switch as the called party; (c) which junctors are in service. The first two bits of information must be extracted from the memories of the many subscribers. The last piece of information is delivered to the pathfinder directly from the junctors. As the marker, in state M3, reviews time slots, the parity checker compares distributor tens with the information stored within $Cn1-Cn4$ (called party's tens) and yields the signal $Pm$ when the two quantities are found to be identical. Coincidently with the signal $Pm$, one of six flip-flops within the marker ($Rm1-Rm6$) is set in accordance with the information stored within that subscriber's $P29-P31$ (PRC) register. This action occurs during I6 of each time slot. During I8, the parity checker causes $Pm$ to be true if distributor tens of a time slot are found to be the same as those of the calling party. Coincidently with the signal $Pm$, one of six flip-flops within the marker ($Lm1-Lm6$) is set in accordance with the information stored within that subscriber's $P20-P22$ (PLB) register. The information accumulated within $Rm1-Rm6$ is continuously supplied to the pathfinder and consequently, with each additional piece of information the pathfinder revises its decision in accordance with the latest information.

By interval I9 of the time slot of the calling party (Q3) the pathfinder outputs are available. If the quantity $Nn$ is true, it is interpreted as meaning that no route through the switching network between the two subscribers is available. Flip-flop $Im$ is set when $Nn$ is found true. The marker, upon sensing (M3 Q3 $Im$) will return to the state it was in prior to state M3 and retain the information of the form of $Im$ that the proposed connection is not possible.

If a route is available, flip-flop $Im$ will not be set. The other two outputs of the pathfinder (the number of the B switch and the number of the C switch to be used for the connection) are read into marker storage flip-flops $En1-En6$ and $Fn1-Fn6$. At the end of the calling party's time slot (M3 $Im$ Q3), marker state 3 yields to marker state 4.

*M4 and M5*

It is during marker states 4 and 5 that the crosspoint connection between called party and calling party is established and that the subscribers participating in a connection are informed of the details of the connection.

As the marker state changes from state M3 to M4, flip-flop $Wm$ is set to indicate the crosspoint network that the links should be marked in preparation for the firing of a junctor. The identity of the links to be marked is inherent in the calling and called party addresses stored in $An$ and $Bn$ and in $Cn$ and $Dn$ respectively. Flip-flop $Wm$ is not reset and consequently the links are continuously marked until the end of state M5. At the end of state M4, the junctor whose identity is stored within $En$ and $Fn$, is fired by the setting of the junctor flip-flop. The ringing flip-flop within the junctor is set at the same time, to apply ringing tone and ring-back tone to the line.

If the time slot during which the marker state changes to M4 should be the time slot of a trunk ($Ux+Uy$) a flip-flop $Tm$ within the marker is set. When the marker next reviews the time slot of the called party, the subscriber logic, upon seeing $Tm$ set, will cause a mark to be written in memory bit P6 of the called party, indicating that the calling party is a trunk. At the same time, the subscriber logic will extract the crosspoint address of the call from the marker's $En$ and $Fn$ storage areas. Should the called party happen to be a trunk, flip-flop Tm is set at the end of the called party's time slot. When the time slot of the calling party is located, subscriber logic, as well as storing the crosspoint address of the call in the calling party's register, will sense the polarity of flip-flop $Tm$ and react accordingly.

The marker changes its state from M4 to M5 when the calling party is located. During state M5, all subscribers associated with the calling sequence are informed that the sequence is completed. The state ends at the time slot of the calling party (Q3). Unless the connection sequence just completed was performed in response to a request for pretransfer action (the only way a subscriber could be acted upon to display Q3 P6 $Ls$ $Rs$), the marker becomes idle. If Q3 P6 $Ls$ $Rs$ should exist, a disconnection cycle is entered.

*M8–M11*

Marker states 8, 9, 10, and 11, all of which are operations involving the selection of one of a group of lines as a called party, share the same principle of operation. As the marker assumes one of these states, flip-flop $Im$ is set. The address of the calling party is stored in flip-flops $An1-An4$ and $Bn1-Bn4$. As the marker cycles, it searches for a line which fulfills requirements peculiar to each hunting sequence. In order for a line to qualify as a called party for any of these sequences, it must, of course, be idle (S1 Q1 Hs1 Hs2). Each hunting marker state has its individual requirements as shown below:

$M8$ searches for $[Uz(T5+T6+T7+T8+T9+T0)]$—(a conference line)

$M9$ searches for $(Ux+Uy)$—(a trunk)

$M10$ searches for $[Uz(T1+T2+T3+T4)]$—(an operator line)

$M11$ searches for $(H3)$—(a night line)

To insure that the marker selects the first line which fulfills its criteria, the marker searches for a line only as long as signal $Im$ is true. Consequently, flip-flop $Im$ is reset as soon as an eligible line is encountered. As a line is selected, that particular line assumes state Q4. If the route search, which follows a successful hunting sequence, should fail, the marker reassumes the hunting state and endeavors to select another line as an alternate called party. It would by-pass the line previously selected because that line now exhibits state Q4 rather than state Q1. When a line is selected, the address of that line is stored within $Cn1-Cn4$ and $Dn1-Dn4$. The hunting cycle persists for a complete cycle, ending near the end of the time slot of the calling party. If the search for a particular line was successful, flip-flop $Im$ will have been reset and ($Im$ Q3) will direct the marker to enter the route search sequence (M3). If at the end of the hunt sequence signal $Im$ is true, ($Im$ Q3) will instruct the marker to begin a clearing cycle (M5).

*M6*

As was discussed previously, it is the purpose of marker state 6 to initiate a chain of marker actions which will result in the establishment of a crosspoint connection from a PABX subscriber as calling party to a trunk. This path will parallel the existing connection in which the trunk is acting as the calling party. Before a route search sequence can be entered, the address of the called party (the trunk) must be established. The marker enters M6 near the end of the time slot of the PABX subscriber who will be the calling party. The distributor address of this subscriber is written into storage areas $An1-An4$ and $Bn1-Bn4$. The only information available within the time slot of the PABX subscriber that will lead to discovery of the identity of the address of the trunk is the right hand routing information stored within the bits $P26-P31$ (PRB and PRC) of the register. This information is identical to the information found within the trunks' bits $P20-P25$ (PLB and PLC) of the registers. No other time slot will exhibit this information. Information from bits $P26-P31$ (PRB and PRC) is stored in $Cn1-Cn4$ and $Dn1-Dn4$.

The marker leaves the time slot of the PABX subscriber and searches for a time slot that displays information in bits $P20-P25$ (PLB and PLC) identical to the information now stored in the marker's $Cn1$–$Cn4$ and $Dn1$–$Dn4$ registers. When this occurs, signal $Sm$ becomes true and the distributor address of that time slot (which is that of the trunk) is written into $Cn1$–$Cn4$ and $Dn1$–$Dn4$ to replace the routing information previously recorded there. Storage areas $An1$–$An4$ and $Bn1$–$Bn4$ now contain the address of the calling party and flip-flops $Cn1$–$Cn4$ and $Dn1$–$Dn4$ store the address of the called party for the proposed connection. If the trunk should be found to be connected on both sides of the matrix ($Ls\ Rs$), a condition which precludes any additional connections, flip-flop $Im$ is set. At the end of M6 (near the end of the time slot of the calling party) as evidenced by state Q3, conditions are identical to those at the end of a normal busy test cycle (M2). (Q3 $Im'$) therefore dictates that a route search sequence (M3) should follow. The exit from states M6 to M5 by (Q3 $Im$) being true is provided for the case where flip-flop $Im$ is set in the time slot of the trunk because it was connected to both sides of the matrix, and when a route search proves the proposed connection to be impossible and flip-flop $Im$ becomes set at the end of state M3. The marker returns to the state it was in prior to state M3 (in this case M6), cycles once in that state, and since signal $Im$ is still true, exits to state M5 at (Q3 $Im$).

*M7 and M13*

Marker states seven and thirteen are quite similar in that they both are the initial stages of a transfer operation. The purpose of each is to convey information from the time slot of a PABX subscriber to the time slot of the trunk to whom that subscriber is connected. The information is simply the fact that the PABX subscriber has dialed a given number itself. The difference between states M7 and M13 is found in the dialed number. When a three digit number is involved, state M2 (busy test) succeeds state M7. If the digit "0" is dialed, state M10 (operator hunt) follows state M13. (No other dialing actions may demand the marker for a transfer.) States M7 and M13 begin in the time slot of the PABX party who has dialed to accomplish the transfer of a trunk. In order that the marker might locate the trunk, the left hand routing ($P20$–$P25$, PLB and PLC) of the subscriber is absorbed into the marker (into flip-flops $An1$–$An4$ and $Bn1$–$Bn4$). When an entrance into state M7 is imminent, the tens and units dialed by the subscriber are recorded in the marker (flip-flops $Cn1$–$Cn4$ and $Dn1$–$Dn4$) as well. In the case of state M13 this is unnecessary because the dialed digit zero is implied by the marker state itself. In the case of both states M7 and M13, the marker cycles, seeking the time slot which displays information in $P26$–$P31$ (PRB and PRC) identical to the information within the marker's $An$ and $Bn$ registers and therefore identical to $P20$–$P25$ (PLB and PLC) of the PABX subscriber endeavoring to transfer. When the trunk is located, signal $Sm$ becomes true and the distributor address of the trunk's time slot replaces the routing information that was used to locate the trunk. At the end of the trunk's time slot, states M7 and M13 change to states M2 and M10 respectively on the signal $Sm$ ($Ls\ Rs$)$'$. The exit from states M7 and M12 by ($Sm\ Ls\ Rs$) being true to state M1 is required when the trunk is already connected to a subscriber on the left and therefore incapable of supporting an additional connection.

*M17 and M18*

The answer supervision process involves the transfer of information from one time slot (that of the answering party) to another (the trunk's). Consequently, marker action is required. As the marker anticipates an entrance to state M17, right hand routing is taken from the register of the answering party and stored in marker flip-flops $Cn1$–$Cn4$ and $Dn1$–$Dn4$. When a time slot displaying left hand routing information identical to the information stored in areas $Cn$ and $Dn$, the signal $Sm$ is generated. The quantity $Sm$ M17 is sufficient to inform the trunk that its call has been answered. If the marker should find the trunk has no right hand connections, the marker returns to the idle state (M17 $Sm$). If the trunk is a called party as well as a calling party, the marker stores the crosspoint address of the right hand connection in storage areas $An$ and $Bn$. The marker state changes to M18. The marker, in state M18, searches for a time slot having the same left hand routing as the trunk's right hand routing. The signal $Sm$ is produced during the time slot of this subscriber who has called the trunk. If this subscriber is an operator, the quantity $Sm$ M18 renders an important supervisory function. If the subscriber is not an operator, no action occurs. In either case, the marker returns to the idle state at the end of the time slot in which signal $Sm$ was found to be true.

*M12*

When a subscriber, who is connected to a trunk, attempts to transfer the trunk to another subscriber and busy tone is encountered or the second subscriber fails to answer, the dialing subscriber dials the digit "2" in order to return to the trunk. Because the connection was established with the trunk as calling party, the marker must travel from the time slot of the PABX subscriber who is controlling the action to the time slot of the trunk and then perform appropriate action. In order to be able to recognize the time slot of the trunk, the marker records the left hand routing of the controlling subscriber in the $An$ and $Bn$ storage areas. When a time slot having right hand routing corresponding to this information is located, the time slot of the trunk is recognized and the signal $Sm$ is generated. If the trunk is receiving busy tone (the transfer connection could not be made), the signal $Sm$ is sufficient to remove the busy tone. The marker at the end of the trunk's time slot then goes to the idle state on the signal (M12 $Sm\ Ls$). If, however, the connection was established and a left hand connection to the trunk exists, this connection must be removed. The marker, upon the signal (M12 $Sm\ Ls$), enters a disconnection state, M15.

*M15*

During the time slot in which the marker changes its state to M15, the left hand routing registered in that time slot is stored in storage areas $An$ and $Bn$ to enable the marker to locate the time slot of the called party by a routing parity check. Storage areas $En$ and $Fn$ will, throughout state M15, supply to the transmission matrix the address of the junctor to be extinguished. When the time slot of the called party is located (when $$An=P26\text{–}P28$$

and $Bn=P29$–$P31$), signal $Sm$ becomes true. If the called party should be a trunk ($Ux+Uy$), if the trunk is a calling party in another connection ($Ls$), and if $Xm$ is not true ($Xm$ causes M15 to be ineffective, an innovation required by operator logic), the marker must, at the end of the time slot in which signal $Sm$ is generated, enter state M14. If these conditions are not fulfilled $$[Ls(Ux+Uy)Xm']'$$

the marker becomes idle at the end of the time slot during which signal $Sm$ is true.

*M14*

Whenever the marker breaks down a call in which the called party is a trunk and the trunk happens to be a calling party for another connection, the marker must determine whether the party the trunk has called has answered his phone or not. If this party has not answered, that connection must be broken down. This sequence is necessary because trunks lose control of their H-highways when they become engaged in a conversation and in this instance, would be incapable of terminating the connection to the party he called. During the time slot in which the marker enters state M14 (the time slot of the trunk)

the marker stores in storage areas $An$ and $Bn$ the left hand routing recorded in the register of the trunk. The marker (in state M14) reviews time slots until a time slot having P26–P28 (PRB) and P29–P31 (PRC) information identical to the information within storage areas $An$ and $Bn$ is discovered. Signal $Sm$ is generated; the time slot is recognized as being the time slot of the party called by the trunk. If this party has not yet answered his phone (if his state is S6 Q1), the marker enters disconnection cycle M16 at the end of the time slot in which (M14 $Sm$ S6 Q1) is true. If the subscriber has answered his phone, M14 $Sm$ (S6 Q1)' will be true and the marker will revert to the idle condition, since no further marker action is required.

M16

M15 was a marker sequence that provided a means of terminating a connection at the command (explicit or implied) of the called party. State M16 is a marker sequence that provides a means of terminating a connection at the command of the called party. When the marker anticipates a change to state M16, it records the right hand routing of the called subscriber in storage areas $Cn$ and $Dn$ and in $En$ and $Fn$. As was the case in state M15, the information is stored in storage areas $En$ and $Fn$ to make it available to the transmission circuitry that will effect the disconnection. In order to inform the calling subscriber that he has been disconnected, the marker must cycle to his time slot. The time slot of the calling party is recognized and signal $Sm$ becomes true when the marker locates a register displaying a left hand transmission address P20–P25 (PLB and PLC) that corresponds to the transmission address stored in storage areas $Cn$ and $Dn$. The quantity (M16 $Sm$) is sufficient to cause appropriate changes within the register of the calling party. At the end of the time slot in which signal $Sm$ became true, the marker enters the idle state (M1).

E2b. Parity Checker

It is essential that the framework of the marker include a number of storage areas, and that information be absorbed into these areas, processed, and discarded as a systematic response to predetermined conditions.

FIGS. 12a and 12b comprise a symbolic diagram depicting the form of the principal storage areas within the marker. Information from sources external to the marker is allowed to reach Bus A when the explicit conditions of the gating commands are fulfilled. The information on Bus A is made simultaneously available to the 16 flip-flops that comprise storage areas $An$, $Bn$, $Cn$, and $Dn$ and can be absorbed into any or all of the storage areas whenever it is expedient to retain it.

FIGS. 28–31 show how information from sources external to the marker is allowed to reach Bus A. Distributor information Tc1–Tc4 and Uc1–Uc4 are extracted from cable 150 and memory information P12–P31 are extracted from cable P. This information is gated to the four OR gates 2820, 2830, 2840 and 2850 at the proper time which is determined by logic 2810 as follows:

Logic 2810

$GDt = Me + I6(M2+M4) + I10(Bm\ Gm'\ Hm' + M1\ Q2\ Ls')$
$GDu = I8(M2+M4) + I12(Bm\ Gm'\ Mm' + M1\ Q2\ Ls')$
$GP16–19 = I6[M1\ Q2(Ls+P6')]$
$GP12–15 = I8[M1\ Q2(Ls+P6')]$
$GP20–22 = I6(Dm\ Gm'\ Mm' + M18) + I10[M1\ Q2\ Ls(S2+S4+S8) + Bm'\ Cm\ Sm]$
$GP23–25 = I8(Dm\ Gm'\ Hm' + M18) + I12[M1\ Q2\ Ls(S2+S4+S8) + Bm'\ Cm\ Sm]$
$GP26–28 = I6(Cm+M5+M1\ Q2\ Ls'\ P6+Am'\ Cm\ Sm\ S6\ Q1) + I10(M17)$
$GP29–31 = I8(Cm+M5+M1\ Q2\ Ls'\ P6+Am'\ Cm\ Sm\ S6\ Q1) + I12(M17)$

The output of OR gates 2820, 2830, 2840 and 2850 form the four-conductor Bus A which conveys information to the principal storage areas $An1$–$An4$, $Bn1$–$Bn4$, $Cn1$–$Cn4$ and $Dn1$–$Dn4$. The information is gated onto Bus A according to logic 2905 as follows:

Logic 2905

$Gate\ Bus\ A = (I6+I8)\ (M5+Am'\ Cm+M1\ Q2\ S8\ Ls') + (I10+I12)\ (M1\ Q2\ S8\ Ls+Bm'\ Cm\ Em\ Sm)$ The information is transferred from Bus A at the proper time by the gating commands from logic 2920 which is generated from the signals present in cable 150 as follows:

Logic 2920

$Set\ An = I10(M1\ Q2+Cm\ Sm+M17\ Sm)$
$Set\ Bn = I12(M1\ Q2+Cm\ Sm+M17\ Sm)$
$Set\ Cn = I6(M5+Am'\ Cm+M1\ Q2) + I10(Bm\ Cm'\ Gm'\ Hm'\ Sm)$
$Set\ Dn = I8(M5+Am'\ Cm+M1\ Q2) + I12(Bm\ Cm'\ Gm'\ Hm'\ Sm)$

The information contained in the principal storage areas is gated to the four OR gates 3110, 3120, 3130 and 3140 by the gating commands generated by logic 2930 as follows:

Logic 2930

$Gate\ An = I6(Cm+M18) + I8\ M3$
$Gate\ Bn = I8(Cm+M18)$
$Gate\ Cn = I6(M2+M4+Dm\ Gm'\ Hm') + I6\ M3$
$Gate\ Dn = I8(M2+M4+Dm\ Gm'\ Hm')$ Just as information from external sources was made available to the marker by placing it on Bus A, so information stored within storage areas $An$, $Bn$, $Cn$, and $Dn$ is presented to parity checker 3150 by gating it onto Bus B at the proper time.

Bus B is formed by the outputs of OR gates 3110, 3120, 3130 and 3140. Both Bus A and Bus B are presented to parity checker 3150.

The parity checker is a logic network that compares two binary digits, and yields an output signal (Pm) whenever the input from one source (Bus A) is identical to the information supplied by a second source (Bus B). The parity circuitry is an eight input network and parity is achieved according to the following boolean expression:

$Pm = [Ba1\ Bb1+(Ba1\ Bb1)']\ [Ba2\ Bb2+(Ba2\ Bb2)']\ [Ba3\ Bb3+(Ba3\ Bb3)']\ [Ba4\ Bb4+(Ba4\ Bb4)']$

The principal use of the parity checker is to enable the marker to seek out a particular time slot, by one of two methods. One method is based on the fact that a called party's number as dialed by the calling party is identical to the called party's distributor address. Consequently, if the dialed-tens and dialed-units digits, as recorded in the calling party's register, are stored in storage areas $Bn1$–$Bn4$ and $Cn1$–$Cn4$ respectively, and are gated to the parity checker via Bus B coincidently with the distributor tens and units encountered during each time slot in turn, the called party will be recognized by a parity checker output Pm both during the time dialed tens and distributor tens are being compared and while dialed units and distributor units are being compared.

Another method of time slot location is used to find the time slot of the party to whom another party is connected. Within each subscriber's register is recorded the crosspoint address of each connection in which the subscriber is currently participating. Thus by storing in the marker the crosspoint address of a connection and searching for a time slot in which is displayed and identical crosspoint address, the party to whom another party is connected may be located.

Because both of these methods of locating time slots depend upon the performance of the two distinct parity checks during each time slot, and because the output of the parity checker persists only as long as the input signals remain identical, the results of an individual parity check must be preserved for the duration of the time slot. Two flip-flops are employed to retain parity decisions, one being set if the first evaluation produces an output, the second flip-flop responding to the second parity check.

Because the parity circuitry operates constantly, an output is developed when no information appears on both buses. Therefore, the output of the parity checker must be used judiciously. The indiscriminate setting of the parity flip-flops is prevented by explicity specifying the conditions under which they may be set.

If parity is found, parity checker 3150 produces signal $Pm$ which sets flip-flop $Jm$ during interval $I6$ and flip-flop $Km$ during interval $I8$ in accordance with gating commands from logic 3160 as follows:

*Logic 3160*

Set $Jm = I6(M2 + M4 + M6 + M7 + M12 + M13 + M14$
$M15 + M16 + M17 + M18)$
Set $Km = I8(M2 + M4 + M6 + M7 + M12 + M13 + M14$
$+ M15 + M16 + M17 + M18)$

The information stored in flip-flops $Km$ and $Jm$ are combined with signals from cable 150 in Logic 3170 to generate signal $Sm$ as follows:

*Logic 3170*

$Sm = Jm \ Km + Rs' \ Im \ S1 \ Q1 \ Hs1 \ Hs2 \ [M8(T5+T6+T7 +T8+T9+T0) \ Uz + M9(Ux+Uy) + M10(T1 +T2+T3+T4)Uz + M11 \ H3]$

Intermediate quantity $Sm$ is used extensively throughout the system and, therefore, is included in cable 150. It means, in general terms, that the marker has discovered a time slot that fulfills criteria inherent in a particular marker state. For instance, when in state M2, the marker searches for the called party, whose time slot is recognized by the parity process. When flip-flops $Jm$ and $Km$ are set during the same time slot, signal Sm becomes true and may be interpreted as meaning that either:

(a) Double parity has occurred.
(b) The marker in state M10 has found an idle operator line.
(c) The marker in state M9 has found an idle trunk.
(d) The marker in state M8 has found an idle conference line.
(e) The marker in state M11 has found an idle night call recipient.

E2c. Path Finder

Figure 26:
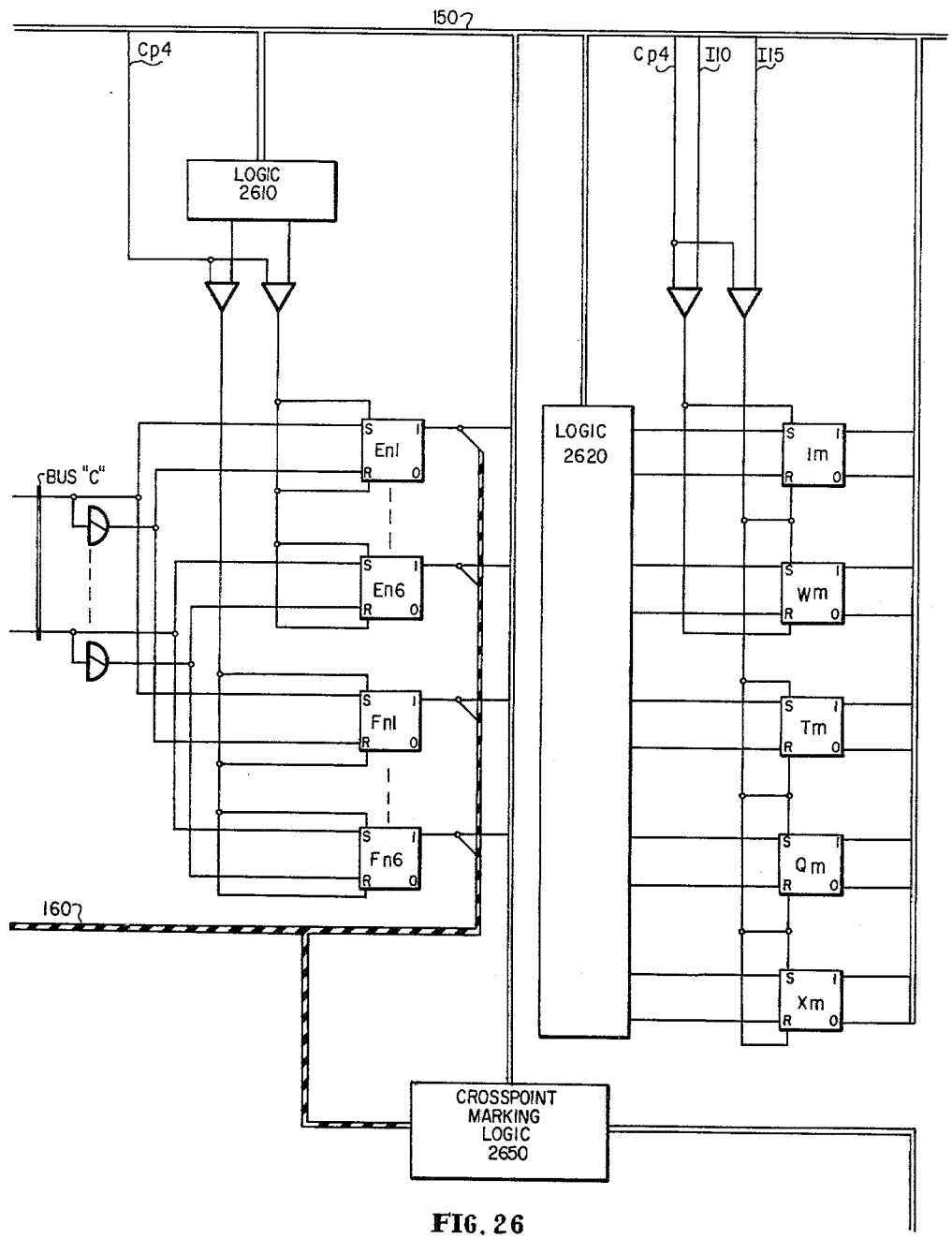
Figure 27:
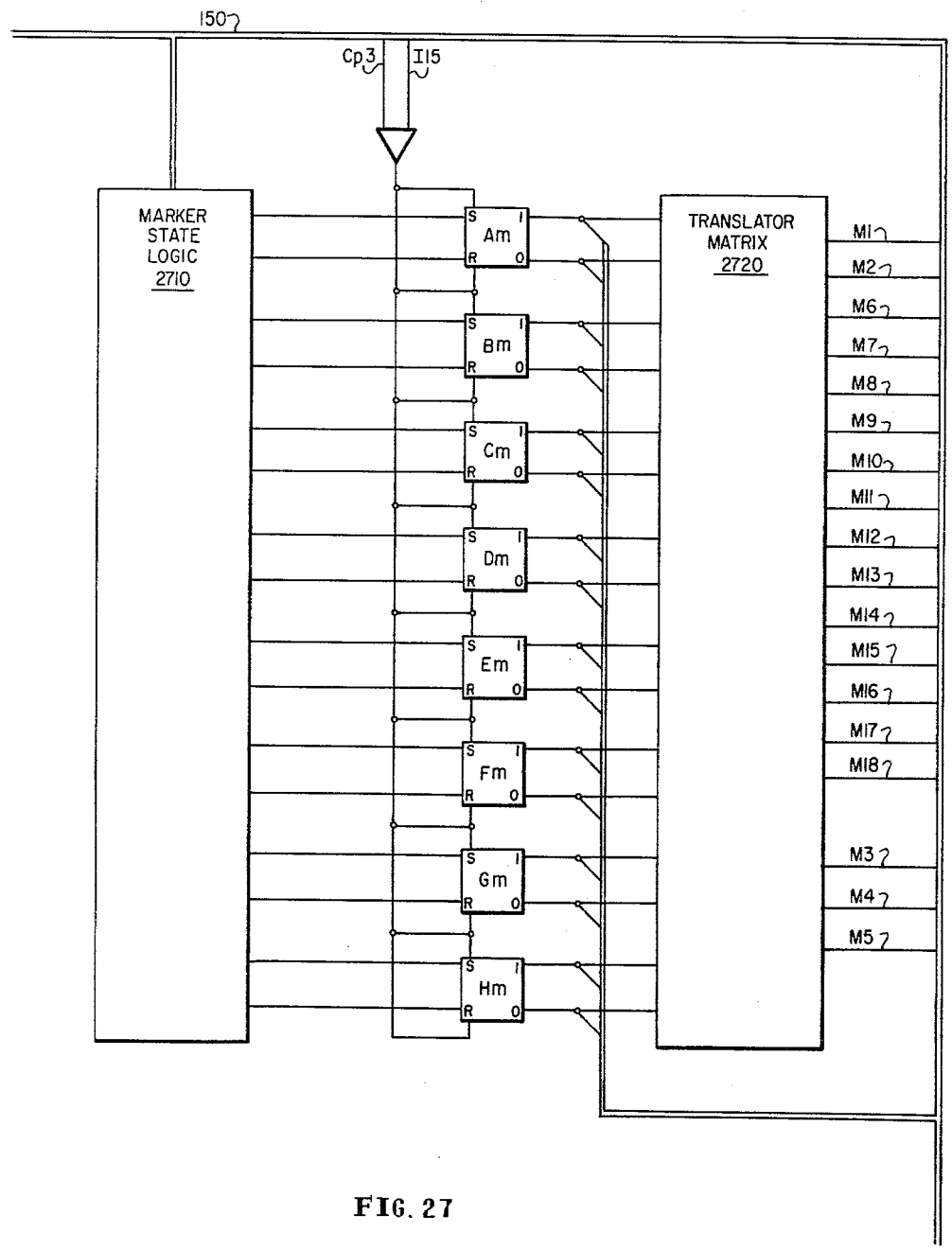
Figure 28:
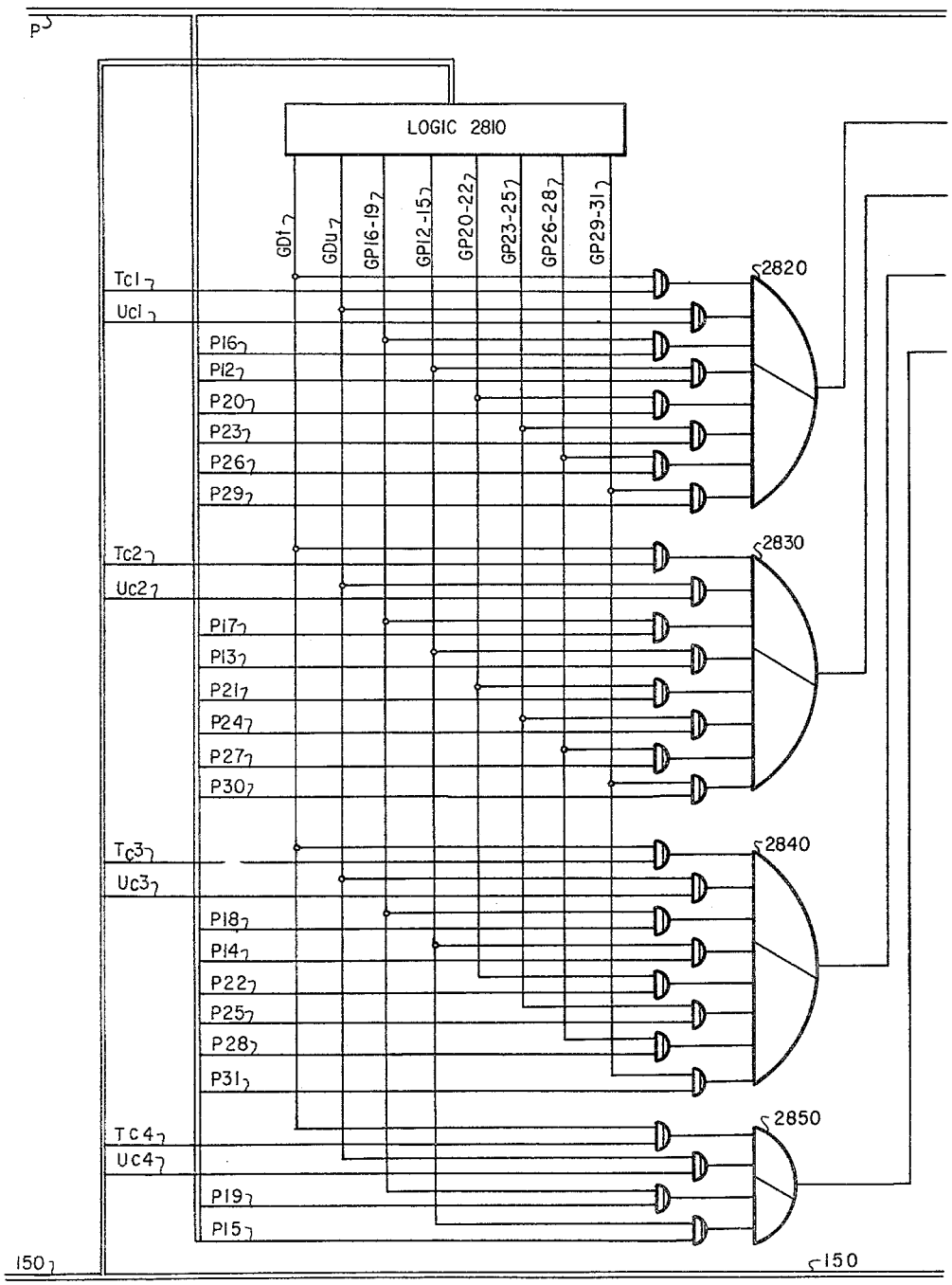
Figure 29:
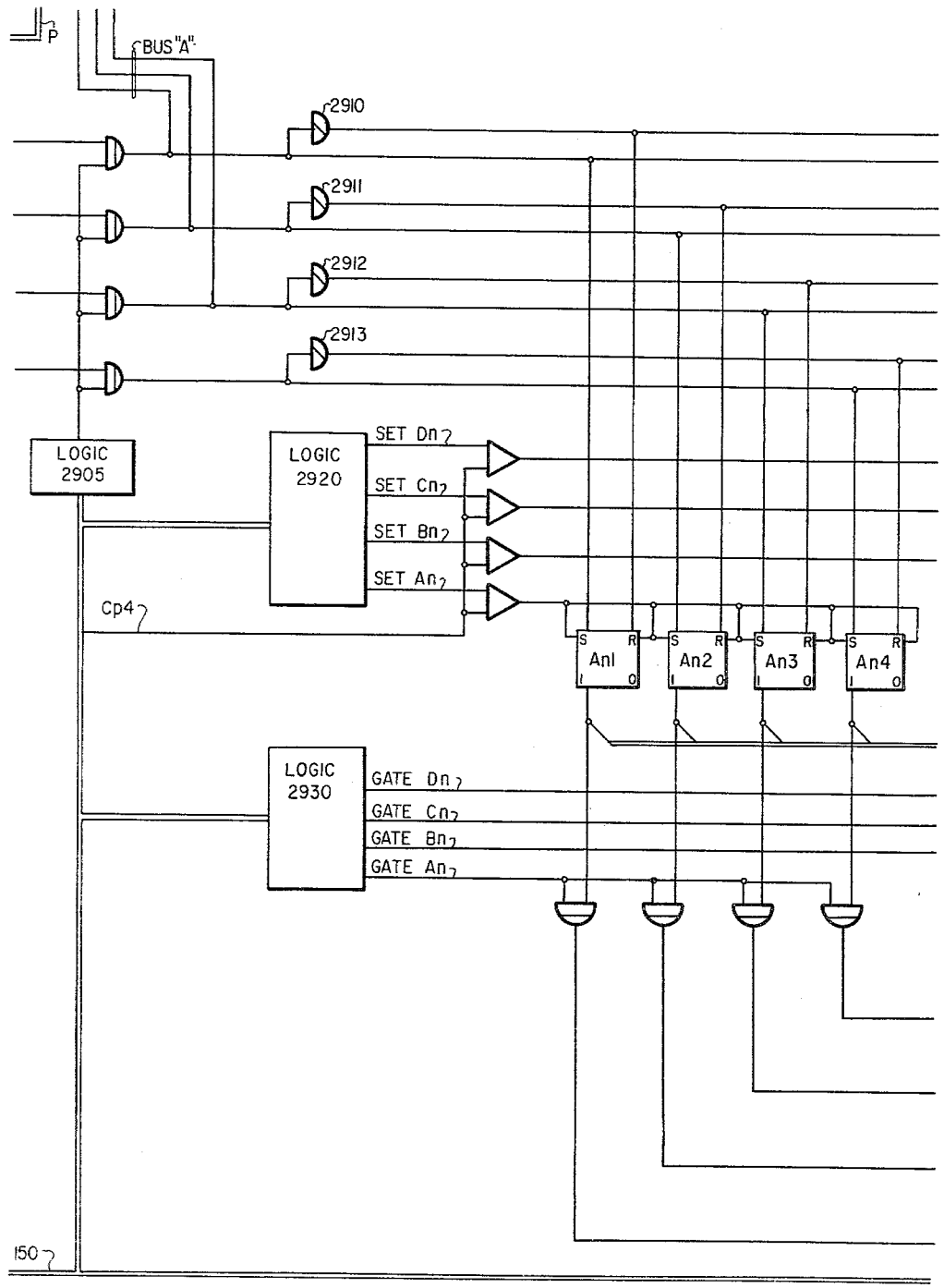
Figure 30:
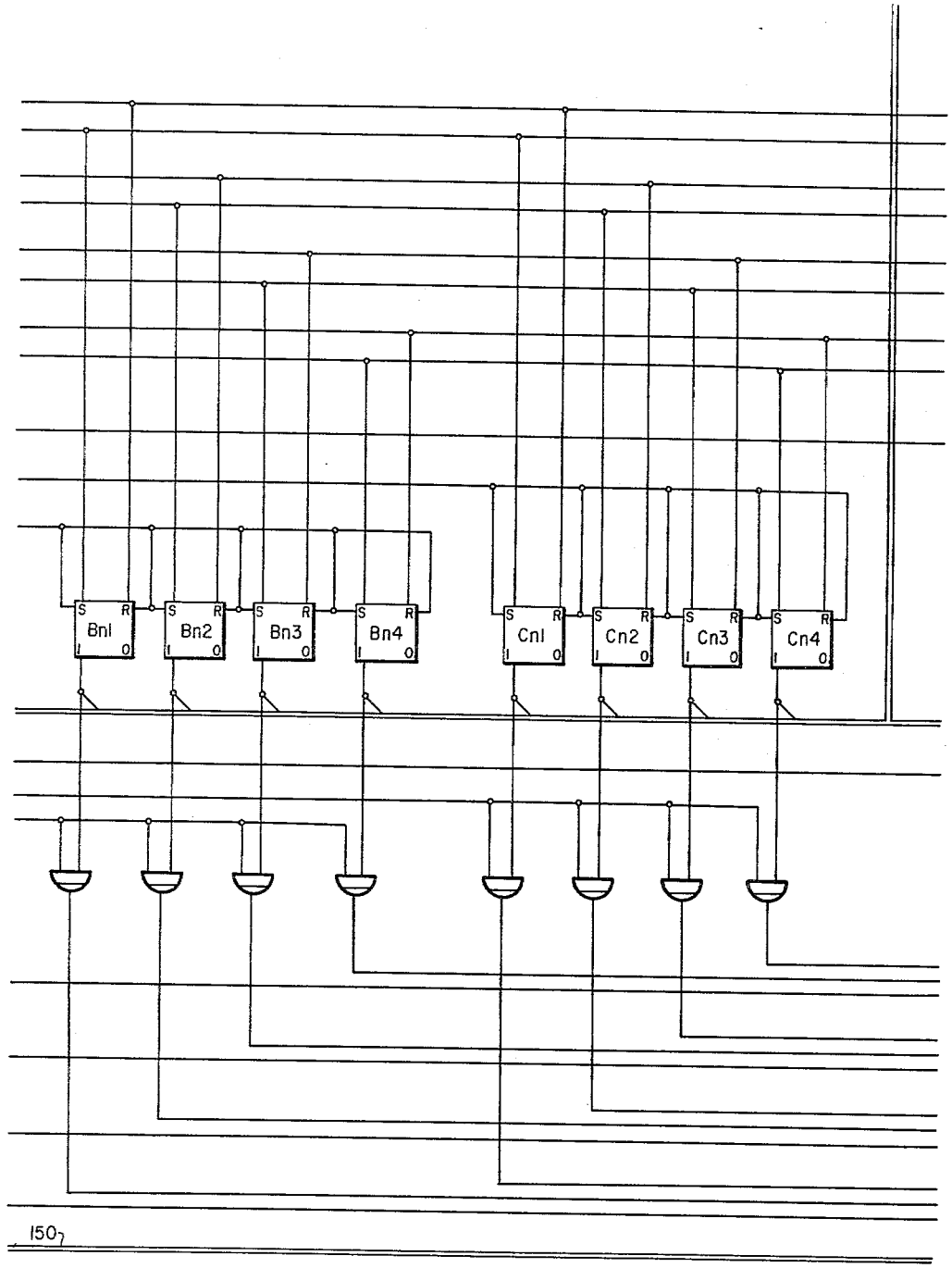
Figure 31:
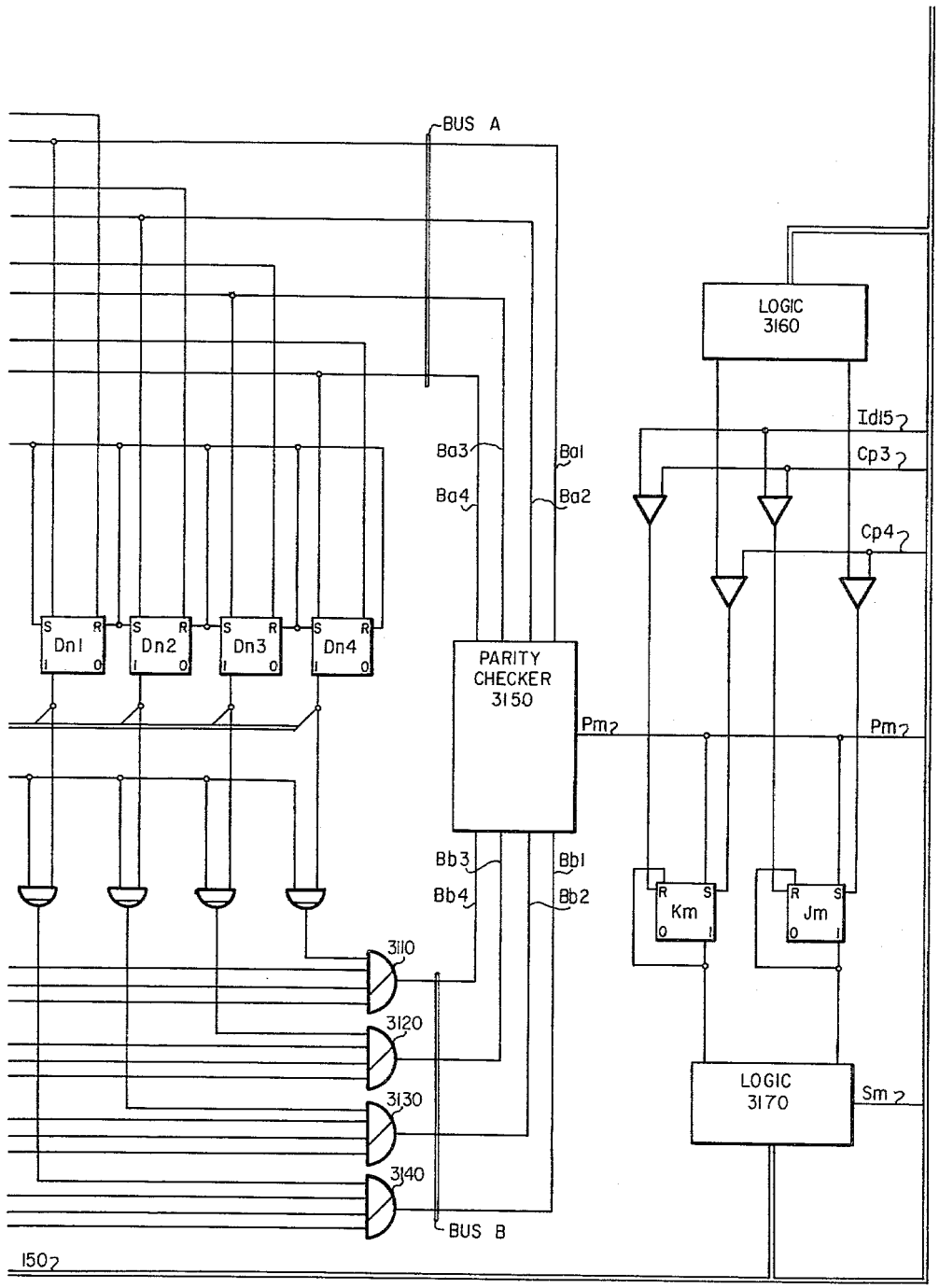

Referring now to FIGS. 25–26, binary information from Bus A is translated to a one-out-of-six code 2541–2546 by translator matrix 2540 and binary signals P23–P25, P26–P28, and P29–P31 are translated by translator matrices 2510, 2520, and 2530 to one-out-of-six codes 2531–2536, 2511–2516, and 2521–2526 respectively. Translated information 2511–2516 and 2521–2526 is added to cable 160 to provide information to crosspoint matrix 110. Translated signals 2521–2526 and 2531–2536 are gated at the proper time to flip-flops $Rm1$; $Rm6$ during $Cp3$ and in accordance with logic 2550 as follows:

*Logic 2550*

A.C. Set $Lm = I8 \ M3 \ Pm$
A.C. Reset $Lm = I15 \ Q3$
A.C. Set $Rm = I6 \ M3 \ Pm$
A.C. Reset $Rm = I15 \ Q3$ During state M3, path finder 2560 must be provided with the numbers of the XB and XC switches that are unavailable for use for a proposed connection. Storage areas $Lm$ and $Rm$ compile, during state M3, a list of the unavailable XB and XC switches respectively. There is a $Lm$ flip-flop that corresponds to each XB switch and a $Rm$ flip-flop that corresponds to each XC switch. If, during $I8$ of a time slot, a parity check reveals that the subscriber being reviewed is served by the same XA switch as the calling party, the flip-flop within the $Lm$ storage group corresponding to the XB switch that this subscriber is using (as recorded in his P20–P22 register) is set. The $Rm$ flip-flops are similarly set during $I6$ when a parity check shows a subscriber to be a member of the same tens group as the called party. Flip-flops $Rm1$–$Rm6$ are set in accordance with information found within P29–P31 registers.

Information from flip-flops $Rm1$–$Rm6$ and $L1m$–$Lm6$ and the 36 junctor flip-flops $Fj11$–$Fj66$ from cable 160 are introduced to the path finder logic 2560 in order to generate the 13 signals $Ln1$–$Ln6$, $Rn1$–$Rn6$ and $Nn$ as follows:

*Path Finder Logic 2560*

The pathfinder determines which routes are available between the calling tens group and the called tens group.

$In11 = Lm1' \ Rm1' \ Fj11'$—(Route 11 is available)
$In12 = Lm1' \ Rm2' \ Fj12'$—(Route 12 is available) and so on to
$In66 = Lm6' \ Rm6' \ Fj66'$—(Route 66 is available) and in general
$Inab = Lma' \ Rmb' \ Fjab'$—(Route $ab$ is available)

The path finder selects one of the available routes or indicates no route available ($Nn$).

$Ln = In11 + In12 + In13 + In14 + In15 + In16$
$Ln2 = Ln1' \ (In21 + In22 + In23 + In24 + In25 + In26)$
$Ln3 = Ln2' \ Ln1' \ (In31 + In32 + In33 + In34 + In35 + In36)$
$Ln4 = Ln3' \ Ln2' \ Ln1' \ (In41 + In42 + In43 + In44 + In45 + In46)$
$Ln5 = Ln4' \ Ln3' \ Ln2' \ Ln1' \ (In51 + In52 + In53 + In54 + In55 + In56)$
$Ln6 = Ln5' \ Ln4' \ Ln3' \ Ln1' \ (In61 + In62 + In63 + In64 + In65 + In66)$
$Rn1 = Ln1 \ In11 + Ln2 \ In21 + Ln3 \ In31 + Ln4 \ In41 + Ln5 \ In51 + Ln6 \ In61$
$Rn2 = Rn1' \ (Ln1 \ In12 + Ln2 \ In22 + Ln3 \ In32 + Ln4 \ In42 + Ln5 \ In52 + Ln6 \ In62)$
$Rn3 = Rn2' \ Rn1' \ (Ln1 \ In13 + Ln2 \ In23 + Ln3 \ In33 + Ln4 \ In43 + Ln5 \ In53 + Ln6 \ In63)$
$Rn4 = Rn3' \ Rn2' \ Rn1' \ (Ln1 \ In14 + Ln2 \ In24 + Ln3 \ In34 + Ln4 \ In44 + Ln5 \ In54 + Ln6 \ In64)$
$Rn5 = Rn4' \ Rn3' \ Rn2' \ Rn1' \ (Ln1 \ In15 + Ln2 \ In25 + Ln3 \ In35 + Ln4 \ In45 + Ln5 \ In55 + Ln6 \ In65)$
$Rn6 = Rn5' \ Rn4' \ Rn3' \ Rn2' \ Rn1' \ (Ln1 \ In16 + Ln2 \ In26 + Ln3 \ In36 + Ln4 \ In46 + Ln5 \ In56 + Ln6 \ In66)$
$Nn = Ln1' \ Ln2' \ Ln3' \ Ln4' \ Ln5' \ Ln6'$

Path finder information $Ln1$–$Ln6$ and $Rn1$–$Rn6$ are gated to the six OR gates 2581–2586 by logic 2570 as follows:

*Logic 2570*

Gate $Ln$—$I10(M3 \ Im' \ Q3)$
Gate $Rn$—$I12(M3 \ Im' \ Q3)$

The output of OR gates 2581–2586 form Bus C to provide information to flip-flops $En1$–$En6$ and $Fn1$–$Fn6$. Signals $En1$–$En6$ and $Fn1$–$Fn6$ are transferred to cables 150 and 160 at the proper time by the commands from logic 2610 as follows:

*Logic 2610*

A.C. Set $En = I6(M5 + Am \ Cm + M1 \ Q2 \ S8 \ Ls')$
$+ I10(M1 \ Q2 \ S8 \ Ls + Bm' \ Cm \ Em \ Sm$
$+ Me \ Im' \ Q3)$
A.C. Set $Fn = I8(M5 + Am' \ Cm + M1 \ Q2 \ S8 \ Ls')$
$+ I12(M1 \ Q2 \ S8 \ Ls + Bm' \ Cm \ Em \ Sm$
$+ M3 \ Im' \ Q3)$

The $En$ and $Fn$ storage areas are used to convey crosspoint addresses from the path finder to the crosspoint network via cable 160 and to subscribers in process of establishing a connection via cable 150. These storage areas are also used to convey information from a subscriber to the crosspoint network in the case of the disconnection. Information continually appears at the D.C. set input of these flip-flops. The number of these flip-flops within the E$n$ group or F$n$ group is the same as the number of XD or XC switches within the crosspoint network because the coding of these switches is of a one-out-of-N basis. Consequently, translation matrix 2540 is necessary between Bus A and Bus C in order to change the coding of crosspoint address information used in the subscriber's register to conform with the code recognized by the crosspoint network.

The signals required by the crosspoint network from the marker via cable 160 are shown in FIG. 3. The signals $ou$, $ot$, $rt$, and $ru$ are derived from the outputs of flip-flops A$n$1–A$n$4, B$n$1–B$n$4, C$n$1–C$n$4, and D$n$1–D$n$4 by way of buffer amplifiers and translation matrices in the crosspoint marking logic unit 2650 (FIG. 26). The A.C. commands for the junctor flip-flops are generated in logic unit 2650 as follows:

Logic 2650

$SJP = (I8+I10+I12+I13)M4\ Q3\ Cp3$
$RJP = \{Sm(M15\ Xm'+M16)+M5\ Q3(A1+Ar)\}Cp4$
$SRP = M4\ Q3(I8+I10+I12+I13)Cp4$
$RRP = \{Tb(S6+Q4)'+Sm(M15\ Xm'+M16)\}$
$(I8+I10+I12+I13)Cp4$

E2d. Miscellaneous flip-flops

The flip-flops I$m$, W$m$, T$m$, O$m$, and X$m$ are used to generate miscellaneous commands. The flip-flop I$m$ is set to indicate that a proposed connection is impossible. Flip-flop T$m$ is set to indicate that a dialed number is not equipped with line equipment. Flip-flop Q$m$ indicates that a trunk is involved in the pending connection. Flip-flop W$m$ is set at the beginning of state M4 and reset at the end of state M5. Finally, flip-flop X$m$ is associated with the operations involving the operator. These flip-flops are set and reset by logic 2620 as follows:

Logic 2620

D.C. Set $Im = M1\ Q2\ S2(P6'+Ls\ "0")+M2\ Sm)S1'$
$+Hs2'+Hs1')+M3\ Nn+M6\ Sm\ Ls\ Rs$
D.C. Reset $Im = M5\ Q3+Sm(M8+M9+M10+M11)$
D.C. Set $Wm = M3\ Im'\ Q3$
D.C. Reset $Wm = M5\ Q3$
D.C. Set $Tm = (U11+U12)\ (M4\ Sm+M3\ Im'\ Q3)$
D.C. Reset $Tm = (U11+U12)'\ M4\ Sm+M5\ Q3\ Ux$
D.C. Set $Qm = Sm\ Hs1'\ Hs2'+M10\ Im\ Q3\ Ux$
D.C. Reset $Qm = M5\ Q3$
D.C. Set $Xm = M13\ Sm(Ls+Rs)'$
$+S8\ Q1\ P6\ Ls\ P7'\ Aa\ Ba\ Ca$
D.C. Reset $Xm = I15\ CP-3$ The miscellaneous flip-flops provide information which is included in cable 150 at the proper time by gating commands from the distributor to the A.C. set and reset leads of the flip flops.

E3. CONNECTIONS

When the marker is idle and encounters the time slot of a subscriber who has completed dialing three digits (corresponding to the telephone number of a second subscriber), it must perform a series of operations that will result in the establishment of an audio connection between the two subscribers.

Before concerning itself with the problem of establishing the connection, the marker enters a 16-millisecond busy-test cycle which will determine if the called party is available. Before leaving the time slot of the calling party, the marker absorbs into its storage areas the last two digits dialed by the calling party. These digits correspond to the distributor address (time slot) of the called party. Through the use of its parity-checking apparatus during the subsequent review of time slots, the marker can identify the time slot of the called party and, by analyzing the memory word of the subscriber, determine if he is free to become a called party. No further action occurs until the calling party's time slot is again encountered.

When the question of subscriber availability has been resolved, the marker must concern itself with the selection of an available route through the crosspoint network which will link the two subscribers. Referring to FIG. 3, it is apparent that in order for a connection to be available from, for instance, subscriber 32 to subscriber 68, links must be free from switch XA3 to a B switch, from switch XD6, to a C switch, and from the chosen B switch to the chosen C switch.

The route-search cycle begins at the end of the time slot of the calling party, and persists for a complete machine cycle. During the cycle, the marker inspects the memory word of each subscriber within the system, and notes which B switches and which C switches are in service. B switches currently in use by subscribers who are served by the same A switch as the calling party are listed by the marker as unavailable for the proposed connection. Similarly, C switches being used by subscribers of the same D switch as the called party are noted as being unavailable. During the cycle the transmission network supplies the marker with information regarding junctor availability so that, when the time slot of the calling party is again reviewed, the marker has determined which, if any, routes may be employed in establishing the required connection and which one, if more than one are free, is to be used.

Immediately following a successful route-search cycle are two complete machine cycles, during which the marker instructs the crosspoint switching network as to the crosspoint route that must be activated. During these cycles the marker informs the subscriber logic of the nature of the connection, in order that the memory words of the participating parties may be revised accordingly. At the completion of these cycles the marker returns to the idle condition. The process of establishing a connection has taken a total of 48 milliseconds.

E4. THE HUNTING SEQUENCE

Whenever the marker is called upon to connect a subscriber to any one of a group of lines (as in the case of a subscriber calling a trunk) the marker must select not only an idle member of the group but one to which a free transmission path exists as well. Each type of line-hunting activity is characterized by a search for a line fulfilling criteria based upon some quality of the peculiar class of lines. A search for a trunk will culminate in the discovery of a time slot designated by U$x$ or U$y$, because only trunks are assigned these locations. A time slot exhibiting H3 would satisfy the marker when searching out a line to which to connect an incoming PBX trunk call during night-service hours. Of course any line to be selected must be idle.

Another factor that is a part of the criteria common to all hunting operations must also be considered. Once the marker has selected a particular line to which it will attempt to discover a free route, it must become insensitive to other lines which might satisfy the basic conditions of the search. When the marker enters the hunting state, a flip-flop, I$m$ is set. The flip-flop remains set only so long as the marker is unable to locate a subscriber fulfilling the hunt criteria. When a line is selected, the flip-flop is reset; this prevents the marker from actively continuing the hunt.

When a line has been selected as a prospective called party, and its distributor address absorbed into the marker, the marker returns to the time slot of the calling subscriber and enters a route-search cycle state M3. If successful, the marker in states M4 and M5 instructs the transmission network to establish the connection. If, however, the route search is unsuccessful and no free route is found, the marker reenters the hunting state and attempts to select another line for use as a called party. It must now pass over the line that was previously selected. To accomplish this, every line, upon being selected as a called party, is acted upon to display state Q4. The common criteria which must be fulfilled in order for a line to be selected as a called party during a hunting action have now been expanded to include:

(1) The line must be idle.
(2) The marker must not have previously selected a line during the same hunt sequence.
(3) The line must not have been previously selected during the same call.

The use of the flip-flop $Im$ as the device that allows the marker to actively search proves advantageous; if no line is selected during the hunting cycle, signal $Im$ will still be true when the calling party's time slot is encountered—a condition that indicates to the subscriber that the desired connection is unobtainable.

F. ATTENDANT AND CONFERENCE CIRCUITS

As shown in FIG. 1, the attendant's cabinet 128 comprises equipment common to her four line circuits, and equipment individual to each of the four operator's lines L1z–L4z. There is also an attendant's telephone 2306 which may be connected selectively to any one of the four lines. The four operator's lines are connected respectively to their line circuits LC1z–LC4z to either the left hand or right hand side of the crosspoint network 110. The conference line circuits LC5z–LC0z have connections only by way of $Ld$ links to the right hand side of the crosspoint network 110. The conference lines L5z–L0z are connected in common to a conference multiple CF. The attendant's cabinet is also provided with individual conference keys to connect with the respective line circuits to the conference multiple.

The functional block diagram FIG. 23 shows the common portion of the attendant's cabinet in block 2305 and the equipment individual to line L1z in block 2301. The attendant's telephone 2306 is shown symbolically. The functional block diagram of FIG. 24 shows one of the operator's line circuits LC1z and one of the conference line circuits LC5z. FIGS. 23 and 24 should be placed together as shown in FIG. 36.

The attendant's cabinet is arranged to display on her console a common ring key 2344 for audible alarm, a common night key 2342, and a conference lamp 2346. The console also displays for each of the line positions an answer key 2318 (normal, answer, and hold), a conference key 2314, a trunk lamp 2316, and a local lamp 2317.

In the normal position the answer key 2318 disassociates the operator's telephone 2306 from her line circuits. In the answer position, the operator's handset 2380 is connected to the line circuit corresponding to that position. In the hold position the handset 2380 is removed from connection to the line equipment and the holding resistor 2319 is connected across the line. The handset 2380 may then be associated with any other line circuit without releasing the connection on the held circuit. Two logic signals are generated through contacts of the answer key 2318. The signal $Ak1$ becomes true when the answer key is in either the hold position or the answer position. The lead $Da1'$ is at ground potential, and therefore the signal condition $Da1$ is true when the answer key is in the hold position or, if the dial springs 2382 in the operator's instrument are closed, when the key is in the answer position. Therefore signal $Da1'$ is responsive to dialing if the key 2318 is in the answer position.

The conference key 2314 when operated connects the operator's line circuit L1z to the meet-me-conference multiple CF. In this way trunk circuits, which are not allowed to access the meet-me-conference circuit via normal connections, may be associated with the conference through the attendant's line equipment. Operating the conference key causes the logic signal $Ck1$ to become true. This signal is connected along with the similar signals $Ck2$–$Ck4$ from the other operator's lines to OR gate 2360.

Note that throughout this system the true logic condition is indicated by −10 volts, and the false logic condition is indicated by ground.

While the flashing light situation exists for one of the attendant's line circuits, the tone ringer 2306 in her telephone instrument will be activated if the audible alarm key 2344 is placed on the ON position. This generates the logical signal $Rk$ which enables the logic unit 2348 in conjunction with other logic input signals from cable 150. When the output of logic unit 2348 is true the tone gate 2350 is enabled to connect ring tone from contacts of key 2344 to the tone ringer 2384. For night service the key 2342 is operated to the ON position which disconnects ground from the lead $Nk$ so that this logic condition becomes true.

Operator's lines, because of their requirements for control and supervisory facilities in excess of those required by the average subscriber, are provided three coding flip-flops to record unique situations that occur as the operator processes calls. For line L1z these flip-flops are $Aa1$, $Ba1$, and $Ca1$. These holding flip-flops, as well as the logic signals developed by the keys on the operator's console, provide information that can be used to form artificial signals to the highway H for the operator and to regulate the supervisory lamps on the operator's console. As shown in Table IV, there are ten states A1–A10 for the attendant. The table includes a description of the states. The code for the states is as given by the flip-flops $Aa$, $Ba$, $Ca$, and the signal $Ak$ for each line as shown in the table. The table also shows the lamp conditions for each state, and the general condition on highway conductor H1. An asterisk indicates that the condition of highway conductor H1 is also determined by the signal $Da1$ in accordance with the dial springs 2382.

TABLE IV

| State | Description | A1 | A1 | B1 | C1 | Trunk lamp | Local lamp | Hs1 |
|---|---|---|---|---|---|---|---|---|
| A1 | Idle | 0 | 0 | 0 | 0 | Off | Off | 1 |
| A2 | Seized by an incoming PBX trunk | 0 | 1 | 0 | 0 | Flash | Off | 1 |
| A3 | Called a trunk or answered a PBX call or recall | 1 | 1 | 1 | 0 | On | Off | 0* |
| A4 | Transferred a trunk (supervising) | 1 | 1 | 1 | 1 | On | On | 0* |
| A5 | Transferred a trunk (not supervising) (Hs1) | 0 | 1 | 1 | 1 | On | On | 1 |
| A6 | Transferred a trunk (not supervising) (Hs1') | 0 | 0 | 1 | 1 | On | On | 0 |
| A7 | Returned to trunk to supervise call | 1 | 0 | 1 | 1 | On | On | 0* |
| A8 | Local seizure | 0 | 0 | 0 | 1 | Off | Flash | 1 |
| A9 | Answered local call or called local party | 1 | 0 | 0 | 1 | Off | On | 0* |
| A10 | Seized by a trunk (recall) | 0 | 0 | 1 | 0 | On | Flash | 1 |

The attendant's flow chart below shows the logical commands for transitions between different attendant states.

ATTENDANT'S FLOW CHART

| From— | To— | Command |
|---|---|---|
| A1 | A2 | M5 Q4 P6 Xm |
|  | A3 | M4 (M9) Q3 |
|  | A8 | S6 P6' Ak' |
|  | A9 | S6 P6' Ak |
|  | A10 | M5 Q4 P6 Xm |
| A2 | A1 | Ls' Rs' |
|  | A3 | S6 Q2 |
| A3 | A1 | Ls' Rs' |
|  | A4 | S4 Q2 P6 Ls M1 |
| A4 | A5 | Ak' |
| A5 | A1 | Ls' Rs' |
|  | A6 | Ak |
| A6 | A7 | M18 Sm |
|  | A7 | Ak |
| A7 | A1 | Ls' Rs' |
|  | A3 | S2 Q2 P6 Ls "2" |
| A8 | A1 | Ls' Rs' |
|  | A9 | Ak |
| A9 | A1 | Ls' Rs' |
| A10 | A1 | Ls' Rs' |
|  | A3 | S6 Q2 |

The flip-flop $Xm$ in the marker is provided for logical functions associated with the attendant. This flip-flop has two functions. The first provides for distinguishing between incoming PBX call and the seizure of an attendant's line during a recall action. Another function occurs during an operator hunt state (M10) of the marker if accessed via the "transfer to an operator" state (M13), that is if the logic condition M13 $Sm$ $(Ls\ Rs)'$ occurs within a subscriber's time slot, the flip-flop $Xm$ is set. It then influences the logic of the operator's line circuit chosen during the hunt cycle. Flip-flop $Xm$ is reset at the end of marker state M5.

The flip-flop $Xm$ is also set when the operator, in transferring a trunk to a PABX subscriber, discontinues active supervision of the call. The marker begins a disconnection cycle (M15). Because flip-flop $Xm$ is set, the disconnection is ineffective. The trunk logic, however, reacts to the signal $Xm$ by unsilencing the trunk and allowing the trunk to supervise its own transfer.

Each line position such as 2301 has a trunk lamp 2316 and a local lamp 2317 to inform the operator of the identity of a caller. Flashing lamps require attention; steadily burning lamps indicate a particular connection exists.

In addition to these individual line circuit lamps, the operator has a common conference lamp 2346 that indicates the condition of the meet-me-conference unit. When the meet-me-conference circuit is in use, lamp 2346 burns steadily. The flip-flops $Ga$ and $Ha$ interrogate the time slots of the conference circuits to determine if they are in use. The lamp 2346 flashes if no subscribers are using the conference facilities and the operator has placed a conference key in the ON position.

The operator's telephone 2306 is a normal subscriber's telephone instrument modified. The modifications consist of isolating the dial springs 2382 and the tone ringer 2384 from the remaining circuitry and in providing separate connections for these devices.

The D.C. set and reset commands are obtained from logic unit 2320 as follows:

*Logic 2320*

D.C. Set $Aa\ = M5\ Q4\ P6\ Xm + S2\ Q2\ P6\ Ls\ "2"$
$+(M4+M9)\ Q3+S6\ Q2$
D.C. Reset $Aa = Ls'\ Rs' + M18\ Sm(Ak1\ T1\ Uz$
$+Ak2\ T2\ Qz+Ak3\ T3\ Uz+Ak4\ T4\ Uz)$
$+S8\ Q2\ M1$
D.C. Set $Ba\ = S6\ Q2 + M5\ Q4\ P6\ Xm+(M4+M9)\ Q3$
D.C. Reset $Ba = Ls'\ Rs' + M18\ Sm(Ak1\ T1\ Uz$
$+Ak2\ T2\ Uz+Ak3\ T3\ Uz+Ak4\ T4\ Uz)$ D.C. Set $Ca\ = S4\ Q2\ P6\ Ls\ M1+S6\ P6'$
D.C. Reset $Ca = Ls'\ Rs' + S2\ Q2\ P6\ Ls\ "12"$
$+M18\ Sm(Ak1\ T1\ Uz+Ak2\ T2\ Uz$
$+Ak3\ T3\ Uz+Ak4\ T4\ Uz)'$ Note that the above equations, because they are composed of memory quantities, are multiplex equations. Therefore, the logic unit 2320 may be time shared by the four operator circuits. The A.C. set and reset commands are supplied by gated pulse amplifier 2321 having an input from AND gate 2323 and from signal lead $Cp3$ during interval I15 of the time slot of the particular operator circuit which in this case is $L1z$.

The signals to the highway H are supplied during the particular time slot as indicated by the output from gate 2326, with the signal to highway conductor H2 always true during this time slot and the signal on highway conductor H1 determined by logic from unit 2322 and the signal $Da1'$ through gate 2324. The logic conditions for the lamps 2316 and 2317 are also supplied from logic unit 2322.

*Logic 2322*

$Hs1 = (Da+Aa'\ Ba\ Ca\ Ak') = Da'\ A6'$
$Hs2 = 1 =$ always true
Trunk lamp $= Aa\ Mb+Ba$
Local lamp $= Ca\ (Ak+Ba+Mb)+Mb\ Aa'\ Ba$ The logic for the conference lamp 2346 is indicated in detail in the equipment 2305. The signal is applied from a gate 2354 which is indicated as being an AND gate having its output inverted. Therefore, if the flip-flop $Ha$ is set the conference lamp burns steadily. If the flip-flop $Ha$ is in the reset condition and any one of the conference keys is operated a signal from OR gate 2360 is combined with the 120 IPM signal through gate 2356 to cause the lamp 2346 to flash.

The A.C. set and reset commands for the flip-flops $Ha$ and $Ga$ are supplied from gated pulse amplifier 2358 in response to coincidence of the signals $Cp3$ and I15. The D.C. set and reset commands are supplied from logic 2352.

*Logic 2352*

D.C. Set $Ga\ = Rs\ Uz\ (T5+T6+T7+T8+T9+T0)$
D.C. Reset $Ga = T4\ Uz$
D.C. Set $Ha\ = Rs\ Uz\ (T5+T6+T7+T8+T9+T0)$
D.C. Reset $Ha = T4\ Uz\ Ga'$ Referring to FIG. 24, the operator's line circuit $LC1z$ is generally similar to a normal subscriber line circuit, except for the arrangement for supplying the signal tone $Hb$ through the signal tone gate 2430 for outgoing dialing over a trunk. There is no current detector associated with the line loop $L1z$. Instead a special arrangement is provided so that the tone gate 2430 is controlled by the operator's dial springs 2382 when the answer key 2318 of that line is in the answer position. Thus when the enabling signal $Aq1z$ from the flip-flop associated with this line is set to provide an enabling signal for outgoing dialing, the gate 2430 is controlled by the output from gate 2401.

The conference line circuit $LC5z$ is a greatly simplified equipment. Thus there is no current detector or any of the tone gates provided. The highway signals H1 and H2 are both true during the corresponding time slot as indicated by the output from gate 2451. Thus this line circuit cannot be a calling line and is always indicated as idle by the signals on the highway H.

*Camp-on Busy.*—A camp-on busy feature is incorporated to insure that an incoming call on a PBX trunk $(Ux)$ is serviced by the operator. Refer to the "Subscriber Flow Chart" in section E1, the "Marker Flow Chart" in section E2a, and the equation in section E2d for setting flip-flop $Qm$. Upon detecting a call, the subscriber logic of the trunk enters state (S2 Q1), and the signal (P7 Ux) causes it to go to state (S2 Q2). This causes the marker to go from state M1 to state M10 to hunt for an operator line while the subscriber logic goes to state (S2 Q3). If the operator lines are all busy, flip-flop $Qm$ is set, in response to the condition (M10 Im Q3 Ux). The marker goes to state M5 to clear. However, the subscriber logic goes from state (S2 Q3) back to state (S2 Q2). Therefore in a succeeding cycle, the marker is again seized. This is repeated until an operator line becomes idle and the connection is established.

*Called Line Unequipped.*—When the marker in processing a call discovers that the called line number is that of an unequipped line, the condition (Sm Hs1' Hs2') causes flip-flop $Qm$ to be set. While the marker is clearing, the subscriber logic of the calling line in response to the condition (M5 Qm) goes from state (S4 Q3) to state (S2 Q2). Also, as shown by gate 3358 in FIG. 33, the signal (M5 Q3 Qm) causes the digit "0" to be written in the memory. This causes the call to be routed to an operator line for intercept.

G. ESTABLISHING CONNECTIONS

G1. GENERAL

The means for establishing the various connections can be shown by depicting the network in a simplified form, as in FIG. 13. All the line equipment associated with PABX subscribers, operator positions, and trunks are physically tied to both sides of the switching network, by an $La$ link on the calling side and an $Ld$ link on the called side. Therefore, a caller may act as either a calling or a called party, as a calling and a called party, or neither (handset on hook). Also, no subscriber is permitted to have more than one left- or right-hand connection at a time. A connection is established when there is a path through the switching network and there is a calling party tied to the left end of the path and a called party tied on the right. With the above criteria established, a description of the different types of connections follows. A scheme of pictorial representation of the network 110 in the various connections is used.

G2. LOCAL CONNECTION

Let us assume that local subscriber L32 (calling party) wishes to call another local subscriber L68 (called party). When the calling party removes his handset from the cradle, the common control subscriber logic will review his status and, if conditions are proper, will order that dial tone be returned to the subscriber to direct him to commence dialing.

By dialing the access digit "6," a PABX subscriber makes known to the subscriber logic that he wishes to make a local call. Upon dialing the second and third digits, which represent the "tens" and "units" of the called party's address, a demand for marker action is established. If the subscriber meets all conditions as an eligible party, the marker will locate, route, and establish a connection. The calling party will be connected on the left and called party will be connected on the right-hand side of the switching network. The connection can be shown as in FIG. 14.

Ringback tone and ringing frequency will be returned to the calling party and called party respectively. After the called party L68 answers, he will have established an audio connection through the crosspoint network to calling party L32.

Table V shows the states of the calling and called parties and of the marker, and the commands which produce the changes of state during the call. An asterisk (*) indicates that a command occurs in the same time slot as the command immediately above it in the table.

TABLE V

| Command | States | | |
|---|---|---|---|
| | Marker | L32 | L68 |
| Hs1' Hs2 | | S1 Q1 | S1 Q1 |
| P7 Qs1 "6" Ls' | | S2 Q1 | |
| P7 Qs1 | | S3 Q1 | |
| P7 Qs1 | | S4 Q1 | |
| | | S4 Q2 | |
| M1 Ls' | M1 | | |
| *S4 Q2 P6' Ls' | M2 | S4 Q3 | |
| Hs1 Hs2 Sm M2 | | | S1 Q4 |
| Im' Q3 | M3 | | |
| Im' Q3 | M4 | | |
| Q3 M4 | M5 | | |
| M5 | | | S6 Q1 |
| M5 Im' (Ls Rs P6+Qm)' | | S6 Q1 | |
| *Q3 (Ls Rs P6) | M1 | | |
| Ls P6' | | S7 Q1 | |
| Rs P6' P7 | | | S7 Q1 |
| Hs1 Hs2 Ls | | S2 Q1 | |
| Hs1 Hs2 Rs | | | S2 Q1 |
| P7' Qs1 | | S8 Q1 | |
| P7' Qs1 | | | S8 Q1 |
| P7' Ls | | S8 Q2 | |
| M1 | M1 | | |
| *S8 Q2 Ls | M15 | S6 Q1 | |
| Sm[Ls(Ux+Uy)Xm'] | M1 | | |
| Ls' Rs' | | S1 Q1 | |
| P7' Ls' Rs' | | | S1 Q1 |

Initially line 32 is in state S1 Q1. To initiate the call the subscriber removes his handset, and since his is an unrestricted line, his signal over highway H1 becomes false which causes the line to go to state S2 Q1. Dial tone is then received and the subscriber dials the digit 6. After the end of the digit, bit P7 remains true, the timer P9–P11 counts to seven and the signal Qs1 becomes true. The line is then advanced to state S3, Q1. The tens digit "6" is then dialed and upon P7 Qs1 again becoming true the line advances to state S4 Q1. The units digit 8 is then dialed. Upon P7 Qs1 becoming true the subscriber is advanced to state S4 Q2. The signal Q2 is a demand for the marker.

When the marker is in state M1, and in scanning the time slot of the calling line detects the signal condition S4 Q2 P6' Ls', its absorbs information into its memory flip-flops. During interval I6 the dialed tens digit from leads P16–P19 is placed by way of Bus A into the flip-flops Cn1–Cn4. During interval I8 the dialed units digit from leads P12–P15 is placed by way of Bus A into flip-flops Dn1–Dn4. During interval I10 the distributor tens digit on leads Tc1–Tc4 is placed by way of Bus A into the flip-flops An1–An4, and during interval I12 the distributor units digit from leads Uc1–Uc4 is placed by way of Bus A into the flip-flops Dn1–Dn4. Thus the calling parties address 32 is stored in flip-flops An1–An4 and Bn1–Bn4, and the address 68 of the called party is stored in flip-flops Cn1–Cn4 and Dn1–Dn4. At the end of the time slot the marker responds to the signal condition S4 Q2 P6' Ls' to advance to state M2, and the subscriber logic responds to the signal condition M1 Ls' to advance to state S4 Q3.

During state M2 the marker scans the successive time slots to find the time slot of the called party. In interval I6 of each time slot distributor tens information from leads Tc1–Tc4 is placed on Bus A and the dialed tens information from flip-flops Cn1–Cn4 is placed on Bus B, and in time slots in which these are the same the parity signal Pm is generated to set the flip-flops Jm. During interval I8 the distributor units information from leads Uc1–Uc4 is placed on Bus A, and the called units information from flip-flops Dn1–Dn4 is placed on Bus B, and when they agree the parity signal Pm is generated to set the flip-flop Km. In a time slot in which both of the flip-flops Jm and Km are set, the signal Sm is generated. If the called party is busy (S1 Q1 Hs1 Hs2)' a flip-flop Im in the marker is set to convey this information to the calling subscriber. The marker continues to advance through the time slots until it finds the signal Q3, which indicates the time slot of the calling party. If the called party is idle (flip-flop Im has not been set), the marker responds to the condition Im′ Q3 to change to state M3.

During state M3, the marker reviews all time slots to find and choose an available route. During interval I6 of each time slot the distributor tens signals from leads Tc1–Tc4 are applied to Bus A and the calleds tens identity from flip-flops Cn1–Cn4 is placed on Bus B; and in response to parity as indicated by the signal Pm, the information as to the XC switch used by that line as recorded in bit P29–P31 is gated to set the corresponding flip-flop of the group Rm1–Rm6. During the interval I8 of each time slot the distributor tens signal Tc1–Tc4 is applied to Bus A and the calling tens number stored in flip-flops An1–An4 is applied to Bus B, and in response to parity as indicated by the signal Pm the information as to the B switch used as recorded in bits P29–P22 is used to set the corresponding one of the flip-flops Lm1–Lm6. When the marker reaches the calling party time slot as indicated by the signal Q3 the pathfinder outputs are available (see section E2c for the pathfinder operation). This information is gated by way of Bus B to set one of the flip-flops En1–En6 to designate the switch XB to be used, and to set one of the flip-flops Fn1–Fn6 to designate which switch XC is to be used in the connection.

At the end of the calling party's time slot, the marker, in response to the signal Im′ Q3, advances to state M4.

During marker states M4 and M5 the crosspoint connection between the called party and calling party is established and the subscribers participating in the connection are informed of the details thereof.

As the marker changes from state M3 to M4, flip-flop Wm is set to indicate to the crosspoint network that the links should be marked in preparation for the firing of a junctor. The identity of the link to be marked is inherent in the calling and called party addresses stored in flip-flops An1–An4, Bn1–Bn4, Cn1–Cn4 and Dn1–Dn4 respectively. This information is supplied through the crosspoint marking logic unit 2650 (FIG. 26) to supply the signals ot3, ou2, rt6, and ru8 to the link markers. Flip-flop Wm is not reset, and consequently the links are continuously marked, until the end of state M5. At the end of state M4, the junctor J41 as identified by the setting of flip-flops En4 and Fn1, is fired by the setting of the junctor flip-flop. The ringing flip-flop within the junctor is set at substantially the same time to apply ringing tone and ring-back tone to the lines.

During state M4 the marker also makes a parity check of the distributor tens and units with the called party number tens and units as stored in the flip-flop Cn1–Cn4 and Dn1–Dn4. In response to the parity signal Sm, the information from flip-flop En4 is coded and stored in bits P26–P28 and the information from flip-flop Fn1 is coded and stored in bits P29–P31 of the called party memory word. At the end of state M4 the time slot of the calling party is identified by signal Q3 occurring, and in response thereto the information from flip-flop En4 is coded and stored in bits P20–P22, and the information from flip-flop Fn1 is coded and stored in bits P23–P25 of the calling party memory word.

At the end of the time slot, in response to the signal Q3, the marker enters state M5. In response to the signal M5, both the calling and the called party advance to state S6 Q1. The marker returns to the idle state M1.

The calling party in response to the signal Ls P6′ immediately advances to state S7 Q1. The called party remains in state S6 Q1 while he is being sent ringing tone. When the called party answers his signal P7 becomes true and therefore in response to the condition Rs P6′ P7 he advances to S7 Q1.

During conversation both parties remain in state S7 Q1. When either party hangs up, in response to the signal Hs1 Hs2 (Ls+Rs) that party is sent to state S2 Q1.

Then when the timing signal Qs1 appears in coincidence with P7′ the party is advanced to state S8 Q1. The system uses calling party release. Thus in the calling parties time slot in response to the signals P7′ Ls he is advanced to state S8 Q2. When the marker is in its idle state M1 it responds to the signal S8 Q2 Ls to advance to state M15. At the ends of the same time slot the calling subscriber is sent to state S6 Q1.

In marker state M15, the left hand routing information registered in bits P20–P25 of the calling party memory word is transferred into the memory flip-flops An1–An4 and Bn1–Bn4 to enable the marker to locate the time slot of the called party by a routing party check. The flip-flops En4 and Fn1 will throughout state M15, supply to the transmission network the address of the junctor J41 to be extinguished. When the time slot of the called party is located (flip-flops An1–An4 equal to bits P26–P28 and flip-flops Bn1–Bn4 equal to bits P29–P31), the signal Sm becomes true.

While the calling subscriber is in state S8 Q2 and the marker is in state M1 the bits P20–P25 of the calling subscriber are erased in response to the signal d=S8 Q2 Ls M1 Xm′.

In the called party's time slot as indicated by the parity signal Sm during marker state M15 the bits P26–P31 of the called party memory word are erased in response to the signal d=M15 Sm Xm′. In response to the signal condition Sm[Ls(Uu+Uy)Xm′]′ the marker returns to state M1. Both the calling and the called party return to the idle state S1 Q1, the calling party in response to the signal condition Ls′ Rs′, and the called party in response to the condition P7 Ls′ Rs′.

G3. CALL TO OPERATOR

Assume that the local subscriber L32 initiates a call and dials "0" to call the operator. Also assume that the operator's line L3z is busy, and that the line L4z is idle but there is no route available to it. Finally assume that the connection is possible to line L1z. Table VI shows the states of the various lines and of the marker, and the commands which produce the changes of state during the call. An asterisk (*) indicates that the command occurs in the same time slot as the command immediately above it in the table.

TABLE VI

| Command | States | | | |
|---|---|---|---|---|
|  | Marker | L32 | L4z | L1z |
| Hs1′ Hs2 |  | S1 Q1 |  |  |
|  |  | S2 Q1 |  |  |
| P7 Qs1 "0" Ls′ |  | S2 Q2 |  |  |
|  | M1 |  |  |  |
| M1 Ls′ |  | S2 Q3 |  |  |
| *S2 Q2 P6′ Ls′ "0" | M10 |  |  |  |
| Hs1 Hs2 Sm M10 |  |  | S1 Q4 |  |
| Im′ Q3 | M3 |  |  |  |
|  | M10 |  |  |  |
| Im Q3 |  |  |  |  |
| Hs1 Hs2 Sm M10 |  |  |  | S1 Q4 |
| Im′ Q3 | M3 |  |  |  |
| Im′ Q3 | M4 |  |  |  |
| Q3 | M5 |  |  |  |
| M5 |  |  |  | S6 Q1 |
| M5 Im′(Ls Rs P6+Qm)′ |  | S6 Q1 |  |  |

Upon seizure the line L32 goes to state S2 Q1 as for a local call, and the digit "0" is then dialed. After the timer generates the signal Qs1 with P7 true, the line L32 goes to state S2 Q2. When the marker is in the idle state M1 and finds the condition S2 Q2 in the time slot of the calling line L32 and that the digit "0" has been dialed, the line goes to state S2 Q3, and the marker goes to state M10.

While still in state M1, during interval I10 of the calling party's time slot, the marker sets the busy test flip-flop Im in response to the command M1 Q2 S2 Ls "0."

Also while still in state M1 during intervals I10 and I12 of the calling party's time slot, the distributor tens and distributor units information is absorbed into flip-flops An1–An–4 and Bn1–Bn4 respectively.

The marker in state M10 then scans all of the time slots in search of the condition $$Im\ S1\ Q1\ Hs1\ Hs2\ Uz(T1+T2+T3+T4)$$

Upon finding this condition fulfilled the signal Sm is generated; and in response thereto, during interval I10 the distributor tens signals are stored in flip-flops Cn1–Cn4, and during interval I12 the distributor units signals are stored in flip-flops Dn1–Dn4. Upon the signal Sm becoming true during state M10 the line is identified as being one of the desired group and as being idle and is thus placed into state S1 Q4. Also with signal Sm true, during I15 of the time slot, the busy indicating flip-flop Im is reset.

Upon reaching the calling line time slot as indicated by signal Q3, with flip-flop Im reset, the marker goes to state M3. It was assumed that the line L3z was busy and therefore that the line selected and stored in flip-flop Cn1–Cn4 and Dn1–Dn4 is L4z.

The marker now goes through a route search and pathfinding operation the same as for a local call. It has been assumed that there is no route available between calling line L32 and called line L4z. Therefore, the flip-flop Im becomes set during this route search. Upon reaching the calling line time slot as identified by the signal Q3 the marker therefore returns to state M10.

Now line L3z is busy and line L4z is tagged with the signal Q4. Therefore, during the time slot of line L4z in the equation for generating Sm, the condition Q1 is not true and this line is passed over. In the time slot of line L1z the condition for generating the signal Sm is satisfied, and the flip-flop Im is reset. Then in the time slot of the calling line, in response to Q3, the marker again goes to state M3. This time the route search is successful, and in response to the condition Im' Q3 the marker goes to state M4. As for local calls the marker during states M4 and M5 establishes the connection and the two subscribers L32 and L1z go to state S6 Q1. The connection then proceeds as for a local call and therefore is not shown in Table VI.

G4. Outgoing Trunk Call

Let us assume that local subscriber L32 (calling party) wishes to make a call over a trunk (called party). If the calling party has a restricted status and attempts to be connected to a trunk by dialing the access digit "9," he will be routed to the operator. If the calling party is unrestricted and he is not already connected on the left as a calling party or on the right as a called party, he may dial the access digit to request a trunk. The subscriber logic will then direct the marker to locate the first available trunk (it can be either a PBX or a two-way dial trunk) and establish a connection.

The subscriber in state S2 Q1 upon dialing the digit "9" is sent to state S2 Q2 according to the following equation $$P7\ Qs1\ Ls'\ Rs'\ "9"$$

When the marker is in the idle state M1 and scans the calling party time slot 32 the distributor address is absorbed into flip-flops An1–An4 and Bn1–Bn4 of the marker. The subscriber in response to condition M1 Ls' goes to state S2 Q3. The marker goes to state M9 in response to the following equation $$S2\ Q2\ P6'\ Ls'\ Rs'\ "9"\ Hs2$$

While still in state M1 the marker has set the flip-flop Im.

The marker then performs a trunk hunting operation to find an idle trunk (units digit Ux or Uy) and upon finding such a trunk generates the signal Sm according the following condition $$Rs'\ Im\ S1\ Q1\ Hs1\ Hs2\ [M9(Ux+Uy)]$$

Upon the signal Sm becoming true the flip-flop Im is reset. Assume that the idle trunk that is found is L1x.

The marker upon reaching the calling party time slot 32, in response to the condition Im' Q3 advances to state M3. A route search and pathfinding operation then occurs as for a local line. The in states M4 and M5, the marker establishes the connection and proceeds as for a local call.

In the subscriber logic the calling line is advanced from state S2 Q3 to S6 Q1 in response to the following condition $$M5\ Im'\ (Ls\ Rs\ P6+Qm)'$$

The connection then proceeds as for a local call.

After the connection is made by the marker, the trunk loop will be closed causing the distant central office (M.A.X.) to be seized. Dial-tone will be returned to the calling party. Also, a tone gate in the calling party's line circuit will be energized to permit a high-frequency tone, under the control of his dial, to pass through the transmission network. This interrupted high-frequency tone is detected in the selected trunk's line circuit and converted to direct-current pulses (similar to standard dial pulses) for pulsing a relay to open and close the trunk loop. Upon dialing the seven-digit address of the distant central office an audio connection is established. The left- and right-hand connections and the transmission path are shown in FIG. 15. The trunk circuits are shown in FIGS. 8A and 8B.

G5. Inward Trunk Call

Let us assume an incoming call from a two-way dial trunk L1y (calling party) to a PABX subscriber L32 (called party).

Since these trunks access the PABX via the fifth selector in the Strowger step-by-step central office, only the last two digits will be pulsed into the PABX relay trunk-adapter. These last two digits will be recognized by the PABX as the "tens" and "units" of the desired called subscriber. If the called subscriber L32 meets the required conditions, he will be connected as shown in FIG. 16.

In response to the highway signals generated in the trunk circuit LC1X, the subscriber logic goes into state S2 Q1 in the usual manner. Then in response to the condition P7 Uy, it immediately goes into state S3 Q1. The tens and units digits are dialed and the call proceeds as for a local call.

In the time slot 1y during which the marker state changes to M4, since this is the time slot of a trunk (Ux+Uy) the flip-flop Tm within the marker is set. When the marker next reviews the time slot of the called party, the subscriber logic, upon seeing flip-flop Tm set, will cause a mark to be written in memory bit P6 of the called party, indicating that the calling party is the trunk. At the same time the subscriber logic will extract the crosspoint address of the call from the markers En and Fn storage areas.

Let us now assume that an incoming call from a PBX trunk L1x is eminent. The central office subscriber dials an assigned number and accesses the PABX via a trunk hunting connector in the central office. Upon seizure of the PABX the subscriber logic goes from state S1 Q1 to state S2 Q1. In response to the signal condition P7 Ux the subscriber is then immediately sent to state S2 Q2 to demand the marker. Then the subscriber logic in response to the signal M1 Ls' goes to S2 Q3 and the marker goes to state M10 in response to the condition $$S2\ Q2\ P6'\ Ls'\ Nk'\ Ux$$

Hunting for an operator's line then occurs as described in section G3.

G6. TRANSFERS

The type of industrial or commercial concern that would require the facilities of a PABX would most probably be one in which areas of specialized activity would be found isolated from one another. Business calls over either two-way dial trunks or PBX trunks might very well be of such a nature as to require the participation of representatives in more than one location. It is for this reason that transfer facilities were included within the framework of the PABX.

Any PABX subscriber may transfer the trunk to which he is connected, to any other PABX subscriber within the exchange or to the operator, simply by dialing the number of the second party.

Assume that a subscriber L32 has called one of the trunks L1y as shown in FIG. 15. A conversation is in progress and it becomes desirable to transfer the trunk to a second subscriber L68. (In FIG. 17, the solid line indicates the existing connection, the dotted line shows the proposed connection.) In order that either L32 or L68 might be capable of removing themselves from the conversation without isolating the trunk, the new party L68 must be associated with the trunk and not with L32. Effectively, the trunk will be the calling party although party L32 will physically dial the number of party L68. In this case the proposed connection may be readily established, since there is no connection to L1y on the left side of the matrix—i.e., L1y is not a calling party.

The subscriber L32 is initially in state S7 Q1. As he starts dialing, the condition $$Hs1\ Hs2(Ls+Rs)$$

becomes true and the logic advances to state S2 Q1 to record the first digit. At the end of the first digit in response to the condition $$P7\ Qs1\ \text{``6''}\ P6$$

the subscriber logic goes to the state S3 Q1 for the dialing of the second digit. After each of the second and third digits the condition P7 Qs1 becomes true and the subscriber logic advances after the second digit to S4 Q1 and after the third digit to S4 Q2.

When the marker is in the idle state M1, in the time slot of the party 32 who is dialed to accomplish the transfer, in response to the signal condition S4 Q2 Ls P6 the marker during intervals I6 and I8 absorbs the dialed numbers into the flip-flops Cn1–Cn4 and Dn1–Dn4. In response to the condition S4 Q2 Ls, the marker during intervals 110 and 112 absorbs the left hand routing information P20–P25 of the subscriber 32 into the marker flip-flops An1–An4 and Bn1–Bn4.

The marker goes from state M1 to M7 in response to the condition $$S4\ Q2\ P6\ Ls\ Rs'$$

The marker then cycles seeking the time slot which displays routing information in bits P26–P31 identical to the information within the marker's An and Bn storage registers and therefore identical to bits P20–P25 of the PABX subscriber endeavoring to transfer. When the trunk is located, the signal Sm becomes true and the distributor address of the trunk's time slot replaces the routing information that was used to locate the trunk. At the end of the trunk's time slot, in response to the signal condition Sm(Ls Rs)' the marker goes to state M2.

Now that the marker is cognizant of the distributor address of the trunk, the trunk may be treated as a calling party. The marker will perform the busy test, route search, and connection activities performed in the establishment of normal calls.

Assume, now, that conditions exist as depicted in FIG. 16. In this case the trunk L1y has called subscriber L32. If transfer action is desired, difficulties are evident. The second local subscriber L68 to whom the trunk is to be transferred must be connected directly to the trunk as a called party. But the trunk in this case, has already been connected as a calling party. Therefore, the immediate problem is to reverse the relationship between L32 and the trunk, that is, causes L32 to become the calling party and L1y the called party. The trunk will then be capable of acting as a calling party in establishing the new connection to L68.

Before the connection depicted in FIG. 16 is destroyed, a new connection between L32 (calling party) and L1y (called party) should be established (as shown in FIG. 18) to insure that L32 and L1y remain continuously connected.

As soon as L32 demands the services of the marker, it is apparent to the marker that a pre-transfer operation must take place. Line L32 will act as the calling party of a connection between himself and trunk L1y. The only difference between the establishment of this connection and that of any other is that the busy-test sequence must be replaced by a cycle that will provide the marker with the distributor address of the trunk to whom L32 is connected. To achieve this end, the marker extracts the crosspoint-routing information which L32 and L1y have in common from L32's time slot, enters state M6, and reviews time slots until the memory word of L1y is encountered. The marker then seizes L1y's distributor address as being that of the called party. Normal route-search and connection cycles follow. At the end of the connection cycle, the marker initiates a disconnection action to remove the connection between L1y and L32 in which L1y is the caller (FIG. 19). Subcriber logic acts upon the memory word of L32 in such a way as to redemand the marker. This time, when the marker investigates the status of L32, it will see fulfilled the conditions which require the normal transfer process.

After the dialing of L68's number, the new connection will be as shown in FIG. 17, by both the solid line and the dotted line. This condition is acceptable to the PABX, that is, the trunk L1y has only one connection as a calling party and one connection as a called party.

When a connection is made as shown in FIG. 17, the trunk L1y is silenced. If subscriber L68 does not answer, subscriber L32 can dial the digit "2" (which will "unsilence" L1y) and notify him of L68's condition. If subscriber L68 does answer L32, and agrees to talk to L1y, then L32 can simply remove his connection by hanging up. This action by L32 will destroy L32's connections to L1y and will also un-silence L1y. The connection will be as shown in FIG. 20.

If the incoming trunk call had been a PBX trunk the actions would be similar, except that incoming PBX trunks are directed to the attendant. The transfer operations would be the same as performed by called party L32. If the incoming PBX call had been received in the absence of the attendant, then the night service key on the attendant cabinet would be operated, and the call would be automatically routed to a local PABX subscriber wired for night service. The answering and transfer actions would then be very similar to those of the incoming two-way dial trunk connection.

G7. MEET-ME CONFERENCE CALL

There are six conference lines; these are passive lines and are tied to only the right-hand side of the network. Also, the operator position can be tied to a conference by operating her conference key. Again, the operator is always aware of a conference in progress by a conference light lit on her cabinet even though she may not be connected. The conference lines are connected as shown in FIG. 21.

As can be seen, the conference lines may act only as called parties, since they are tied only on the right of the network. Since the secondaries of the conference transformers are paralleled, six independent calls and the operator or the operator-connected trunks can have an audio connection to a conference circuit. All callers will be considered as calling parties and will be connected on the left.

By dialing the access digit "8," PABX subscribers are connected to the "meet-me" conference circuit, using marker state M8 to perform a trunk-hunting operation. As soon as the first conference circuit is connected, the conference light on the attendant's cabinet will light as a signal that the conference circuit is in use. The connections on the left and the right of the switching network can be shown as in FIG. 21.

G8. PROGRESSIVE CONFERENCE OR CHAIN CALL CONNECTION

Let us assume that PABX subscriber L32 calls PABX subscriber L68 and PABX subscriber L68 calls PABX subscriber L90, etc. This type of connection is a means of tying a number of subscribers together progressively.

PABX subscriber L32 calls subscriber L68, as explained previously in a local call. Since L68 is connected only on the right, as a called party, he is eligible as a calling party if he desires. Subscriber L68 calls subscriber L90 by dialing L90's number. Subscriber L68 is now connected as a called and calling party—that is, connected on both the right and left. The chain of a progressive call connection can be shown as in FIG. 22. Subscriber L90 can call another subscriber, etc.

These types of chain calls can be broken in the middle of the chain and have two independent audio connections if there are enough subscribers in the chain. For example, in a chain involving A, B, C, D, and E, in that order; subscriber C can hang up and a connection will still exist between A and B, and D and E. If B had hung up, A would also have to, but there still would be a chain connection between C, D, and E.

G9. NIGHT SERVICE CONNECTION

If the night key on the operator's console is in the ON position thereby generating the signal $Nk$, incoming PBX trunks are directed to marker state M11 in response to the condition, $$S2\ Q2\ P6'\ Ls'\ Rs'\ Nk\ Ux$$

The marker then performs a trunk hunting operation searching for a local subscriber who has a true condition during his time slot on highway conductor H3.

G10. DISCONNECT

Basically, the exchange utilizes the principles of calling party release—that is, only the party establishing a connection may cause that connection to be removed. The role of the marker during a disconnection action is two-fold. It must inform the crosspoint switching network of the transmission-path to be extinguished. It must also, during the time slots of the participating parties, inform the subscriber logic of the action, in order that the memory words of the subscribers might be revised.

The only information required by the marker to effect disconnection is the number of the route through the switching network that links the two subscribers (as recorded in each subscriber's memory word).

H. TESTING FACILITIES

The testing facilities (not shown) are necessary to ascertain if the system is functioning in the manner for which it was designed; for trouble shooting following the construction stage and for aiding in preventive-maintenance once the system is functioning properly. The testing circuitry is able to perform the following functions: (a) test the memory operation by writing ones or zeros in any word of the memory array or supply the command to rewrite, which will tell the memory to write whatever has been previously read out, thus allowing the memory to operate independently from the subscriber logic; (b) allows the system to operate for a predetermined time, on command, thus making a step by step analysis practical; (c) prevents all subscribers but one from using the marker, so that the marker may be routined, yet allowing any dialed numbers to be registered, and any existing conversations to continue.

The testing facilities constitute three separate sections; indicating test, transmission test, and the marker and subscriber logic test.

The indicating test circuit is simply a network of signal lamps which is used to indicate the condition of the testing circuitry and of the portion of the system being tested. The remaining two testing circuits are quite different in that they are used to test different major functional groups of circuits.

The transmission test is intended to check the operation of all circuits contained in the switching network. This examination is accomplished by replacing all the commands from the common marker by commands originating on a transmission test panel. In a system of this nature it is necessary to provide preventive-maintenance testing and a means for locating a system failure due to a fault in the switching network.

Any circuit in the switching network may be tested for proper operation. Every type of call possible in the system can be checked. The connection cycle of the marker as seen by the switching network can be duplicated at a rate determined by a manual push button or at the normal rate of the marker.

The automatic mode of testing steps a counter such that the connection cycle occurs at the same speed as provided by a marker. This feature is useful in that it permits the tester to observe the repeated wave form of a suspected trouble spot. For this mode of operation ringing is reset immediately after it is set. This avoids the confusion which would arise from a continued intermittent ringing at the subscriber phone.

The manual mode of operation permits the connection to be established without the aid of the marker. This enables the tester to make steady state measurements in suspected trouble spots.

The marker and subscriber logic testing facilities are further subdivided into three groups of testing logic; the memory test, the stop clock test, and the logic test.

The memory test is provided by expanding the present subscriber logic (FIG. 39) to include manually controlled test commands. The logic equations in Table VII constitute a general format for the expansion of the subscriber logic.

TABLE VII

Write $P=Ww0'\ [Ww1'+Ws1\ Rw'+P(Ws0'+Rw)]$—$(P1$–$8)$

Write $P9=Ww0'\ [Ww1'+s\ Rw'+P9(Rw+s'\ a')+a\ Rw'\ f9]$

Write $P=Ww0'\ (s\ Rw')'\ [Ww1+P(Rw+s'\ a')+a\ Rw'\ f]$—$(P10$–$11)$

Write $P=Ww0'\ [a\ f\ Rw'+b\ Rw'+P(a'\ d'+Rw)+Ww1]$—$(P12$–$15)$

Write $P=Ww0'\ [a\ Rw'+Ww1+P(d'+Rw)]$—$(P16$–$31)$

The command $Ww1$ to the subscriber logic informs the memory to write a "1" into the cores associated with a subscriber to be tested. The command $Ww0$ informs the memory to write a "1" in the cores associated with the subscriber to be tested. The command $Rw$ given to the subscriber logic informs the memory to rewrite information previously written in the cores which are associated with a subscriber to be tested. These commands will be true during a particular subscriber's time interval. A push button is used to activate a pulse generator producing a single trigger pulse that generates these three test commands.

The stop clock test as the title would seem to indicate, prevents any trigger pulses from occurring in the system by inhibiting the output of the trigger source, the system clock. Just as important it controls a number of trigger pulses allowed into the system, thus allowing the system to be controlled step by step at the will of the operator.

This step by step control is desirable in electronic logic circuitry, because the high speed obtained in sequential logic operations makes it exceedingly difficult to trace a logical error or a timing error. The logic test will allow a person to monitor and check the subscriber and marker logic without interrupting existing conversations or losing the dialed information of a calling party, although it does prevent a subscriber from obtaining the marker. When a subscriber demands the marker for a connect or disconnect cycle, a red alarm light will operate informing the person checking the system, who can then release the marker for service. Another feature of the logic test is that it allows two subscribers to be viewed sequentially by the appropriate selection of switches, rather than only one subscriber as in the stop clock test.

The command on which the marker will service a subscriber is expanded from simply Q2 to the following:

$$Q2 \ (Kw + Twa \ Uwa \ Tw1 + Twb \ Uwb \ Tw2)$$

The logical quantities $Twa$ and $Uwa$ are the address of one of the arbitrary subscribers. The address of the other arbitrary subscriber is $Twb \ Uwb$. These two addresses are manually selected on the test panel. The quantity $Tw1$ is generated by a switch which suspends the action of the system and is associated with subscriber $Twa \ Uwa$. The quantity $Tw2$ is generated by a switch which suspends the action of the system and is associated with subscriber $Twb \ Uwb$. Operating manual switch $Tw$ will tell the marker to ignore all new subscribers requesting the marker. When signal $Kw$ is made true upon the operation of switch $Tw$ every term related to Q2 is false; and the marker will not service a subscriber. With the marker free of subscribers, a particular subscriber can be sequenced in a step by step fashion through the marker states.

While we have described above the principles of our invention in connection with specific apparatus, it is to be clearly understood that this description is made only by way of example and not as a limitation to the scope of our invention.

What is claimed is:

1. In a communication switching system, a plurality of subscriber lines, a plurality of trunk lines extending to another exchange, and a plurality of operator lines less in number than said trunk lines, each of said lines having a line circuit associated therewith, a switching network for selectively establishing connections, each established connection extending between two of the line circuits, common control equipment including a memory and logic circuits shared on a time division multiplex basis, said memory having a plurality of groups of storage elements, a source of recurring pulses supplied to the memory, a multiplex arrangement which associates each group of memory elements with an individual pulse time slot during which the stored information is recirculated and may be selectively modified by means of the logic circuits, so that each group of elements associated with a time slot comprises a memory word, each memory word including sequence-state storage elements and call-signal storage elements;

a marker for use in transferring memory word information between different time slots, and for controlling the establishment and release of connections through said switching network; each line circuit having a time slot and corresponding memory word individually associated therewith at least for the duration of any in-use period;

attendant's cabinet apparatus, part of which is individual and part of which is common to the operator lines; the apparatus individual to each operator line including answering key means connected to the line and supervisory lamp means connected to means constructed and arranged to cause the lamp means to indicate the supervisory condition of any switching-network connection which includes that operator line;

means including said common control equipment and said marker for establishing one connection through said switching network between the line circuits of a trunk line and an operator line, and means for actuating the lamp means associated with said operator line to give an indication of said connection;

means effective responsive to the answering key means of said operator line being in an answer condition, and said one connection remaining established for receiving call signals from calling means included in said attendant's cabinet apparatus and registering these call signals in the call-signal storage elements of the memory word associated with said operator line; means responsive to the last said stored call signals for seizing the marker to cause another connection to be established between said trunk line and a desired subscriber line;

the trunk lines being independent of said attendant's cabinet apparatus except for switching network connections to operator lines and information supplied to and from the operator-line memory words by use of said marker.

2. In a communication switching system, the combination as claimed in claim 1, further including means responsive to the restoration of said answering key means after said other connection has been established for making said other connection effective, means also responsive to said restoration of said answering key means for giving an indication on the lamp means of said operator line that the call is awaiting answer at said subscriber line, means responsive to answering of the call at the subscrbier line for releasing said one connection, and means also responsive to said answering of the call for restoring said operator line circuit and its lamp means to idle condition.

3. In a communication switching system, the combination as claimed in claim 1, further including means enabled by call signals received from any subscriber line circuit which is either idle or has an established connection through said switching network to a trunk line circuit and means for recording said call signals in the call-signal storage elements of the memory word associated with that subscriber line circuit, means responsive to the last said call signal received being a given signal designating an operator call for causing a connection to be extended from said subscriber line circuit to an idle operator line circuit.

4. In a communication switching system, the combination as claimed in claim 1, further including a conference circuit, a plurality of conference line circuits associated in common with the conference circuit, wherein said apparatus associated with the operator lines includes conference key means for individually connecting said operator lines to said conference circuit, so that a trunk line circuit having a connection through said switching network to an operator line circuit may be connected to the conference circuit by operation of the conference key means associated with that operator line circuit, means responsive to a given conference call signal received from any idle subscriber line circuit for causing a connection to be established through said switching network to an idle conference line circuit, said apparatus including a conference lamp, with means for causing said lamp to burn steadily whenever any subscriber line circuit has a connection by way of a conference line circuit to the conference circuit, and means for causing said conference lamp to flash responsive to an operator line circuit being connected by way of the associated conference key means to the conference circuit and none of the conference line circuits being engaged in a connection to a subscriber line cicruit.

5. In a communication switching system, the combination as claimed in claim 1, wherein there is provided means responsive to receipt of an incoming call on one of said trunk lines for hunting for an idle one of said operator lines, and means for causing a connection to be established through the switching network between the line circuit of said trunk line and said operator line, means responsive to said hunting for an operator line being unsuccessful for giving a busy indication to the common control equipment in the time slot of said trunk line and then releasing the marker, means in said common control equipment responsive to said busy indication for repeating the request for the marker, the marker when idle being again seized to attempt to find an idle operator line and cause a connection to be established thereto, this action in response to the busy condition being repeated until an operator line becomes idle and is thereupon seized by the marker and the connection established;

the marker being available for other calls between attempts to service the said trunk line circuit call.

6. In a communication switching system, the combination as claimed in claim 1, wherein said apparatus associated with the operator lines further includes a night service key, means included in certain of said subscriber line circuits for marking them as night service lines, means responsive to an incoming call at one of said trunk line circuits while said night service key is in its actuated condition for causing said marker to hunt for an idle one of said night service line circuits and means to cause said marker to establish a connection between the line circuits of said trunk line and said found night service line.

7. In a communication switching system, the combination as claimed in claim 1, wherein said marker includes an arrangement for hunting for an idle operator line, means for starting the hunting arrangement in response to an incoming call signal from a trunk line circuit which does not have a connection through the switching network, alternative means for starting the hunting arrangement in response to recall comprising a given operator designating call signal received from a subscriber line circuit which has a connection to a trunk line circuit, the marker in either case responding to the finding of an operator line by the hunting arrangement to cause a connection to be established between the trunk line circuit, and the operator line circuit, a bistable device and means causing it to be set to a first state if the trunk-to-operator connection is established in response to an incoming call and to a second state if the trunk-to-operator connection is established in response to recall, said supervisory means being actuated in response to the bistable device being in the first state to produce one type of indication and alternatively in response to the bistable device being in its second state to produce a different type of indication.

8. In a communication switching system, the combination as claimed in claim 7, wherein said supervisory lamp means comprises a trunk lamp and a local lamp for each operator line, with the trunk lamp flashing and the local lamp off to indicate said incoming trunk call, with the trunk lamp on steady and the local lamp flashing to indicate said recall, and with both lamps on steady to indicate that a trunk line circuit has a connection to the corresponding operator line circuit, and also a transfer connection to a subscriber line circuit which has not been answered at the subscriber line.

9. In a communication switching system, the combination as claimed in claim 8, wherein said hunting arrangement may be started in response to said given operator-designating call signal being received from a subscriber line circuit which does not have any connection through the switching network, causing a connection to be established from that subscriber line circuit to the found operator line circuit, the connection being indicated by causing the local lamp to flash while the trunk lamp is off.

10. In a communication switching system, a plurality of subscriber lines, a plurality of trunk lines extending to another exchange, and a plurality of operator lines less in number than said trunk lines, each of said lines having a line circuit associated therewith, switching equipment for selectively establishing connections between said line circuits, attendant's cabinet apparatus, part of which is individual and part of which is common to the operator lines; the apparatus individual to each operator line including answering key means connected to the line and supervisory lamp means connected to means constructed and arranged to cause the lamp means to indicate the supervisory condition of any switching-network connection which includes that operator line;

means responsive to receipt of an incoming call on one of said trunk lines for finding an idle one of said operator lines, means for causing a connection to be established through the switching network between the line circuits of said trunk line and said operator line, and means for actuating the lamp means associated with said operator line to give an indication of said call, the call being answered by actuation of the answering key means of that operator line, said switching equipment including means responsive to the actuation of said calling means, after the actuation of said answering key means, for setting up a connection between said trunk line and a desired subscriber line, means responsive to the subsequent restoration of said answering key means for making the last said connection effective, means also responsive to said subsequent restoration of the answering key means for giving an indication on the lamp means of said operator line that the call is awaiting answer at said subscriber line, means responsive to answering of the call at the subscriber line for releasing the connection between the line circuits of the trunk line and operator line, and restoring the operator line circuit and its lamp means to idle condition;

the trunk lines being independent of said attendant's cabinet apparatus except by way of said switching equipment.

References Cited by the Examiner
UNITED STATES PATENTS

| | | | |
|---|---|---|---|
| 2,955,165 | 10/60 | Budlong | 179—18 |
| 3,008,010 | 11/61 | Le Queau | 179—27 |

ROBERT H. ROSE, *Primary Examiner.*

WALTER L. LYNDE, *Examiner.*